US005682580A

United States Patent [19]

Iwama et al.

[11] Patent Number: 5,682,580

[45] Date of Patent: Oct. 28, 1997

[54] ELECTROPHOTOGRAPHIC SERIAL PRINTING APPARATUS

[75] Inventors: Ryouichi Iwama, Kawasaki; Syuzo Masuda, Saijo, both of Japan

[73] Assignee: Fujitsu Limited, Kanagawa, Japan

[21] Appl. No.: 507,951

[22] Filed: Jul. 27, 1995

[30] Foreign Application Priority Data

Sep. 13, 1994 [JP] Japan .................................... 6-219291
Nov. 16, 1994 [JP] Japan .................................... 6-281831

[51] Int. Cl.$^{6}$ ............................ C03G 15/22; C03G 15/20

[52] U.S. Cl. ............................ 399/130; 347/152; 347/156; 399/320

[58] Field of Search .................................... 355/200, 282, 355/285; 347/152, 156; 399/130, 320, 328; 400/320

[56] References Cited

U.S. PATENT DOCUMENTS 4,639,749 1/1987 Ito .......................................... 347/152
5,206,682 4/1993 Yamada et al. ......................... 355/200
5,459,503 10/1995 Ishii ........................................ 347/152

FOREIGN PATENT DOCUMENTS 56-77167 6/1981 Japan .
61-152463 7/1986 Japan .
61-145649 9/1986 Japan .

*Primary Examiner*—William J. Royer
*Attorney, Agent, or Firm*—Armstrong, Westerman, Hattori, McLeland & Naughton

[57] ABSTRACT

An electrophotographic serial printing apparatus includes: a transporting unit for transporting a recording sheet in a sheet transport direction; a processing unit including a unit for uniformly charging a photosensitive drum which is rotated, a unit for exposing the photosensitive drum to form a latent image, and a unit for developing the latent image to form a developed image on the photosensitive drum, a transferring unit for transferring the developed image from the photosensitive drum to the recording sheet; a fixing unit for fixing the developed image to the recording sheet by using a fixing roller after the developed image is transferred to the recording sheet, the fixing unit including a holding member for holding the fixing roller; a carriage unit on which the processing unit and the fixing unit are arranged; a moving unit for moving the carriage unit over the transferring unit in directions perpendicular to the sheet transport direction; and a heating unit for heating the fixing roller through an induction heating to allow the developed image to be fixed to the recording sheet.

42 Claims, 40 Drawing Sheets

31

ELECTROPHOTOGRAPHIC SERIAL PRINTING APPARATUS

BACKGROUND OF THE INVENTION (1) Field of the Invention

The present invention relates to an electrophotographic serial printing apparatus which prints an image on a recording sheet through electrophotographic processes.

To realize an electrophotographic printer with a small size and a low cost, an electrophotographic serial printer has been proposed. In the electrophotographic serial printer, a recording sheet is transported in a sheet transport direction, and a carriage unit in which an image is formed on a photosensitive medium is moved over a transferring unit in directions perpendicular to the sheet transport direction. The image on the photosensitive medium is transferred to the recording sheet by the transferring unit and it is fixed by a fixing unit. It is desirable that the electrophotographic serial printer provides an increased quality of printed image without producing a defective image.

(2) Description of the Prior Art

FIGS. 40A and 40B show a conventional electrophotographic serial printer 11. This printer is disclosed in Japanese Laid-Open Patent Application No. 61-152463.

In the printer 11 disclosed in the above-mentioned publication, as shown in FIGS. 40A and 40B, a pair of transport rollers 13*a* and 13*b* for transporting a recording sheet 12 are provided. The recording sheet 12 is transported by these rollers in a sheet transport direction indicated by an arrow in FIG. 40A. A supporting shaft 14 extending in parallel to the transport rollers 13*a* and 13*b* is provided. A carriage unit 15 movably supported on the shaft 14 is moved by a motor (not shown) in directions perpendicular to the sheet transport direction.

In the conventional printer 11, a fixing roller 16 is fixed at a rear portion of the printer 11. This fixing roller is stationary and has a length longer than a width of the recording sheet 12. A transferring unit 17 extending in the directions in which the carriage unit 15 is moved is provided beneath the recording sheet 12.

The carriage unit 15 includes a photosensitive drum 21 which is rotated at an appropriate peripheral speed synchronous with the movement of the carriage unit 15. The surface of the photosensitive drum 21 is uniformly charged by a charger 22 and exposed by an exposure unit 23 to form an electrostatic latent image on the surface of the photosensitive drum 21. This latent image is developed by a developing unit 24 with a toner 25 of the developing unit 24 using a developing roller 26 to form a developed image on the photosensitive drum 21.

The developed image on the photosensitive drum 21 is transferred to the recording sheet by the transferring unit 17. After the recording sheet 12 with the toner image transferred thereto is transported to the fixing roller 16 by the transport rollers 13*a* and 13*b*, the toner image is fixed to the recording sheet 12 by the fixing roller 16.

In the above-described printer 11, irregular fixing may occur because the recording sheet 12 rests on the fixing roller 16 or is moving with relation to the fixing roller 16 at the time of the fixing. There is a problem that a defective image may be produced due to the irregular fixing. Also, because the fixing roller 16 must have a length longer than the width of the recording sheet 12, it is necessary to produce an electrophotographic serial printer having a greater size in order to arrange such a fixing roller on the printer.

FIG. 41 shows a carriage unit 15 of a different conventional electrophotographic serial printer. This carriage unit is disclosed in Japanese Laid-Open Utility Model Application No. 61-145649. In FIG. 41, parts which are the same as corresponding parts in FIGS. 40A and 40B are designated by the same reference numerals, and a description thereof will be omitted.

In the carriage unit 15 disclosed in the above-mentioned publication, a fixing unit 27 is arranged within the carriage unit 15. A cleaning unit 30 is arranged in contact with the photosensitive drum 21 to remove the toner remaining on the photosensitive drum 21 after the transferring of a toner image to the recording sheet 12.

The fixing unit 27 includes a fixing roller 28 which is rotated in a rotating direction which is the same as that of the photosensitive drum 21. A heat source 29 such as a halogen lamp is arranged inside the fixing roller 28 to heat the fixing roller 28 so that the toner image is fixed to the recording sheet. In a different arrangement, the heat source 29 may be arranged outside the fixing roller 28.

The fixing roller 28 is preheated by the heat source 29 to a predetermined temperature prior to a start of printing. Whether or not a temperature of the fixing unit 27 during the printing is above a predetermined reference temperature is detected by using by a thermistor (not shown), and the result of the temperature detection is used to control the heating of the fixing unit 27.

Because the photosensitive drum 21 and the fixing unit 27 which are arranged on the carriage unit 15 are moved relative to the recording sheet 12 at the same time, the toner image is fixed to the recording sheet 12 after the toner image from the photosensitive drum 21 is transferred to the recording sheet 12.

In a case of an electrophotographic serial printer having the above-described carriage unit 15, the fixing unit 27 including the fixing roller 28 is arranged within the carriage unit 15, and the heat source 29 is also arranged within the carriage unit 15. Usually, the heat source 29 is included in the fixing roller 28. It is necessary to make the printer with a greater size and a complicated cable connection in order to arrange the fixing unit 27 of the above type therein. Also, when the halogen lamp is used as the heat source 29 of the fixing roller 28, irregular exposure of the photosensitive drum 21 may occur if a shielding of light emitted by the halogen lamp is insufficient. In order to avoid the irregular exposure, it is necessary to shut off the light emitted by the halogen lamp from the photosensitive drum 21 long enough to form a latent image on the photosensitive drum 21 by the exposure thereof.

When the light source 29 is arranged within the carriage unit 15 but outside the fixing unit 27, a longer time is needed to heat the fixing roller to an appropriate fixing temperature. There is a problem that it is difficult to realize a high speed printing using the printer having the above-described carriage unit.

Japanese Laid-Open Patent Application No. 56-77167 discloses a serial printer in which a thermal light source is used to fix a toner image to a recording sheet.

In the conventional printer disclosed in the above-mentioned publication, when the recording sheet is transported, the carriage unit on which the thermal light source is arranged is raised at a position above the recording sheet, and light from the thermal light source is irradiated to the recording sheet for the fixing of the toner image after the toner image is transferred to the recording sheet. However, it is difficult to heat the recording sheet to a high temperature appropriate for carrying out the fixing of the toner image because the carriage unit is at the raised condition.

When a halogen lamp is used as the thermal light source, the density of thermal energy produced by the halogen lamp is low. A considerably long time is needed to carry out the fixing of the toner image to the recording sheet. If a paper jam occurs, a burning of the thermal light source is likely to take place. On the other hand, when a xenon lamp is used as the thermal light source, a capacitor having a great size connected to the xenon lamp must be used. Also, there is a problem that a scattering of toner and noises may take place on the printer including the xenon lamp. Further, the thermal light source used for the fixing is arranged on the carriage unit adjacent to the photosensitive drum, and it is difficult to provide a shielding of light from the thermal light source which is sufficient to form a latent image on the photosensitive drum without causing irregular exposure.

SUMMARY OF THE INVENTION

Accordingly, it is a general object of the present invention to provide an improved electrophotographic serial printing apparatus in which the above-described problems are eliminated.

Another object of the present invention is to provide an electrophotographic serial printing apparatus which can be built with a small size and a low cost and can create a good quality of printed image without producing a defective image due to irregular exposure or irregular fixing.

Still another object of the present invention is to provide an electrophotographic serial printing apparatus which can be built with a small size and a low cost and can realize a high-speed printing with a good quality of printed image.

The above-mentioned objects of the present invention are achieved by an electrophotographic serial printing apparatus which includes: a transporting unit for transporting a recording sheet in a sheet transport direction; a processing unit including a unit for uniformly charging a photosensitive drum which is rotated, a unit for exposing the photosensitive drum to form a latent image, and a unit for developing the latent image to form a developed image on the photosensitive drum, a transferring unit for transferring the developed image from the photosensitive drum to the recording sheet; a fixing unit for fixing the developed image to the recording sheet by using a fixing roller after the developed image is transferred to the recording sheet, the fixing unit including a holding member for holding the fixing roller; a carriage unit on which the processing unit and the fixing unit are arranged; a moving unit for moving the carriage unit over the transferring unit in directions perpendicular to the sheet transport direction; and a heating unit for heating the fixing roller through an induction heating to allow the developed image to be fixed to the recording sheet.

The above-mentioned objects of the present invention are achieved by an electrophotographic serial printing apparatus which includes: a transporting unit for transporting a recording sheet in a sheet transport direction; a processing unit which includes a unit for uniformly charging a photosensitive drum which is rotated, a unit for exposing the photosensitive drum to form a latent image, and a unit for developing the latent image to form a developed image on the photosensitive drum; a transferring unit for transferring the developed image from the photosensitive drum to the recording sheet; a fixing unit for fixing the developed image to the recording sheet by using a fixing roller after the developed image is transferred to the recording sheet; a carriage unit on which both the processing unit and the fixing unit are arranged; a moving unit for moving the carriage unit over the transferring unit in directions perpendicular to the sheet transport direction; a heating unit for heating the fixing roller of the fixing unit through an induction heating when the carriage unit is at a home position prior to a start of printing, to allow the developed image to be fixed to the recording sheet; and a rotating unit for rotating the fixing roller when the carriage unit is at the home position, at the same time as the heating of the fixing roller by the heating unit.

The above-mentioned objects of the present invention are achieved by an electrophotographic serial printing apparatus which include: a transporting unit for transporting a recording sheet in a sheet transport direction; a processing unit which includes a unit for uniformly charging a photosensitive drum which is rotated, a unit for exposing the photosensitive drum to form a latent image, and a unit for developing the latent image to form a developed image on the photosensitive drum; a transferring unit for transferring the developed image from the photosensitive drum to the recording sheet; a fixing unit for fixing the developed image to the recording sheet by using a fixing roller after the developed image is transferred to the recording sheet, the fixing unit including a holding member for holding the fixing roller, and the fixing roller including a rotating shaft loosely fitted into holes of the holding member; a carriage unit on which both the processing unit and the fixing unit are arranged; a moving unit for moving the carriage unit over the transferring unit in directions perpendicular to the sheet transport direction; a heating unit for heating the fixing roller of the fixing unit through an induction heating when the carriage unit is at a home position prior to a start of printing, to allow the developed image to be fixed to the recording sheet; and a spring unit for pressing down the fixing roller on the recording sheet against the transferring unit to rotate the fixing roller at the same time as the rotation of the photosensitive drum.

In the electrophotographic serial printing apparatus according to the present invention, the processing unit and the fixing unit are arranged on the carriage unit, and the carriage unit is moved in the directions perpendicular to the sheet transport direction. The fixing roller is held and covered by the holding member. The fixing roller is heated through the induction heating. The printing apparatus of the present invention can be built with a small size and a low cost, and the printing apparatus can create a good quality of printed image without producing a defective image due to irregular exposure or irregular fixing. In addition, the printing apparatus of the present invention can realize a high-speed printing with a good quality of printed image.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of an electrophotographic serial printing apparatus in a first embodiment of the present invention.

Figure 1A:
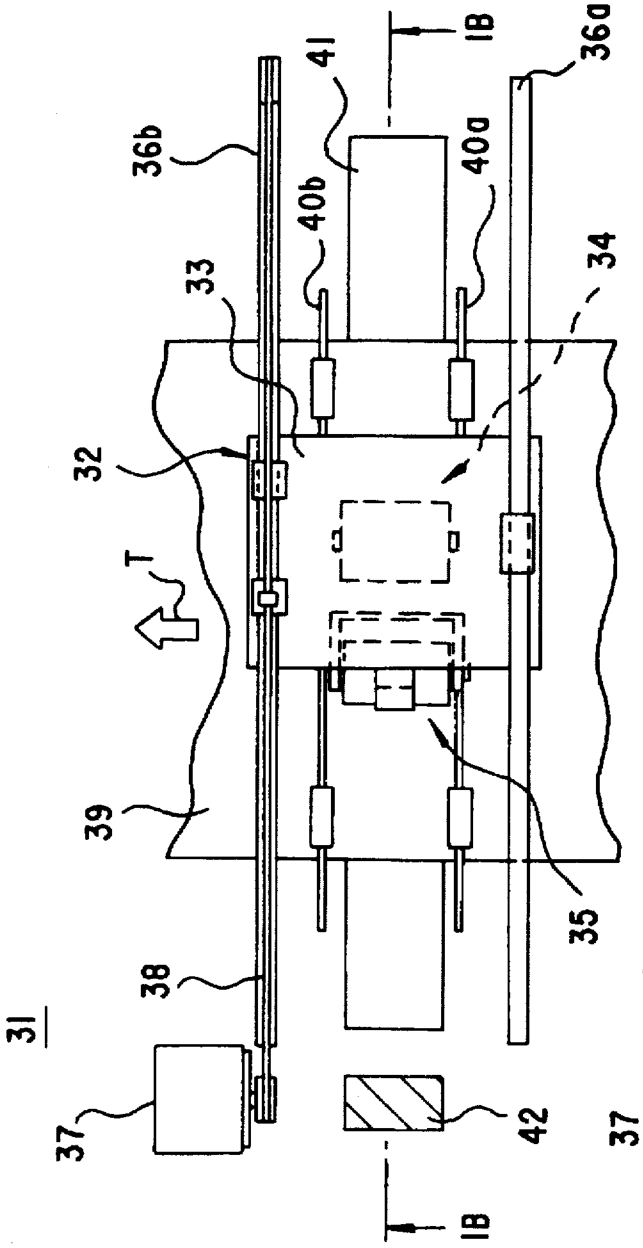
FIGS. 1A and 1B are top and cross-sectional views of an electrophotographic serial printer in a first embodiment of the present invention.
Figure 1B:
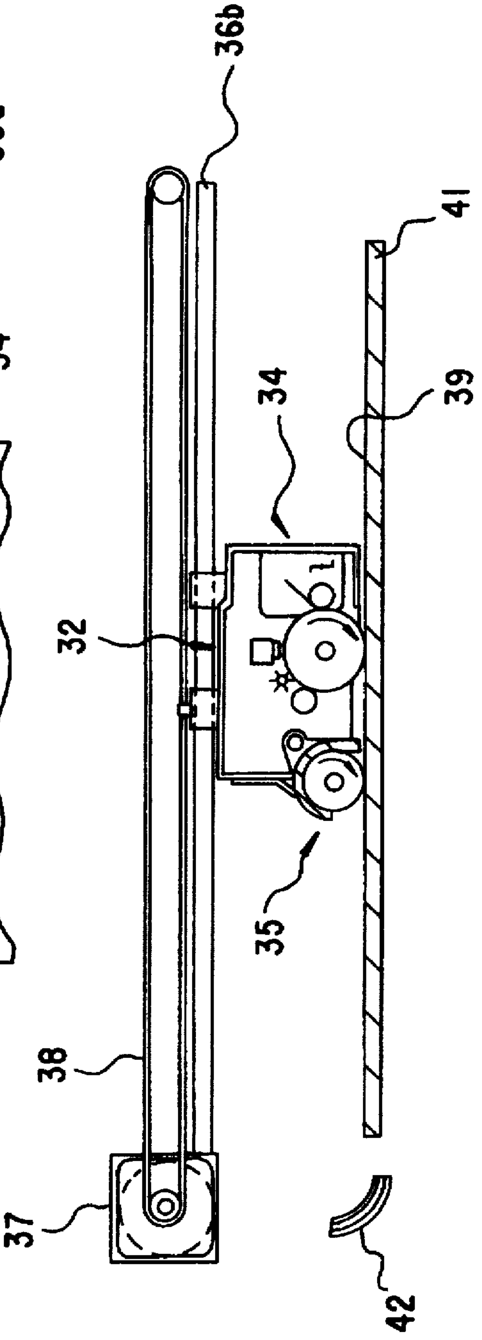
Figure 2A:
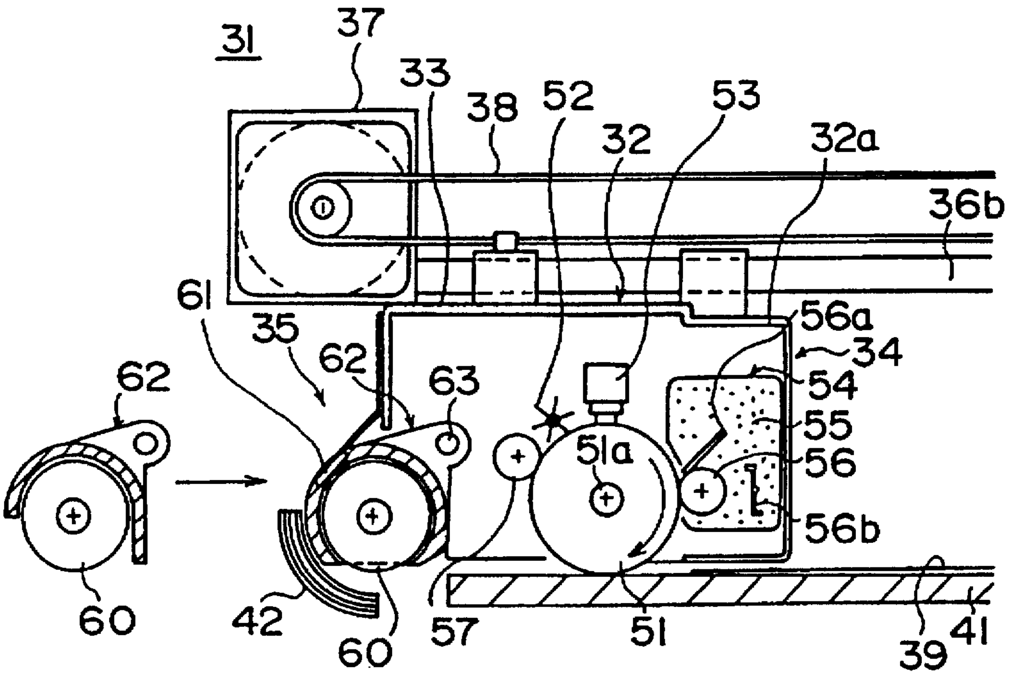
FIGS. 2A and 2B are enlarged cross-sectional views of a carriage unit of the printer in FIGS. 1A and 1B.
Figure 2B:
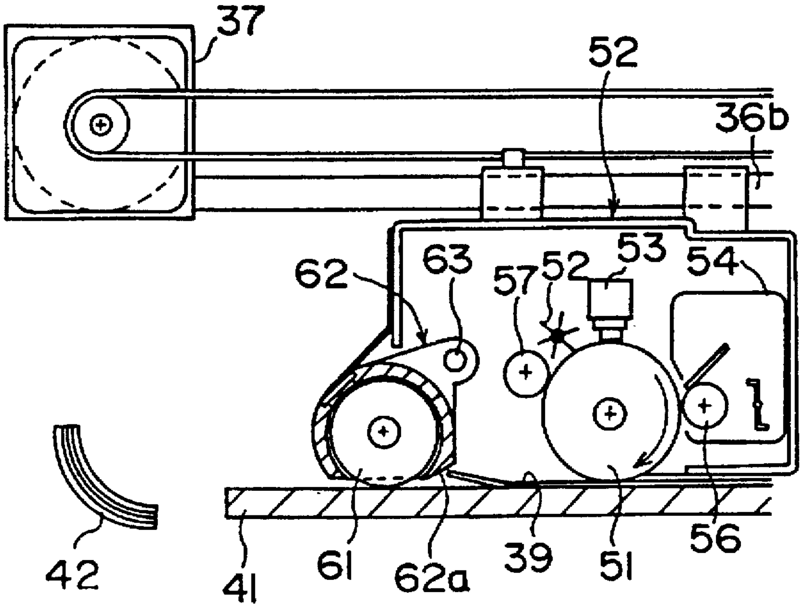

FIGS. 1A and 1B show an electrophotographic serial printer 31 in the first embodiment of the present invention. FIG. 1A is a top view of the printer 31. FIG. 1B is a cross-sectional view of the printer 31 taken along a line A—A in FIG. 1A. FIGS. 2A and 2B show a carriage unit 32 of the printer 31 in FIG. 1A.

The carriage unit 32 includes a slide member 33 which constitutes a frame of the carriage unit 32. In this electrophotographic serial printer 31, a processing unit 34 and a fixing unit 35 are arranged on the carriage unit 32.

The slide member 33 is movably supported by two guide shafts 36*a* and 36*b*. The guide shafts 36*a* and 36*b* extend in a transversal direction perpendicular to a sheet transport direction of a recording sheet 39. The sheet transport direction is indicated by an arrow T in FIG. 1A. A portion of the slide member 33 is fixed to a belt 38, and the belt 38 is rotated by a carriage motor 37 to move the slide member 33 along the guide shafts 36*a* and 36*b*. Thus, the carriage unit 32 is moved over the recording sheet 39 by the carriage motor 37 through the belt 38 in the transversal directions perpendicular to the sheet transport direction.

A transferring unit 41 which extends in the transversal direction in which the carriage unit 32 is moved is provided beneath the carriage unit 32. The recording sheet 39 is placed between the carriage unit 32 and the transferring unit 41 while it is transported.

This transferring unit 41 is made up of a substrate as a base portion and a heat-resistant conductive material as a surface portion. The surface portion of the transferring unit 41 is formed on the base portion on the side of the carriage unit 32. For example, the substrate is made of aluminum, and the heat-resistant conductive material is a silicon rubber mixed with a conductive substance. That is, the surface portion is made of this silicon rubber.

The processing unit 34 includes a rotary photosensitive drum 51 which is rotated during an operation of the printer 31. The photosensitive drum 51 includes a rotating shaft 51*a* extending in parallel with the sheet transport direction. The photosensitive drum 51 is rotated around the rotating shaft 51*a*. The circumferential surface of the photosensitive drum 51 is brought into contact with the recording sheet 39 against the transferring unit 41. A peripheral velocity of the photosensitive drum 51, when it is rotated relative to the recording sheet 39 on the transferring unit 41, is controlled to be in conformity with the moving speed of the carriage unit 32.

A charger 52, an exposure unit 53 and a developing unit 54 are arranged around the periphery of the photosensitive drum 51. The surface of the photosensitive drum 51 is uniformly charged by the charger 52.

The exposure unit 53 includes a light emitting diode (LED) which emits light toward the photosensitive drum 51. The exposure unit 53 exposes the photosensitive drum 51, whose surface is uniformly charged by the charging unit 52, to form an electrostatic latent image on the photosensitive drum 51. The latent image on the photosensitive drum 51 is turned into a developed image by a developing roller 56. This developed image is produced using a toner 55 contained in the developing unit 54, and it becomes visual as a toner image on the photosensitive drum 51.

The toner image on the photosensitive drum 51 is transferred to the recording sheet 39 by the transferring unit 41. The transferring of the toner image to the recording sheet 39 is carried out by generating a potential difference between the photosensitive drum 51 and the transferring unit 41.

A peripheral velocity of the developing roller 56 during the printing is controlled to be higher than the peripheral velocity of the photosensitive drum 51.

The developing unit 54 includes a blade 56*a* and a paddle 56*b*. The blade 56*a* serves to keep a thickness of the toner attaching to the developing roller 56 constant. The paddle 56*b* serves to agitate the toner 55 contained in the developing unit 54.

In addition, a cleaner 57 is arranged on the photosensitive drum 51, and this cleaner 57 includes a cleaning blade for removing the toner on the photosensitive drum 51 which remains there at the end of one cycle of the electrophotographic printing.

The fixing unit 35, arranged on the carriage unit 32, includes a fixing roller 60. The fixing roller 60 is made of a magnetic material, such as iron. The surface of this magnetic material is coated with a protective layer. A thermistor unit 61, which is used to detect a temperature of the fixing roller 60, is arranged at the fixing roller 60.

The fixing roller 60 is held by a holding member 62. The holding member 62 is made of a heat-resistant adiabatic resin material, such as polyphenylene sulfide (PPS).

The holding member 62 is shaped to be in conformity with the periphery of the fixing roller 60 so as to cover the fixing roller 60. This holding member 62 is formed through injection molding using the heat-resistant adiabatic resin material. A clearance between the holding member 62 and the fixing roller 60 is preset to about 1 mm. Thus, the holding member 62 serves to prevent the lowering of the temperature of the fixing roller 60 when the carriage unit 32 is moved away from a position at which the fixing roller 60 on the carriage unit 32 is heated.

The holding member 62 is attached to a frame 32*a* of the carriage unit 32 via a supporting shaft 63. The holding member 62 is arranged on the carriage unit 32 so that it is rotatable around the supporting shaft 63. The supporting shaft 63 is secured to the slide member 33 of the carriage unit 32. Thus, the fixing roller 60, held by the holding member 62, smoothly contacts the recording sheet 39 on the transferring unit 41.

In addition, as shown in FIG. 2B, the holding member 62 includes a taper portion 62*a* provided adjacent to the photosensitive drum 51. This tapered portion 62*a* is formed with chamfered corners. The tapered portion 62*a* serves to prevent an edge of the recording sheet 39 from interfering with the fixing roller 60. Thus, it is possible to prevent the occurrence of a paper jam even when the carriage unit 32 is moved in the transversal directions to the recording sheet 39 being curled.

In the above embodiment, an induction heating coil 42, which is used to heat the fixing roller 60 through an induction heating, is stationarily arranged adjacent to the fixing roller 60 when the carriage unit 32 is at a waiting position prior to a start of the printing. This waiting position is called a home position for the carriage unit 32. The induction heating coil 42 is separated from the fixing roller 60 when the carriage unit 32 is moved in the transversal directions during the printing.

The induction heating coil 42 is formed into an arched shape which is in conformity with the periphery of the fixing roller 60. The induction heating coil 42 includes turns of wire which generate magnetic flux when current flows through them. The magnetic flux from the induction heating coil 42 is applied to the fixing roller 60, thereby heating the fixing roller 60 to allow the developed image to be fixed to the recording sheet 39.

In the carriage unit 32 in the above embodiment, a retracting mechanism (not shown) is provided. This retracting mechanism raises the photosensitive drum 51 and the fixing roller 60 from the recording sheet 39 when the carriage unit 32 is moved to an end position of the printing for one line.

Figure 3:
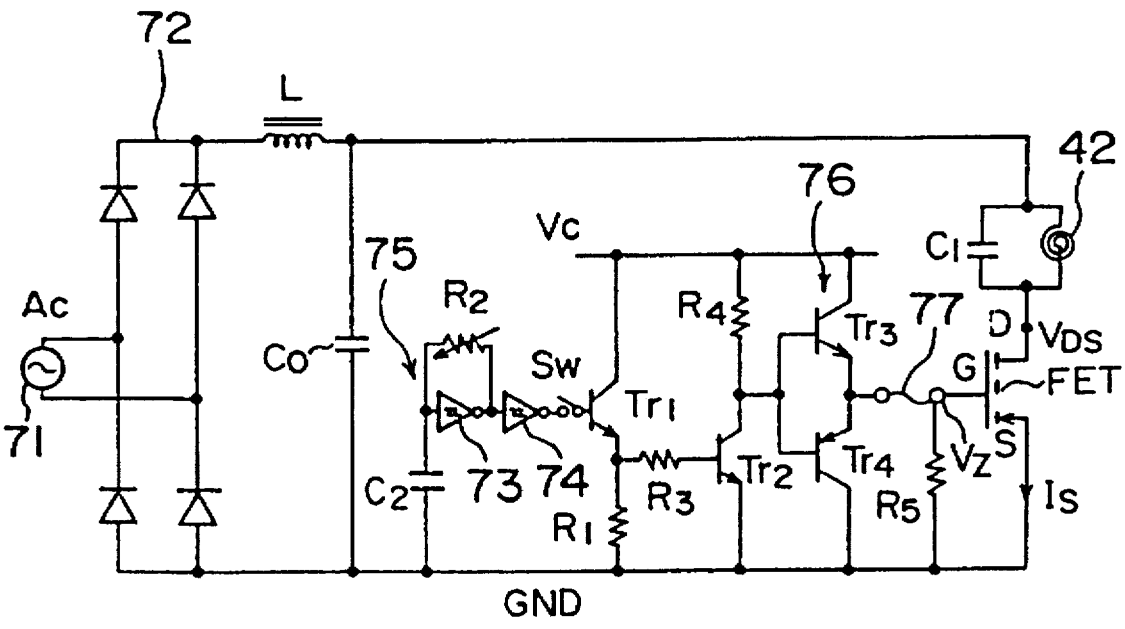
FIG. 3 is a circuit diagram showing a drive circuit which drives an induction heating coil.

FIG. 3 shows a drive circuit for driving the induction heating coil 42. In FIG. 3, this drive circuit includes a first closed loop which is comprised of a full-wave rectifier 72, a smoothing coil L, and a smoothing capacitor Co. An ac power supply 71 is connected to the rectifier 72 to input alternating current to the rectifier 72.

The drive circuit, as shown in FIG. 3, includes a second closed loop which is comprised of the smoothing capacitor Co, the induction heating coil 42 and a capacitor C1 in parallel, and a field-effect transistor FET.

In the drive circuit in FIG. 3, a source voltage Vc from a dc power supply (not shown) is applied to an input of an npn-type transistor Tr1. An output of the transistor Tr1 is connected to a grounded terminal GND via a resistor R1. Two Schmitt Trigger inverters 73 and 74 in series are connected to a base of the transistor Tr1 via a switch SW.

More specifically, an output of the inverter 74 is connected to the switch SW, and the switch SW is connected to the base of the transistor Tr1. An output of the inverter 73 is connected to an input of the inverter 74. An input of the inverter 73 is connected to the GND via a capacitor C2. A variable resistor R2 is connected to the input and output of the inverter 73.

In the drive circuit in FIG. 3, an oscillating circuit 75 is constituted by the inverter 73, the variable resistor R2 and the capacitor C2 described above. An oscillating signal (which is used to drive the induction heating coil 42) from the oscillating circuit 75 is sent to the base of the transistor Tr1 through the inverter 74 and the switch SW.

The oscillating circuit 75, the inverter 74 and the switch SW are external circuit elements which are externally connected to the drive circuit.

The switch SW is turned ON when current is supplied to the induction heating coil 42 to heat the fixing roller 60. The switch SW is turned OFF when the supply of the current to the induction heating coil 42 is cut off.

In the drive circuit in FIG. 3, the output of the transistor Tr1 is connected to a base of an npn-type transistor Tr2 via a resistor R3. The source voltage Vc is applied to an input of the transistor Tr2 via a resistor R4, and the input of the transistor Tr2 is connected to each of bases of an npn-type transistor Tr3 and an npn-type transistor Tr4. The source voltage Vc is applied to an input of the transistor Tr3. An output of the transistor Tr3 is connected to an input of the transistor Tr4. An output of the transistor Tr4 is connected to the GND.

In the drive circuit in FIG. 3, an inverter 76 is constituted by the two transistors Tr3 and Tr4. An output of this inverter 76 is connected to a gate G of the FET via a fuse 77. The gate G of the FET is connected to the GND via a resistor R5.

Drive pulses sent from the oscillating circuit 75 via the switch SW are supplied to the transistor FET through the inverter 76, so that the transistor FET is switched ON and OFF. Since an alternating current flows through the induction heating coil 42 and the capacitor C1 in parallel, a resonance takes place. A resonant frequency of this parallel circuit is determined based on an inductance of the induction heating coil 42 and a capacitance of the capacitor C1. For example, the resonant frequency of the parallel circuit when the fixing roller 60 is made of iron may be 20–40 kHz.

Changes of the directions of the current flowing through the induction heating coil 42 allow the fixing roller 60 to experience changes of the magnetic flux. Eddy currents, induced by the changes of the magnetic flux, flow through the fixing roller 60 against the resistance thereof, thereby heating the fixing roller 60.

When the induction heating coil 42 is heated to a high temperature, the fuse 77 in the drive circuit in FIG. 3 will melt to stop the supply of the current to the induction heating coil 42.

Whether or not the temperature of the fixing roller 60 is above a predetermined reference temperature (e.g., 180° C.) is detected by using the thermistor unit 61, and the result of the detection is used to control the ON/OFF of the switch SW to allow the fixing roller 60 to be heated to an appropriate temperature.

Figure 4A:
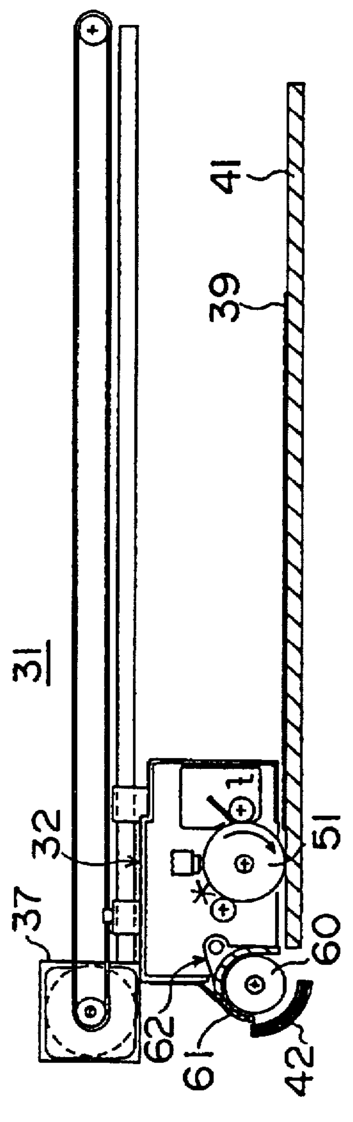
FIGS. 4A, 4B and 4C are diagrams for explaining a movement of the carriage unit in the printer in the first embodiment.
Figure 4B:
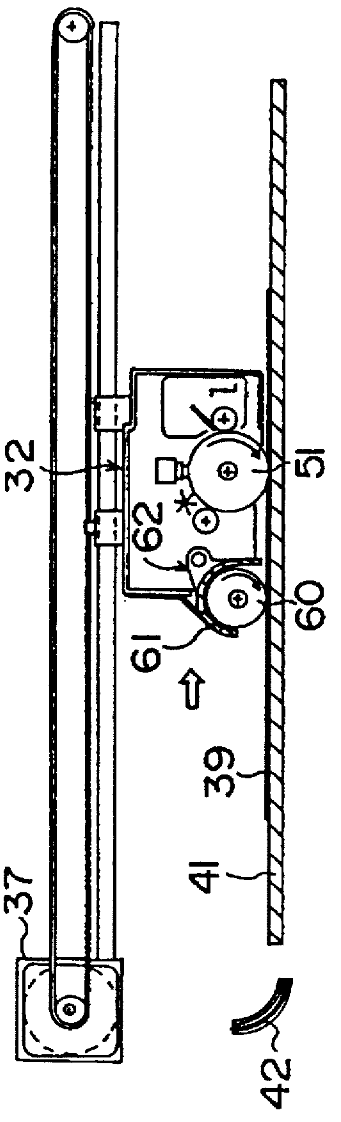
Figure 4C:
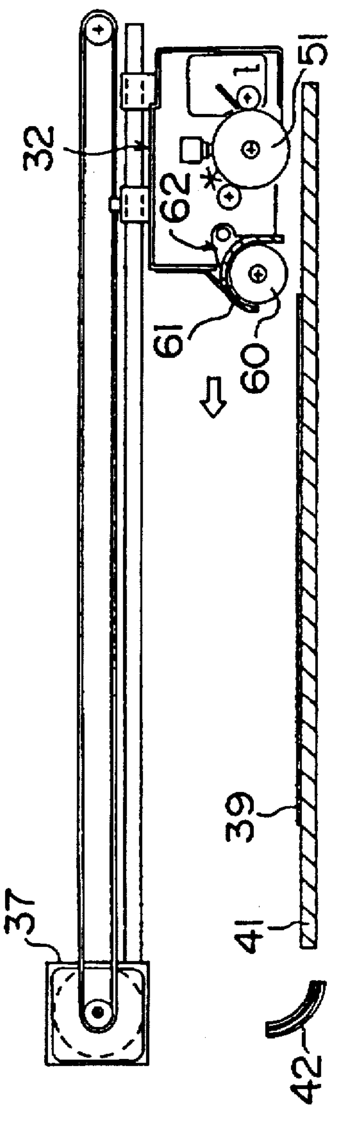

FIGS. 4A through 4C show a movement of the carriage unit 32 in the printer in FIGS. 1A and 1B.

In FIG. 4A, the carriage unit 32 is at the home position within the printer 31. At this time, the fixing roller 60 on the carriage unit 32 is located adjacent to the induction heating coil 42, and current is supplied to the induction heating coil 42 so that the fixing roller 60 is heated through the induction heating.

After it is detected by an output signal of the thermistor unit 61 that the temperature of the fixing roller 60 is above the reference temperature, the movement of the carriage unit 32 over the recording sheet 39 is started to carry out the printing. FIG. 4B shows the movement of the carriage unit 32 during the printing. The fixing roller 60 is brought into contact with the recording sheet 39 to fix the developed image to the recording sheet 39 after the developed image is transferred to the recording sheet 39.

When the carriage unit 32 is moved to an end position of the printing for one line, the carriage unit 32 is set at a raised condition in which the carriage unit 32 lies slightly above the recording sheet 39. The carriage unit 32 returns back to a starting position of the printing for a subsequent line. The recording sheet 39 is transported in the sheet transport direction by a predetermined distance. FIG. 4C shows this movement of the carriage unit 32.

After the reciprocating movements of the carriage unit 32 over the recording sheet 39 are finished, the carriage unit 32 returns back to the home position. As the temperature of the fixing roller 60 is lowered during the printing, the fixing roller 60 when the carriage unit is at the home position is heated by the induction heating coil 42 again.

The fixing roller 60 in the above embodiment is always held and covered by the holding member 62. The holding member 62 is made of the heat-resistant adiabatic resin material. Therefore, the holding member 62 serves to prevent the lowering of the temperature of the fixing roller 60. This makes it possible to reduce the energy used at the induction heating coil 42 to heat the fixing roller 60 to a high temperature appropriate for carrying out the printing for a subsequent line.

Since the induction heating coil 42 heats the fixing roller 60 through the induction heating, it is not necessary to take into account a problem that the holding member 62 between the induction heating coil 42 and the roller 60 may lower the efficiency of the heating of the fixing roller 60. For this reason, a holding member which covers the entire fixing roller 60 is usable, instead of the holding member 62 in the above embodiment, in order to increase the ability to keep the fixing roller 60 at a high temperature.

Figure 5A:
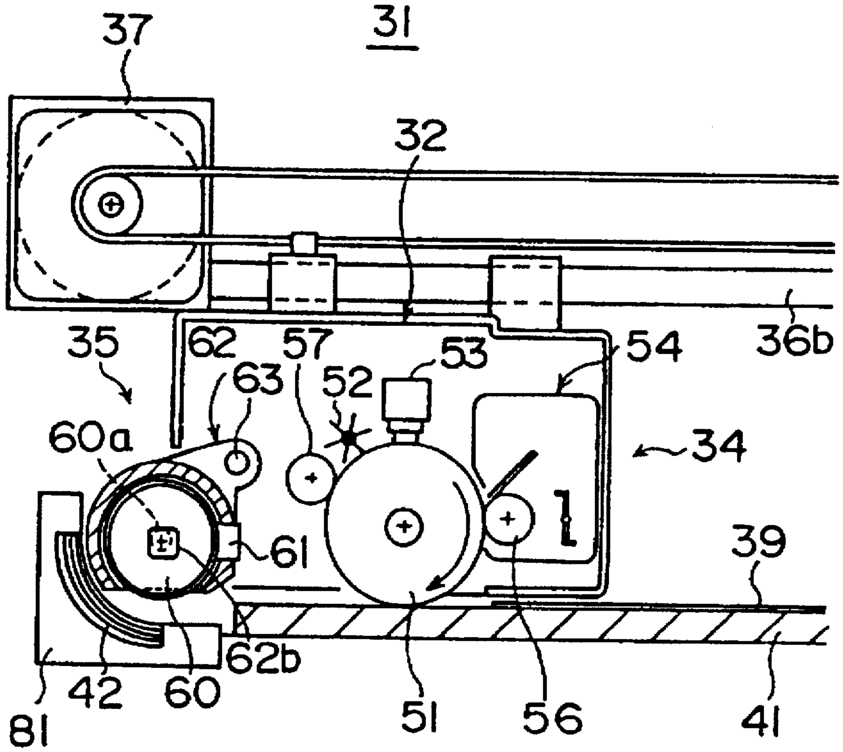
FIGS. 5A and 5B are diagrams showing a guide member which holds the induction heating coil.
Figure 5B:
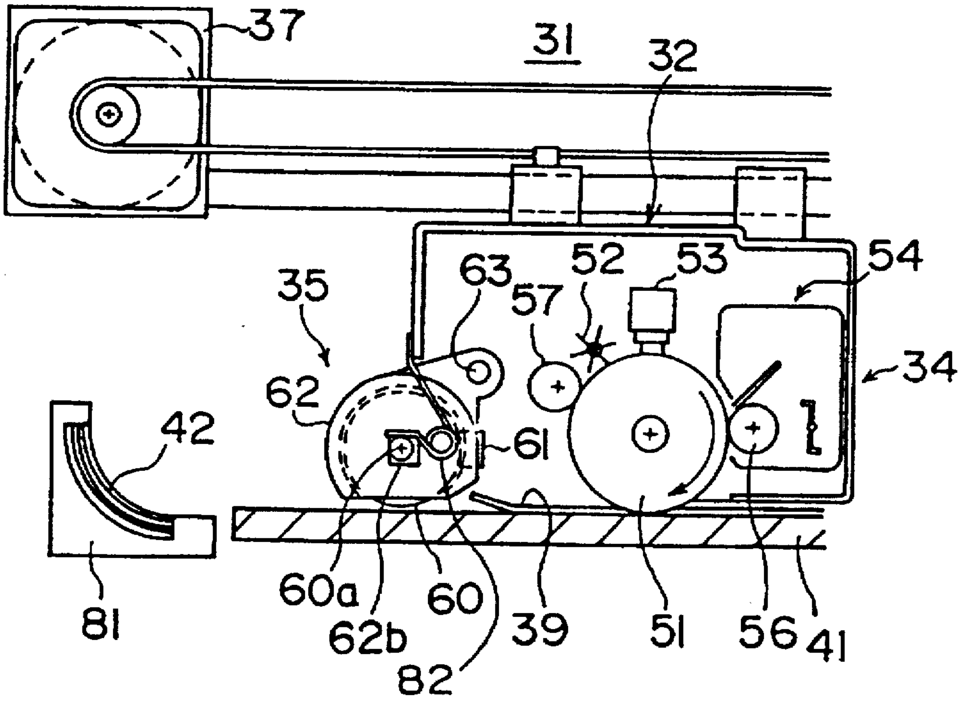

FIGS. 5A and 5B show a guide member 81 for holding the induction heating coil 42. In FIGS. 5A and 5B, the guide member 81 is made of a heat-resistant adiabatic resin material such as PPS.

When the induction heating coil 42 is driven by the drive circuit in FIG. 3, approximately 1–2 amperes of current flow through the induction heating coil 42, and the temperature of the induction heating coil 42 is raised to 100°–200° C.

The guide member 81 which is made of the heat-resistant resin material (PPS) serves to reduce the influences of heat produced at the induction heating coil 42 over the elements of the carriage unit 32. Also, the guide member 81 serves to accurately position the induction heating coil 42 on the printer 31.

The holding member 62 includes rectangular holes **62*b*, and these holes 62*b* are used to hold the fixing roller 60 at both ends of a longitudinal rotating shaft 60*a* of the fixing roller 60. The width of the rectangular holes 62*b* is slightly greater than the diameter of the rotating shaft 60*a*, and the rotating shaft 60*a* of the fixing roller 60 is loosely fitted in the rectangular holes 62*b* of the holding member 62**.

Torsion springs 82 are arranged on the holding member 62 at both ends of the rotating shaft **60*a* to press down the fixing roller 60 against the transferring unit 41 under a predetermined downward pressure. The rectangular holes 62*b* and the rotating shaft 60*a* have a point contact. A peripheral velocity of the fixing roller 60 during the printing is stably controlled to be in conformity with the peripheral velocity of the photosensitive drum 51**.

Figure 6A:
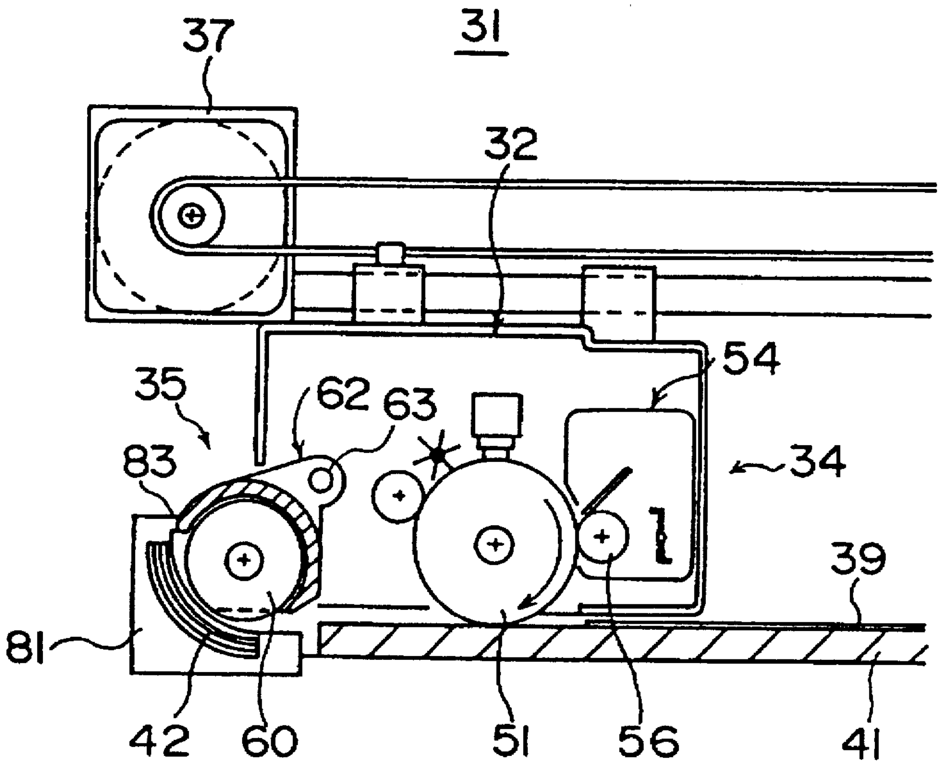
FIGS. 6A and 6B are diagrams showing a projection provided on the guide member in FIGS. 5A and 5B.
Figure 6B:
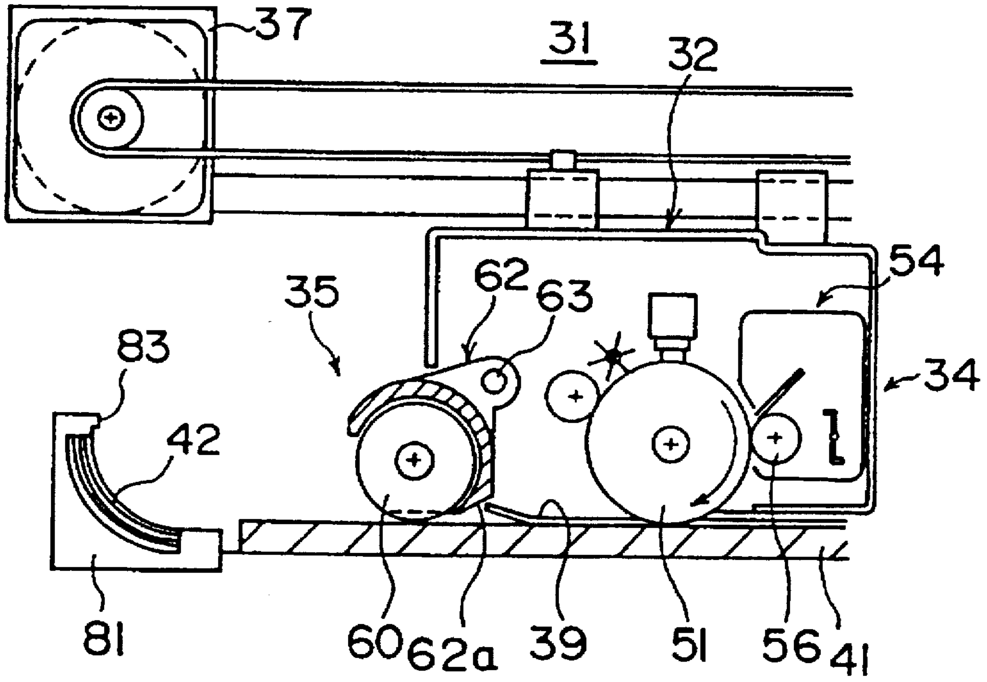

FIGS. 6A and 6B show a projection 83 provided on the guide member 81 to limit the movement of the carriage unit 32 at a predetermined position. In FIGS. 6A and 6B, the other parts are the same as corresponding parts of the embodiment in FIGS. 5A and 5B.

This projection 83 is formed at a top side wall of the guide member 81 which holds the induction heating coil 42, and it extends toward the carriage unit 32. A leading end of the holding member 62 on the carriage unit 32 strikes the projection 83 when the carriage unit 32 returns back to the home position, so that the movement of the carriage unit 32 is safely limited by the projection 83.

If the fixing roller 60 on the carriage unit 32 should interfere with the induction heating coil 60 when the carriage unit 32 returns back to the home position, the surface of the fixing roller 60 would be damaged, and a defective image may be produced by the printing apparatus 31 due to the damage of the fixing roller 60. Thus, the projection 83 prevents the fixing roller 60 on the carriage 32 from interfering with the induction heating coil 42 when the carriage unit 32 returns back to the home position.

Figure 7A:
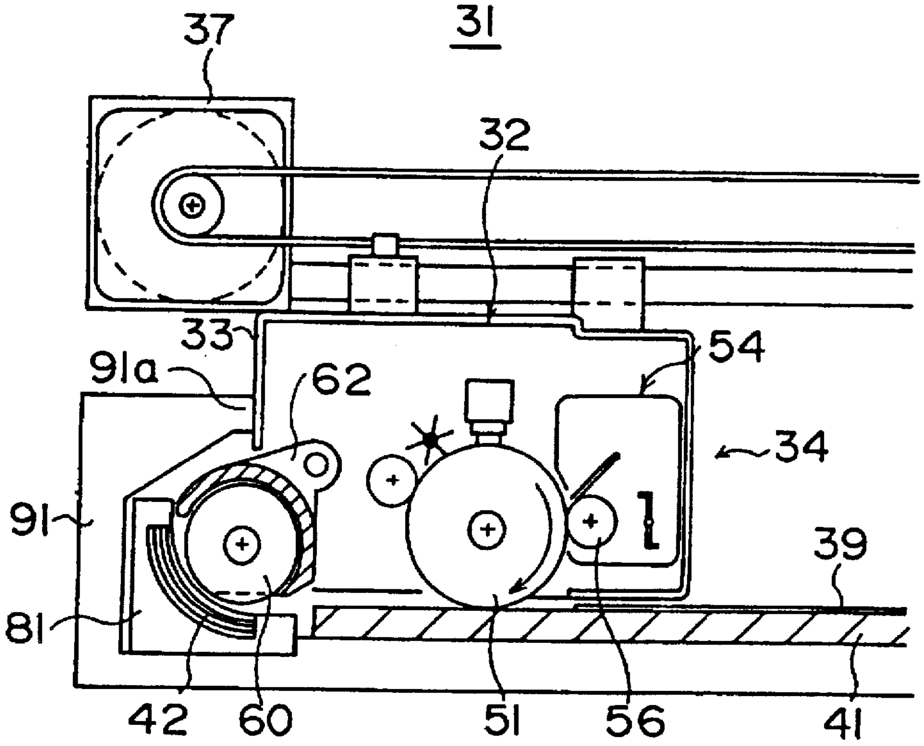
FIGS. 7A and 7B are diagrams showing a carriage stopper which limits the movement of the carriage unit in the printer.
Figure 7B:
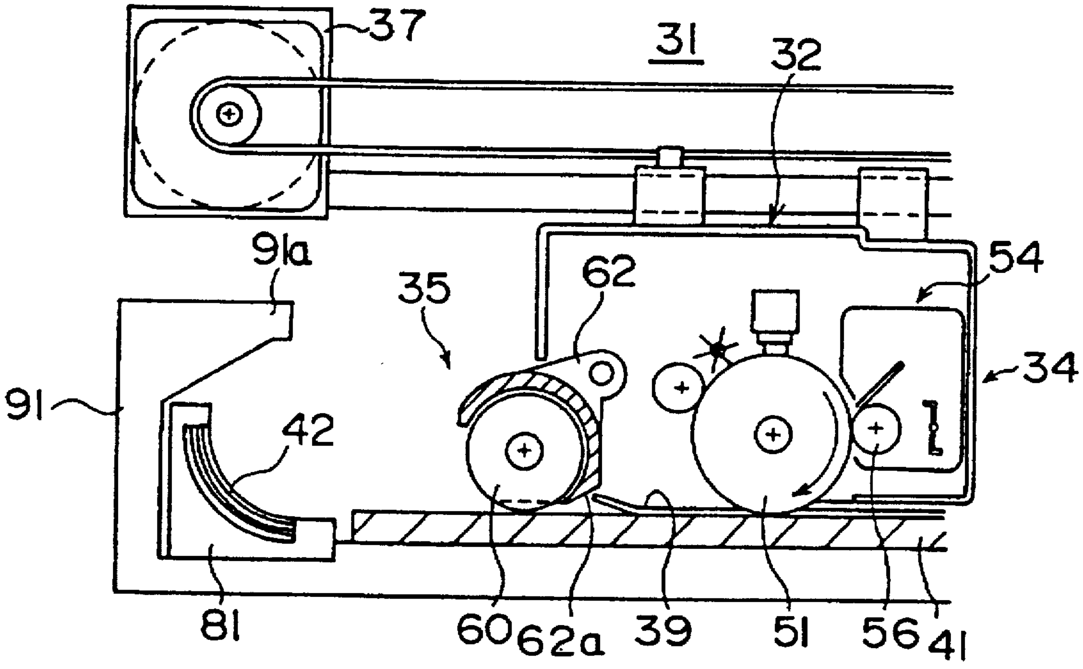

FIGS. 7A and 7B show a carriage stopper 91*a* provided on a frame 91 of the printing apparatus 31 in FIGS. 5A and 5B. In FIGS. 7A and 7B, the other parts are the same as corresponding parts in FIGS. 5A and 5B.

In FIGS. 7A and 7B, the carriage unit 32, the carriage motor 37, the transferring unit 41 and the induction heating coil 42 are arranged on the frame 91. The frame 91 is stationarily arranged on the printing apparatus 31, and the carriage stopper 91*a* is formed integrally with the frame 91 to limit the movement of the carriage unit 32 at a predetermined position. The slide member 33 on the carriage unit 32 strikes the carriage stopper 91*a* when the carriage unit 32 returns back to the home position, and the carriage stopper 91*a* serves to maintain a clearance between the induction heating coil 42 and the fixing roller 60. Thus, the carriage stopper 91*a* prevents the fixing roller 60 from interfering with the induction heating coil 60 even when the carriage unit 32 returns back to the home position.

Figure 8A:
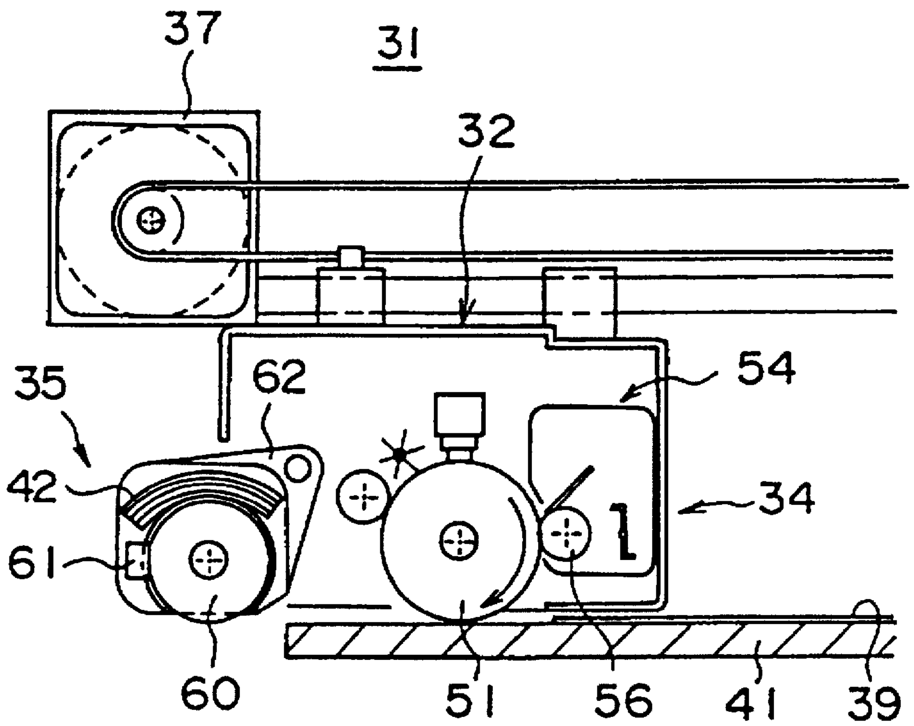
FIGS. 8A and 8B are diagrams showing an induction heating coil which is provided within the carriage unit.
Figure 8B:
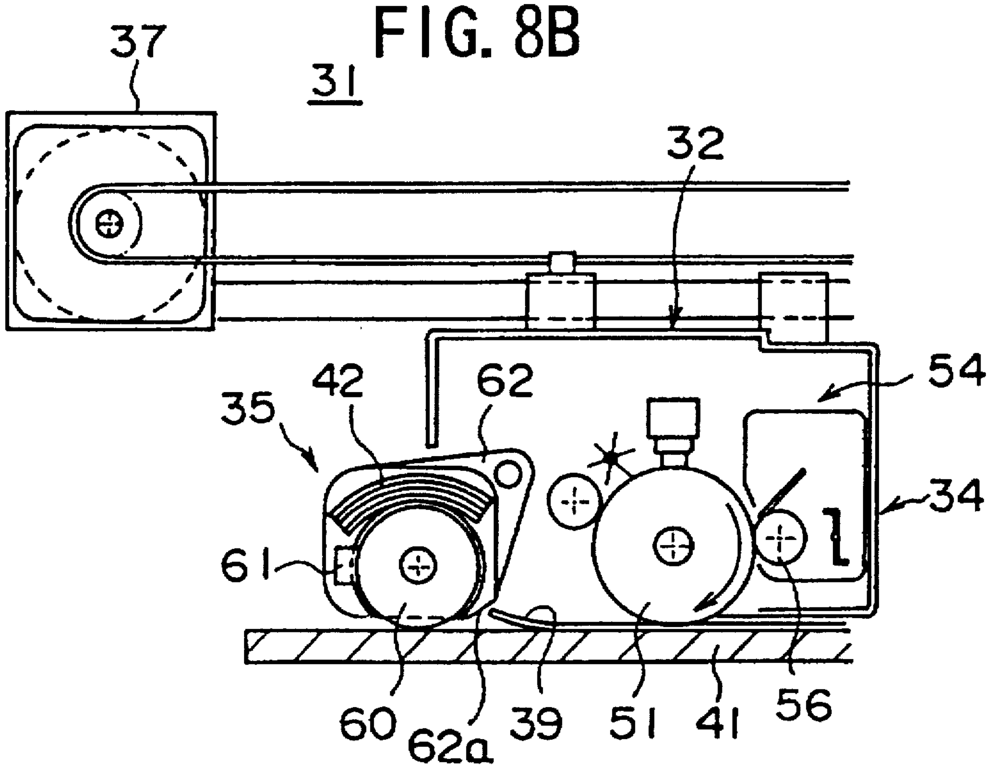

FIGS. 8A and 8B show an induction heating coil 42 which is provided within the carriage unit 32. In FIGS. 8A and 8B, the induction heating coil 42 is arranged on the holding member 62 for holding the fixing roller 60. The induction heating coil 42 is arranged adjacent to the fixing roller 60. As described above, the holding member 62 is made of the heat-resistant adiabatic resin material such as PPS, and it is attached to the frame of the carriage unit 32.

In FIGS. 8A and 8B, the other parts are the same as corresponding parts of the first embodiment in FIGS. 1A and 1B.

Whether or not the temperature of the fixing roller 60 is above a predetermined reference temperature (e.g., 180° C.) is detected by using the thermistor unit 61, and the result of the detection is used to control the ON/OFF of the switch SW of the drive circuit. When the temperature of the fixing roller 60 is detected to be above the reference temperature, the fixing roller 60 is quickly heated by the induction heating coil 42 to a high temperature appropriate for carrying out the printing. As it is possible to keep the fixing roller 60 at an appropriate temperature, the above embodiment can prevent the occurrence of a defective image due to insufficient fixing. Especially, the above embodiment is useful when an image is printed on a recording sheet whose width is relatively large (for example, an A3 size recording sheet).

In the above embodiment, the holding member 62 serves to hold the fixing roller 60 and always prevent the lowering of the temperature of the fixing roller 60. It is necessary for the holding member 62 to keep the fixing roller 60 at a high temperature appropriate for carrying out the printing.

Figure 9A:
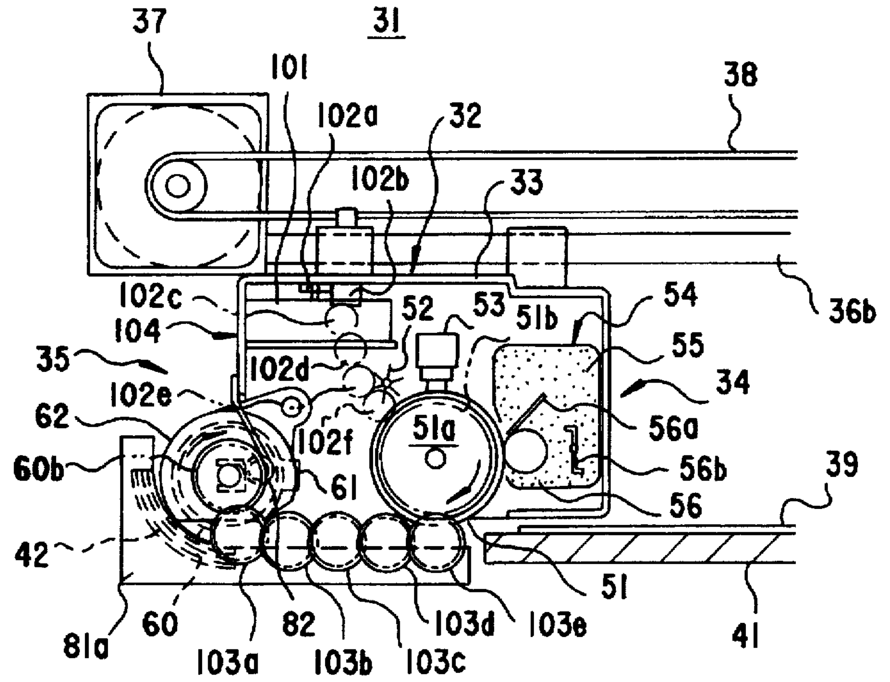
FIGS. 9A and 9B are diagrams showing an electrophotographic serial printer in a second embodiment of the present invention.
Figure 9B:
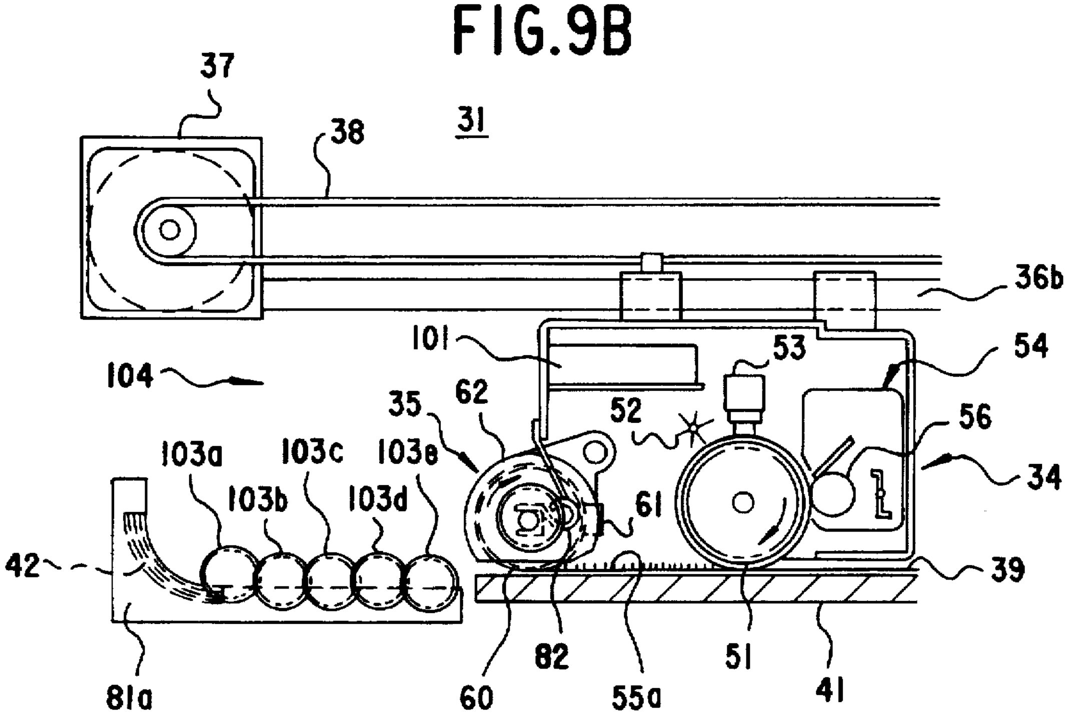

FIGS. 9A and 9B show an electrophotographic serial printer in a second embodiment of the present invention. In FIGS. 9A and 9B, the parts which are the same as corresponding parts in FIGS. 1A and 1B are designated by the same reference numerals, and a description thereof will be omitted.

In FIGS. 9A and 9B, the carriage unit 32 of the printer 31 in this embodiment when it is located near the home position is shown. Also, in FIGS. 9A and 9B, a process motor 101 which rotates the photosensitive drum 51 and is arranged within the carriage unit 32 is shown. This process motor 101 has been omitted in the first embodiment and it is not shown in FIGS. 2A and 2B.

A gear 102*a* is connected to a rotating shaft of the process motor 101. A rotating force from the process motor 101 is transmitted from the gear 102*a* to a drum gear 51*b* of the photosensitive drum 51 through a set of gears (which are engaged with the gear 102*a* but not shown in FIGS. 9A and 9B), a bevel gear 102*b*, and a set of gears 102*c*, 102*d*, 102*e* and 102*f* which are engaged with the drum gear 51*b*. A process rotating unit for rotating the photosensitive drum 51 on the carriage unit 32 is constituted by the process motor 101, the gear 102*a*, the bevel gear 102*b* and the gears 102*c*–102*f*.

The rotating force from the process motor 101 is also transmitted to the developing roller 56 through the drum gear 51*b* and another train of gears (not shown in FIGS. 9A and 9B) to rotate the developing roller 56 during the printing. Further, the rotating force from the process motor 101 is also transmitted to the paddle 56*b* through the drum gears 51*b* and still another train of gears (not shown in FIGS. 9A and 9B) to rotate the paddle 56*b*.

In the second embodiment in FIGS. 9A and 9B, a guide member 81*a* for holding the induction heating coil 42 (which is different from the guide member 81 in FIGS. 5A and 5B) is provided. This guide member 81*a* includes an extended portion which extends from the induction heating coil 42 toward the transferring unit 41. On the extended portion of the guide member 81*a*, a plurality of gears (for example, five gears 103*a* through 103*e* in FIGS. 9A and 9B) which are engaged with each other are arranged. A roller gear 60*b* is arranged on the rotating shaft of the fixing roller 60, and the fixing roller 60 is rotated when this roller gear 60*b* is rotated. A rotating unit for rotating the fixing roller 60 when the carriage unit 32 is at the home position is constituted by the photosensitive drum 51, the gears 103*a*–103*e*, and the roller gear 60*b*.

A distance between the gear 103*a* and the gear 103*e* is made equal to a distance between the fixing roller 60 and the photosensitive drum 51, so that the roller gear 60*b* of the fixing roller 60 and the drum gear 51*b* of the photosensitive drum 51 are engaged with the gear 103*a* and the gear 103*e*, respectively, when the carriage unit 32 is at the home position. The fixing roller 60 on the carriage unit 32 at this time is adjacent to the induction heating coil 42. Thus, when the induction heating coil 42 is driven, the fixing roller 60 is heated by the induction heating coil 42.

In the second embodiment in FIGS. 9A and 9B, a carriage sensor 104 which detects whether or not the carriage unit 32 is at the home position is provided. The other parts in the second embodiment are the same as corresponding parts in the first embodiment in FIGS. 2A and 2B.

When the carriage sensor 104 detects that the carriage unit 32 lies at the home position, the induction heating coil 42 is driven by the drive circuit, so that the fixing roller 60 is heated by the induction heating coil 42. At the same time, the rotation of the process motor 101 is started. The rotating force from the process motor 101 is transmitted to the photosensitive drum 51 through the gears 102*a*–102*f* and the drum gear 51*b* to rotate the photosensitive drum 51, and the rotating force from the photosensitive drum 51 is transmitted to the fixing roller 60 through the gears 103*a*–103*e* and the roller gear 60*b* to rotate the fixing roller 60.

Accordingly, in the above-described second embodiment, the rotation of the fixing roller 60 and the heating of the fixing roller 60, when the carriage unit 32 is at the home position, are carried out at the same time, and it is possible to keep the entire fixing roller 60 uniformly at a high temperature appropriate for carrying out the printing. As it is detected by using the thermistor unit 61 that the temperature of the fixing roller 60 is increased above the reference temperature, the movement of the carriage unit 32 is started, as shown in FIG. 9B. The developed image is fixed to the recording sheet 39 by the fixing roller 60 after the developed image using the toner 55*a* is transferred to the recording sheet 39.

After the printing for one line is finished, the carriage unit 32 at the end of the printing is set at the raised condition, and then returns back to the home position. When the carriage unit 32 is at the home position as shown in FIG. 9A, the fixing roller 60 is heated to an appropriate fixing temperature by the induction heating coil 42 while it is rotated by the rotating unit. This procedure is repeated.

Figure 10A:
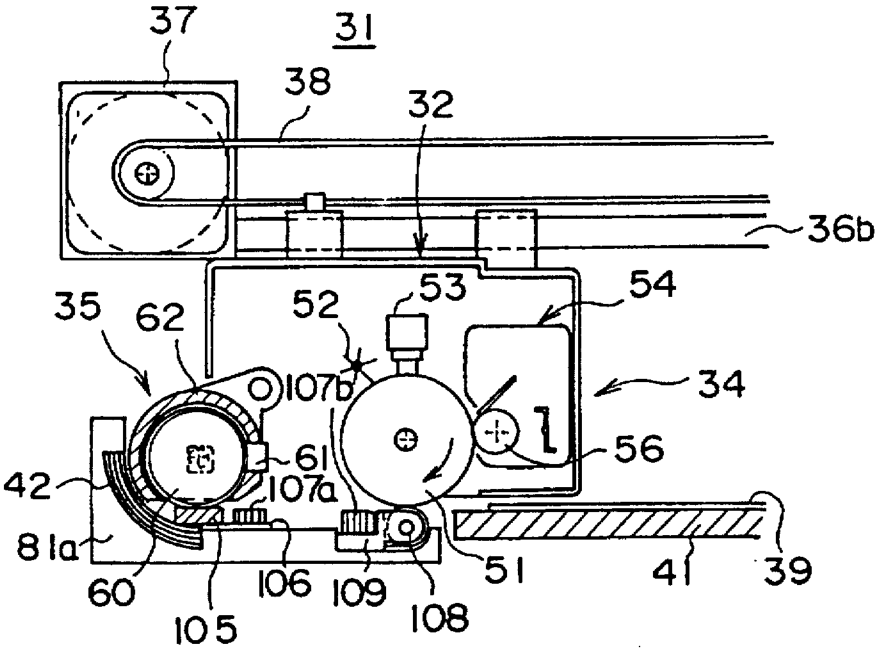
FIGS. 10A and 10B are diagrams showing another electrophotographic serial printer in the second embodiment.
Figure 10B:
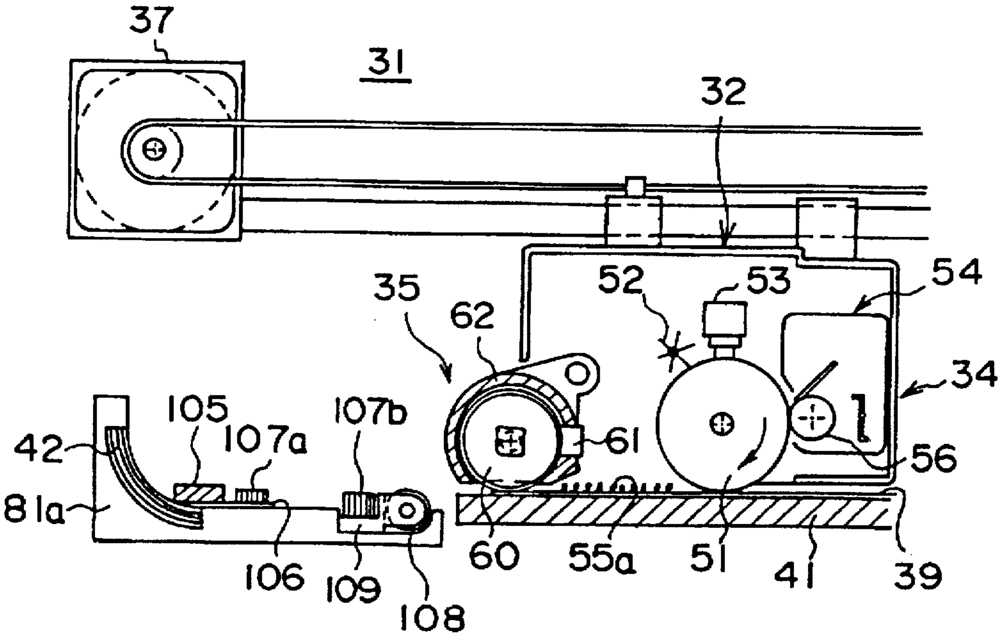

FIGS. 10A and 10B show another electrophotographic serial printer in the second embodiment of the present invention. In FIGS. 10A and 10B, the process motor 101, the gears 102*a*–102*f*, the gears 103*a*–103*e* and the carriage sensor 104, shown in FIGS. 9A and 9B, are omitted for the sake of convenience.

In the second embodiment in FIGS. 10A and 10B, a roller cleaning unit 105, which serves to clean the fixing roller 60 when the carriage unit 32 is at the home position, is detachably attached to the guide member 81*a*. The roller cleaning unit 105 is secured to a heat-resistant plate 106, and the roller cleaning unit 105 on the heat-resistant plate 106 is detachably attached to the guide member 81*a* by using a thumb screw 107*a*. The roller cleaning unit 105 is made of a felt and is longer than a longitudinal length of the fixing roller 60.

In the second embodiment in FIGS. 10A and 10B, a drum cleaning unit 108, which serves to clean the photosensitive drum 51 when the carriage unit 32 is at the home position, is detachably attached to the guide member 81*a*. The drum cleaning unit 108 is secured to a heat-resistant plate 109, and the drum cleaning unit 108 on the heat-resistant plate 109 is detachably attached to the guide member 81*a* by using a thumb screw 107*b*.

This drum cleaning unit 108 is, for example, a cleaning roller whose surface is formed with a foam rubber lining. A bias potential whose polarity is opposite to the charging polarity of the photosensitive drum 51 is applied to the drum cleaning unit 108, and the toner remaining on the photosensitive drum 51 is attracted by the drum cleaning unit 108 to clean the photosensitive drum 51 when the carriage unit 32 is at the home position.

When the carriage unit 32 is at the home position, the drum cleaning unit 108 is connected to the gear 103*e* (shown in FIGS. 9A and 9B), and the photosensitive drum 51 and the drum cleaning unit 108 are brought in contact. The drum cleaning unit 108 at this time is rotated due to the rotation of the photosensitive drum 51 in a rotating direction. This rotating direction is the same as the rotating direction of the photosensitive drum 51.

As shown in FIG. 10A, when the carriage unit 32 is at the home position, the roller cleaning unit 105 and the fixing roller 60 are brought into contact, and the drum cleaning unit 108 and the photosensitive drum 51 are brought into contact. The photosensitive drum 51 is rotated through the rotating force from the process motor 101, and the fixing roller 60 is rotated through the gears 103*a*–103*e* and the rotation of the photosensitive drum 51. Also, the cleaning roller of the drum cleaning unit 108 is rotated by the rotation of the photosensitive drum 51.

The surface of the fixing roller 60 is cleaned by the roller cleaning unit 105. At the same time, the surface of the photosensitive drum 51 is cleaned by the drum cleaning unit 108 to remove the remaining toner on the photosensitive drum 51. The fixing roller 60 is heated to an appropriate fixing temperature by the induction heating coil 42.

After the cleanings of the fixing roller 60 and the photosensitive drum 51 are finished, the movement of the carriage unit 32 is started. The developed image, formed with the toner 55*a* from the developing unit 54, is fixed to the recording sheet 39 by the fixing roller 60 after it is transferred from the photosensitive drum 51 to the recording sheet 39.

The photosensitive drum 51 and the fixing roller 60 may be run over the transferring unit 41 by the movement of the carriage unit, even when no recording sheet 39 is on the transferring unit 41. Also, in such a case, the roller cleaning unit 105 cleans the fixing roller 60 and the drum cleaning unit 108 cleans the photosensitive drum 51 to remove each foreign matter on the fixing roller 60 and the photosensitive drum 51. Therefore, the above second embodiment can prevent the occurrence of a defective image due to insufficient fixing or insufficient transferring.

Figure 11A:
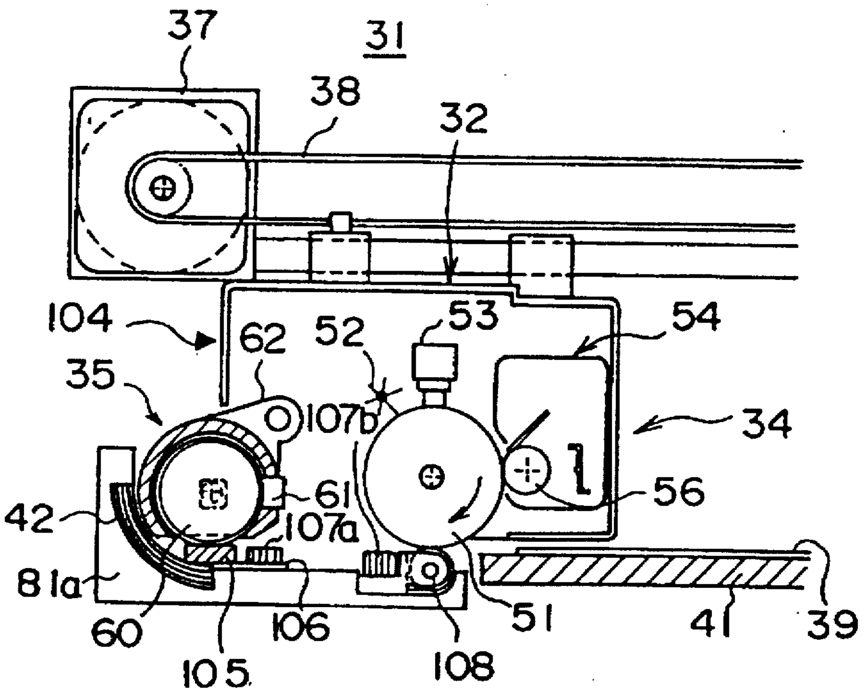
FIGS. 11A and 11B are diagrams showing a roller cleaning unit and a drum cleaning unit which are detachably attached to the printer in the second embodiment.
Figure 11B:
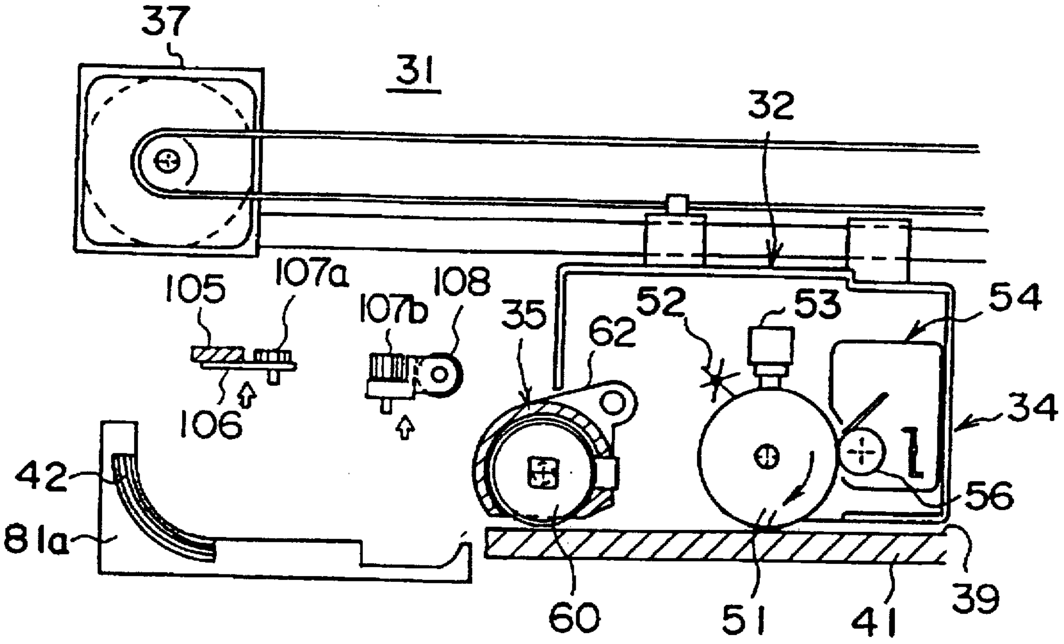

FIGS. 11A and 11B show a roller cleaning unit and a drum cleaning unit which are detachably attached to the printer in the second embodiment.

For the sake of convenience, the electrophotographic serial printer 31 in the embodiment in FIG. 11A is the same as that in the second embodiment in FIG. 10A, and FIG. 11B shows the roller cleaning unit 105 and the drum cleaning unit 108 which are detached from the guide member 81*a* of the printer 31. As shown in FIG. 11B, the roller cleaning unit 105 and the drum cleaning unit 108 can be detached from the guide member 81*a* by loosening the thumb screws 107*a* and 107*b*.

When a power switch of the printer 31 is OFF, the carriage unit 32 is set at the raised condition as shown in FIG. 11B. When the printer 31 is in this condition, the user can easily change the roller cleaning unit 105 and the drum cleaning unit 108 by removing them from the guide member 81*a*.

When the roller cleaning unit 105 and the drum cleaning unit 108 are changed by new units and the power switch is turned ON, the carriage unit 32 is at the home position as shown in FIG. 11A. The carriage sensor 104 detects that the carriage unit 32 is at the home position, and the above-described cleaning procedures are carried out by the new roller cleaning unit 105 and the new drum cleaning unit 108 after the detection is made by the carriage sensor 104.

Figure 12A:
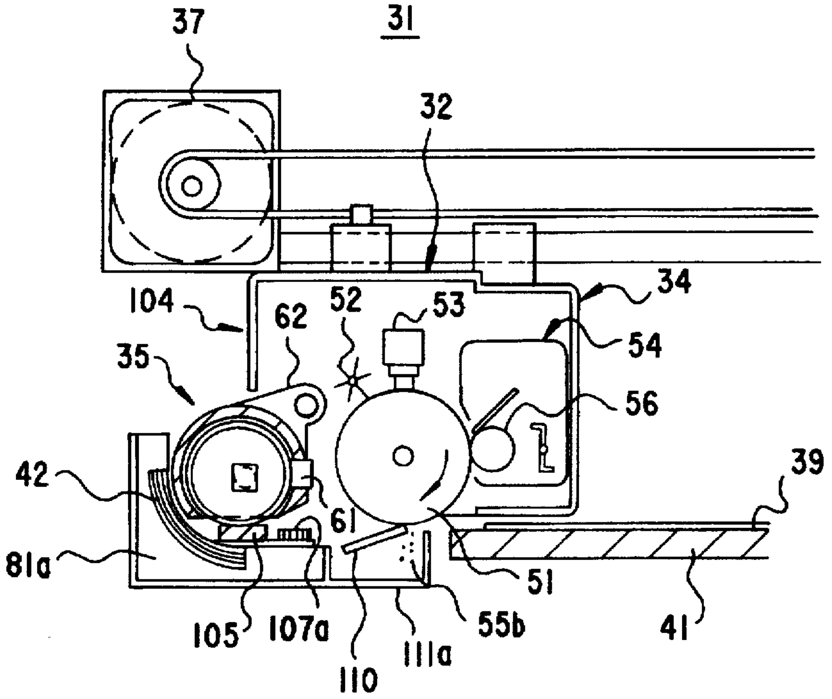
FIGS. 12A and 12B are diagrams showing a drum cleaning blade and a toner box which are provided in the printer in the second embodiment.
Figure 12B:
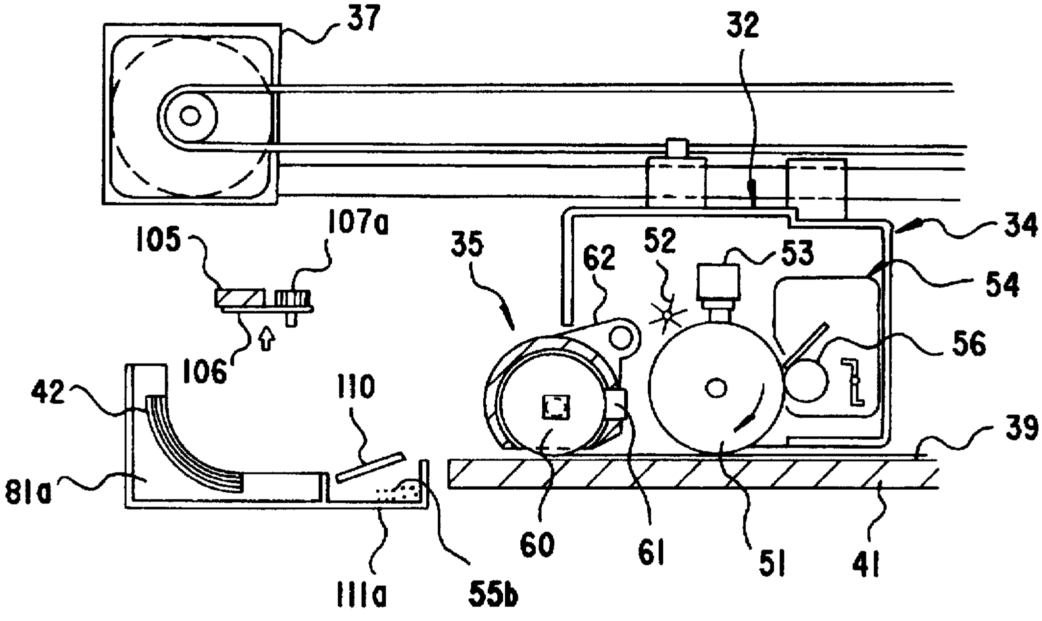

FIGS. 12A and 12B show a drum cleaning blade 110 and a toner box 111*a* which are provided in the printer 31 in the second embodiment. In FIGS. 12A and 12B, the drum cleaning blade 110 and the toner box 111*a* are provided to substitute for the drum cleaning unit 108 shown in FIGS. 10A and 10B. The other parts in FIGS. 12A and 12B are the same as corresponding parts in FIGS. 10A and 10B.

In the second embodiment in FIGS. 12A and 12B, when the carriage unit 32 is at the home position, the photosensitive drum 51 and the drum cleaning blade 110 are brought into contact, and the drum cleaning blade 110 serves to clean the photosensitive drum 51 by removing the remaining toner thereon. The toner box 111*a* serves to store the toner, removed by the drum cleaning blade 110, within a chamber of the toner box 111*a*.

The toner box 111*a* is made of a conductive metal material such as aluminum, iron or stainless steel. The toner box 111*a* is heated due to the magnetic flux from the induction heating coil 42 which heats the fixing roller 60 through the induction heating, and the temperature of the toner box 111*a* is also increased when the fixing roller 60 is heated.

In the second embodiment in FIGS. 12A and 12B, the guide member 81*a* is made of the same material as the toner box 111*a*, that is, aluminum, iron or stainless steel. The guide member 81*a* can protect the human being from being exposed to high-frequency noises produced by the induction heating coil 42.

When the carriage unit 32 is at the home position as shown in FIG. 12A, the fixing roller 60 and the roller cleaning unit 105 are brought into contact, and the photosensitive drum 51 and the drum cleaning blade 110 are brought into contact under a certain pressure. At this time, the photosensitive drum 51 and the fixing roller 60 are rotated by the rotating force from the process motor 101. The surface of the fixing roller 60 is cleaned by the roller cleaning unit 105, and at the same time a toner 55*b* on the photosensitive drum 51 is removed by the drum cleaning blade 110. The toner 55*b* removed by the drum cleaning blade 110 is stored within the toner box 111*a*.

Furthermore, when the carriage unit 32 is at the home position, the induction heating coil 42 is driven to heat the fixing roller 60, and the toner box 111*a* is also heated by the induction heating coil 42. Generally, when the temperature of the toner is above a transition point (about 60° C.), a powder form of the toner changes to a solid form. Thus, the stored toner within the toner box 111*a* changes to the solid form when the toner box 111*a* is heated above the transition point. Thus, it is possible to prevent the scattering of the toner from the toner box 111*a* upon the disposal of the stored toner.

Figure 13A:
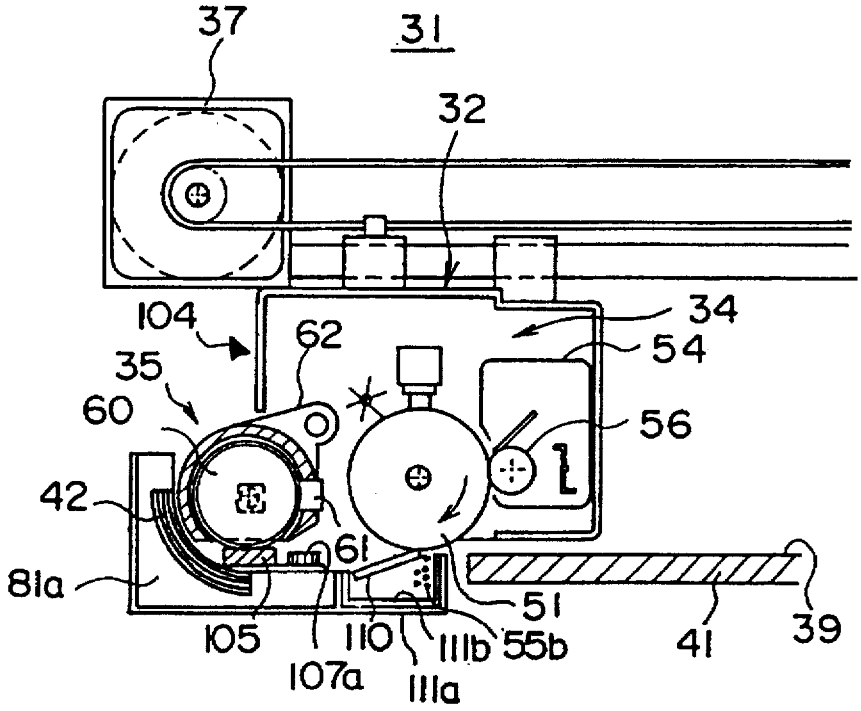
FIGS. 13A and 13B are diagrams showing a drum cleaning blade and a toner box which are detachably attached to the printer in the second embodiment.
Figure 13B:
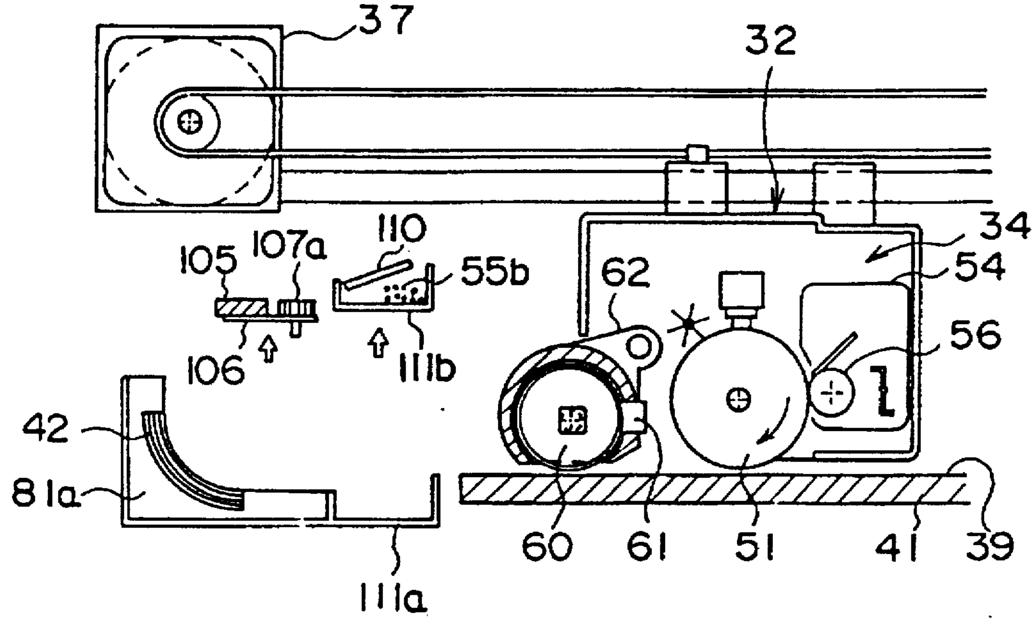

FIGS. 13A and 13B show the drum cleaning blade 110 and a second toner box 111*b* which is detachably attached to the printer 31 in the second embodiment. In FIGS. 13A and 13B, the second toner box 111*b* which includes the drum cleaning blade 110 therein is formed separately from the guide member 81*a*, and the second toner box 111*b* is detachably fitted into to a toner box portion 111*a* of the guide member 81*a*.

In the second embodiment in FIGS. 13A and 13B, the toner 55*b* on the photosensitive drum 51 is removed by the drum cleaning blade 110. The toner 55*b* removed by the drum cleaning blade 110 is stored within the second toner box 111*b*. When the carriage unit 32 is at the home position, the second toner box 111*b* is heated by the induction heating coil 42. Thus, the stored toner within the toner box 111*b* changes from the powder form to the solid form. The above embodiment can prevent the scattering of the toner from the toner box 111*a* upon the disposal of the stored toner, and facilitates the disposal of the stored toner as well as the change of the second toner box 111*b*.

Figure 14A:
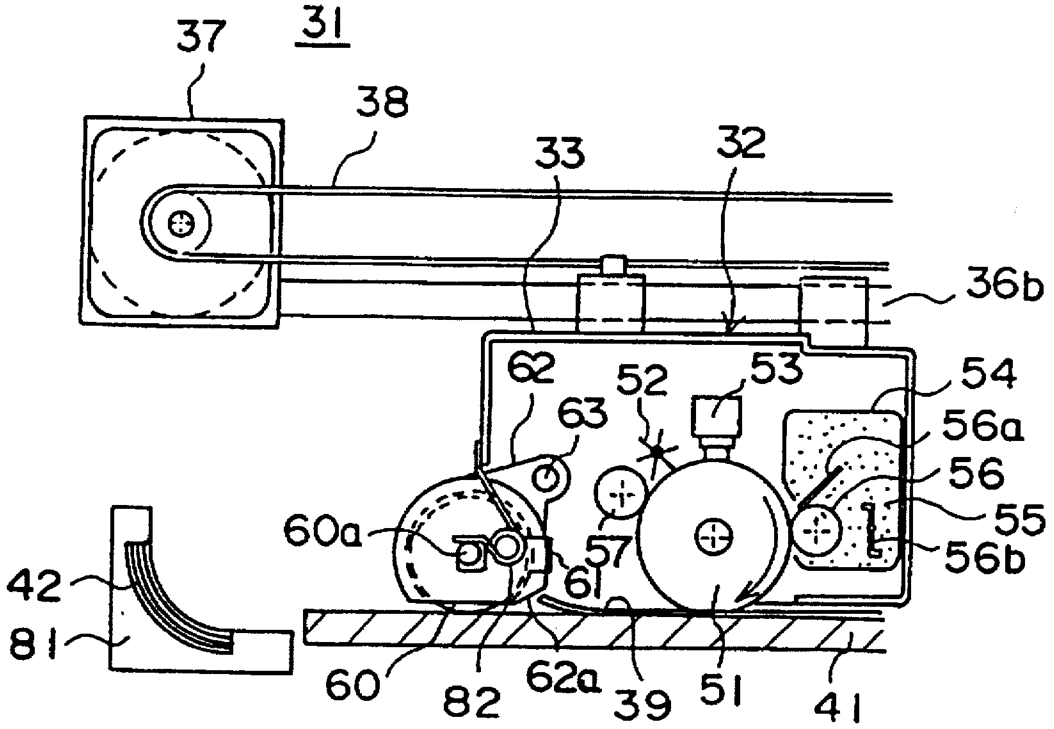
FIGS. 14A and 14B are diagrams showing an electrophotographic serial printer in a third embodiment of the present invention.
Figure 14B:
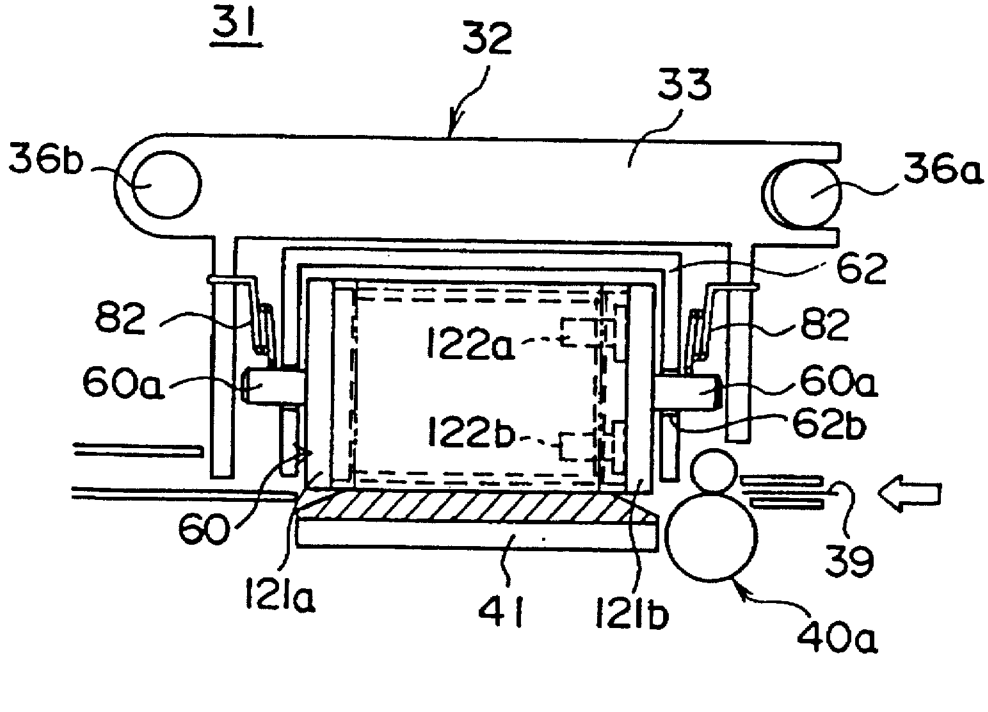

FIGS. 14A and 14B show an electrophotographic serial printer in a third embodiment of the present invention. FIG. 14A is a cross-sectional view of a carriage unit 32 in this embodiment, and FIG. 14B is a cross-sectional transversal view of the carriage unit 32 when viewed from the side of a fixing roller 60 thereof. In FIGS. 14A and 14B, the parts which are the same as corresponding parts in the above-described first and second embodiments are designated by the same reference numerals, and a description thereof will be omitted.

In FIGS. 14A and 14B, the fixing roller 60 is formed into a hollow drum having a wall thickness about 1 mm. The fixing roller 60 is made of a conductive metallic material such as aluminum, iron or stainless steel. When the fixing roller 60 is subjected to the magnetic flux from the induction heating coil 42, eddy currents flow through the surface of the fixing roller 60. The surface of the fixing roller 60 is formed with a teflon coating which is about 20–30 μm thick. Thus, the fixing roller 60 is lubricated and it is very likely to separate from the toner 55 when the fixing is carried out.

As shown in FIG. 14B, flanges 121*a* and 121*b* which are made of a heat-resistant adiabatic resin material (e.g., PPS) are fitted into cut-out side portions (not shown) of the fixing roller 60. The flanges 121*a* and 121*b* are secured to the fixing roller 60 by using screws 122*a* and 122*b*.

A rotating shaft 60*a* extending in a longitudinal direction of the fixing roller 60 is integrally formed with the fixing roller 60. The rotating shaft 60*a* is made of the same material as the fixing roller 60. If the rotating shaft 60*a* and the fixing roller 60 are made of different materials, a play between the two parts may be produced due to different amounts of thermal expansion of the different materials when heated by the induction heating coil 42. To avoid this, it is necessary that the fixing roller 60 and the rotating shaft 60*a* in this embodiment are made of the same material.

The holding member 62 includes rectangular holes 62*b*, and these holes 62*b* are used to hold the fixing roller 60 at both ends of the rotating shaft 60*a*. The width of the rectangular holes 62*b* is slightly greater than the diameter of the rotating shaft 60*a*. For example, the diameter of the rotating shaft 60*a* is 4 mm, and the size of the rectangular holes 62*b* is 4.3 mm×4.3 mm. The arrangement in this example includes a vertical clearance of 0.3 mm and a horizontal clearance of 0.3 mm, each between the shaft 60*a* and the holes 62*b*. In this embodiment, the rotating shaft 60*a* of the fixing roller 60 is loosely fitted into the rectangular holes 62*b* of the holding member 62.

Further, in the third embodiment in FIGS. 14A and 14B, torsion springs 82 are arranged on the holding member 62 at both ends of the rotating shaft 60*a* to press down the rotating shaft 60*a* of the fixing roller 60 against the transferring unit 41 under a predetermined downward pressure. One end of each of the torsion springs 82 is secured to the slide member 33 of the carriage unit 32. If the width of the fixing roller 60 is assumed to be about 30 mm, a downward load exerted by the torsion springs 82 on the fixing roller 60 is about 0.5–2 kg.

In the third embodiment in FIGS. 14A and 14B, the rotating shaft 60*a* of the fixing roller 60 is pressed downward by the torsion springs 82, and the rotating shaft 60*a* is loosely fitted into the holes 62*b* of the holding member 62. Thus, in the third embodiment, a downward load which is appropriate for carrying out the fixing of a toner image to the recording sheet 39 is exerted by the fixing roller 60 on the recording sheet 39 against the transferring unit 41 without deforming the guide shafts 36*a* and 36*b* or without cambering the transferring unit 41.

Figure 15A:
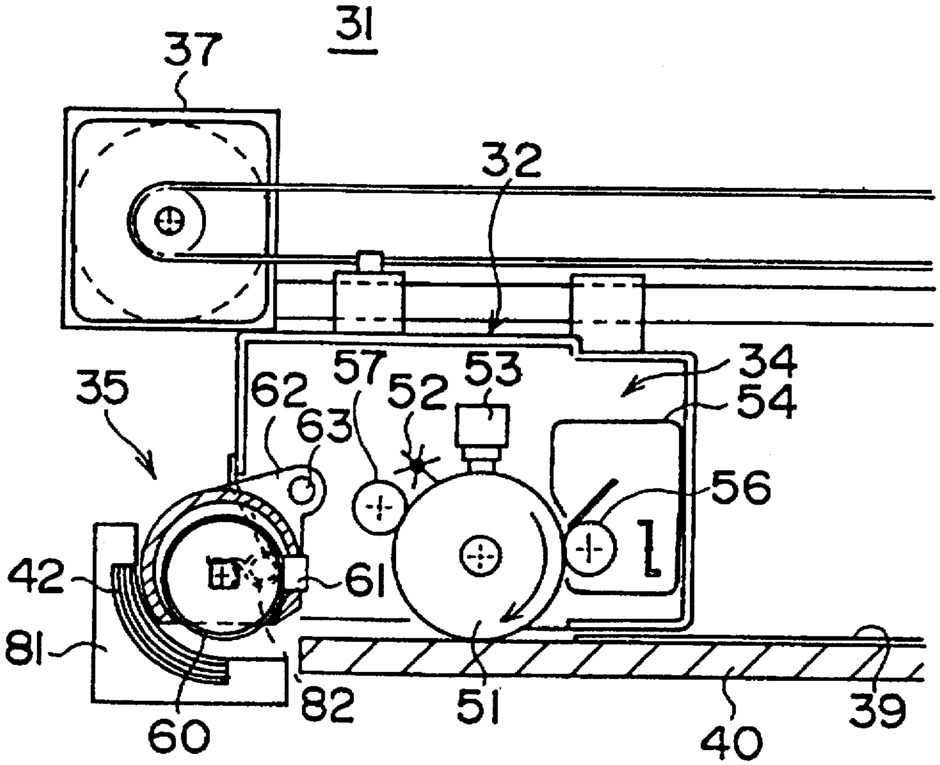
FIGS. 15A and 15B are diagrams for explaining a movement of a carriage unit in the printer in the third embodiment.
Figure 15B:
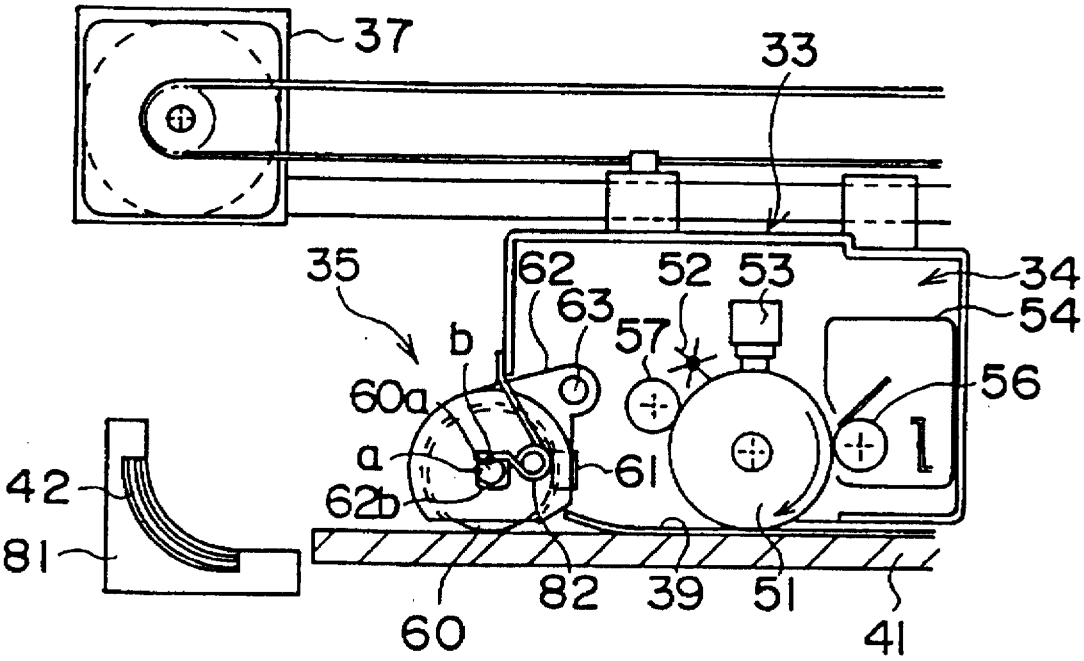

FIGS. 15A and 15B show a movement of a carriage unit 32 in the printer 31 in the third embodiment.

In FIG. 15A, the carriage unit 32 is at the home position in the printer 31. The fixing roller 60 on the carriage unit 32 at this time is adjacent to the induction heating coil 42 and heated by the induction heating coil 42. When the temperature of the fixing roller 60 is detected to be above the reference temperature (e.g., 180° C.) by using the thermistor unit 61, the movement of the carriage unit 32 is started.

In FIG. 15B, the carriage unit 32 is moved in the printer 31 to carry out the printing. The rotation of the fixing roller 60 is performed in accordance with the movement of the carriage unit 32.

This rotation of the fixing roller 60 when the carriage unit 32 is moved is determined based on a relationship between a friction on the fixing roller 60 and a friction between the recording sheet 39 and the transferring unit 41.

When the carriage unit 32 is moved, the fixing roller 60 contacts either the silicon-rubber surface of the transferring unit 41 or the recording sheet 39. Suppose that "μ1" indicates a frictional coefficient between the carriage unit 32 and the silicon rubber surface of the transferring unit 41, and "P" indicates a normal reaction on the fixing roller 60. The friction on the fixing roller 60 is then represented by "P·μ1". Suppose that "μ2" indicates a frictional coefficient between the carriage unit 32 and the recording sheet 39. The friction on the fixing roller 60 is then represented by "P·μ2". Generally, these frictional coefficients meet the inequality: μ1>μ2. Therefore, in order to consider the rotation of the fixing roller 60, it is necessary to take into account a relationship between the friction "P·μ2" on the fixing roller 60 when contacting the recording sheet 39 and the friction on the fixing roller 60.

The friction on the fixing roller 60 can be defined by a sum of a friction between the holding member 62 and the rotating shaft 60a of the fixing roller 60 and a friction between the thermistor unit 61 and the fixing roller 60.

For the sake of simplicity of the explanation, the friction between the thermistor unit 61 and the fixing roller 60 when the carriage unit 32 is moved is assumed to be constant.

Suppose that "μ3" indicates a frictional coefficient between the thermistor unit 61 and the fixing roller 60, and "μ4" indicates a frictional coefficient between the holding member 62 and the rotating shaft 60a of the fixing roller 60. Also, suppose that "R1" indicates a radius of the fixing roller 60, and "R4" indicates a radius of the rotating shaft 60a. In order to allow the fixing roller 60 to be rotated on the recording sheet 39 in accordance with the movement of the carriage unit 32, the following inequality must be met.

$$R1 \cdot P \cdot \mu 2 > R4 \cdot P \cdot \mu 4 + R1 \cdot S \cdot \mu 3 \quad (1)$$

where P indicates the normal reaction on the fixing roller 60 and S indicates a pressing force exerted by the thermistor unit 61 on the fixing roller 60.

As described above, the friction between the thermistor unit 61 and the fixing roller 60 is assumed to be constant. In the third embodiment in FIGS. 14A and 14B, the torsion springs 82 and the rotating shaft 60a of the fixing roller 60 are brought into a "point" contact. The portion where the torsion spring 82 and the rotating shaft 60a join is indicated by "b" in FIG. 15B. Therefore, in the third embodiment, the friction between the holding member 62 and the rotating shaft 60a is minimized, and thus the friction on the fixing roller 60 when the carriage unit 32 is moved is remarkably reduced.

Further, in the third embodiment in FIGS. 14A and 14B, the rotating shaft 60a of the fixing roller 60 is loosely fitted into the rectangular holes 62b of the holding member 62, and the holding member 62 and the fixing roller 60 when the carriage unit 32 is moved are brought into a "point" contact. The portion where the rotating shaft 60a and the holding member 62 join is indicated by "a" in FIG. 15B. Therefore, the friction on the fixing roller 60 when the carriage unit 32 is moved is remarkably reduced.

Figure 16A:
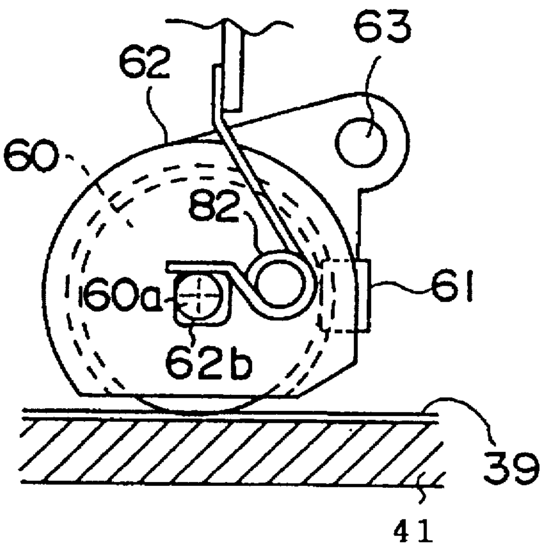
FIGS. 16A, 16B and 16C are diagrams for explaining a raised condition of a fixing roller in the printer in the third embodiment.
Figure 16B:
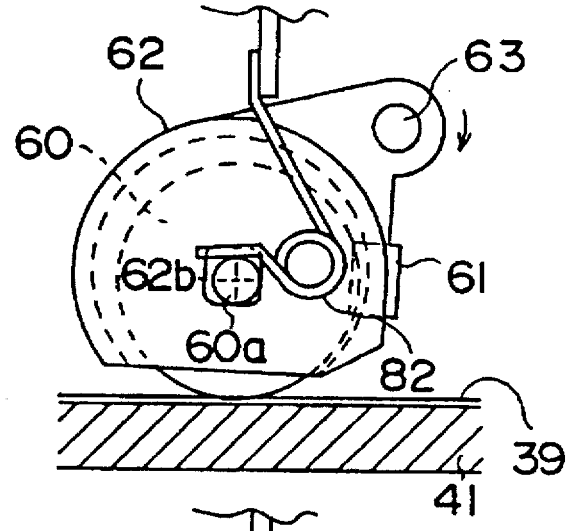
Figure 16C:
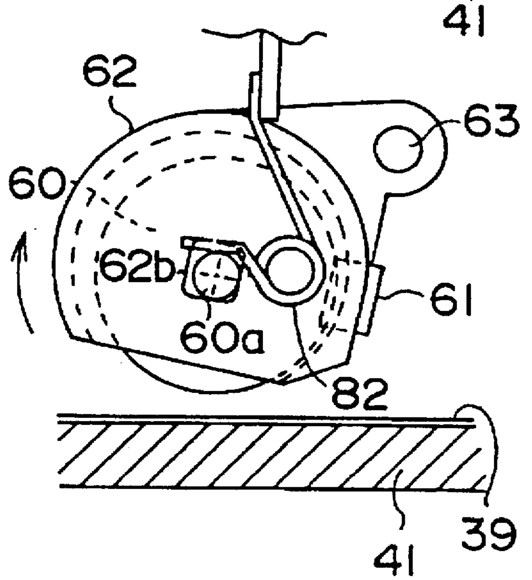

FIGS. 16A, 16B and 16C show a raised condition of the fixing roller 60 in the printer 31 in the third embodiment. In the above third embodiment, the rotating shaft 60a of the fixing roller 60 and each of the rectangular holes 62b of the holding member 62 are fitted with a horizontal play of 0.3 mm and a vertical play of 0.3 mm therebetween. The rotating shaft 60a is pressed downward by the torsion springs 82 against the transferring unit 41.

In FIG. 16A, a condition of the holding member 62 before the fixing roller 60 is set at the raised condition is shown. The holding member 62 is not raised until the lower surface of each rectangular hole 62b and the rotating shaft 60a are brought into contact with each other.

In FIG. 16B, the holding member 62 is set at the raised condition after it is slightly rotated clockwise around the supporting shaft 63. The supporting shaft 63 is secured to the slide member 33 of the carriage unit 32, and the supporting shaft 63 is stationary.

Since the fixing roller 60 is held by the holding member 33, the fixing roller 60 is also rotated clockwise around the supporting shaft 63 at the same time as the holding member 62 is rotated. In FIG. 16C, the fixing roller 60 is set at the raised condition.

Accordingly, the above third embodiment achieves a "cushion" effect on at least one of the fixing roller 60 and the photosensitive drum 51 of the carriage unit 32 which are brought into contact with the recording sheet 39 when the printing is carried out. This effect is achieved by the loose fitting of the rotating shaft 60a and the holding member 62 as well as the downward biasing force exerted by the torsion springs 82 on the rotating shaft 60a.

In FIGS. 15A and 15B, the thermistor unit 61 is secured to the holding member 62 so that the thermistor unit 61 is brought into contact with the fixing roller 60 at one side of the fixing roller 60. The side of the fixing roller 60 is near the photosensitive drum 51 on the carriage unit 32. The thermistor unit 61 is secured to the holding member 62 with the pressing force S exerted by the thermistor unit 61 on the fixing roller 60.

The thermistor unit 61 comprises an element whose resistance varies depending on the temperature, a foam rubber material covering the element, a base plate, and a heat-resistant film for protecting a contact portion brought into contact with the fixing roller 60.

Figure 17:
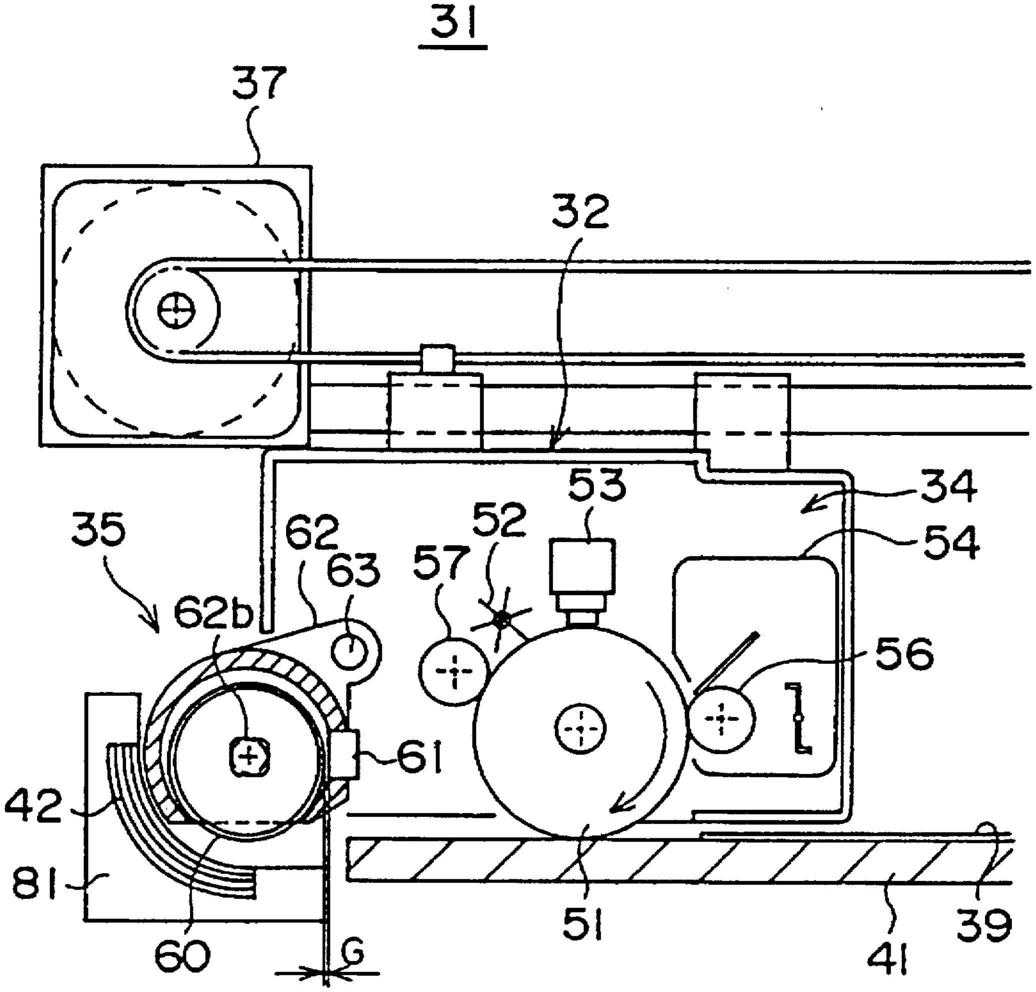
FIG. 17 is a diagram showing an arrangement of a thermistor unit in the printer in the third embodiment.

FIG. 17 shows an arrangement of the thermistor unit 61 in the printer in the third embodiment. In FIG. 17, the thermistor unit 61 is secured to the holding member 62 to keep a predetermined gap (which is indicated by arrows "G" in FIG. 17) between the fixing roller 60 and the thermistor unit 61 at one side of the fixing roller 60, which is near to the photosensitive drum 51. The loose fitting of the rotating shaft 60a and the rectangular holes 62b does not influence the arrangement between the fixing roller 60 and the thermistor unit 61, and the gap G is hardly changed when the fixing roller 60 is rotated.

In the arrangement in FIG. 17, the friction between the thermistor unit 61 and the fixing unit 60 is remarkably reduced, and the teflon coating layer of the fixing roller 60 is hardly cut by the thermistor unit 61.

Figure 18A:
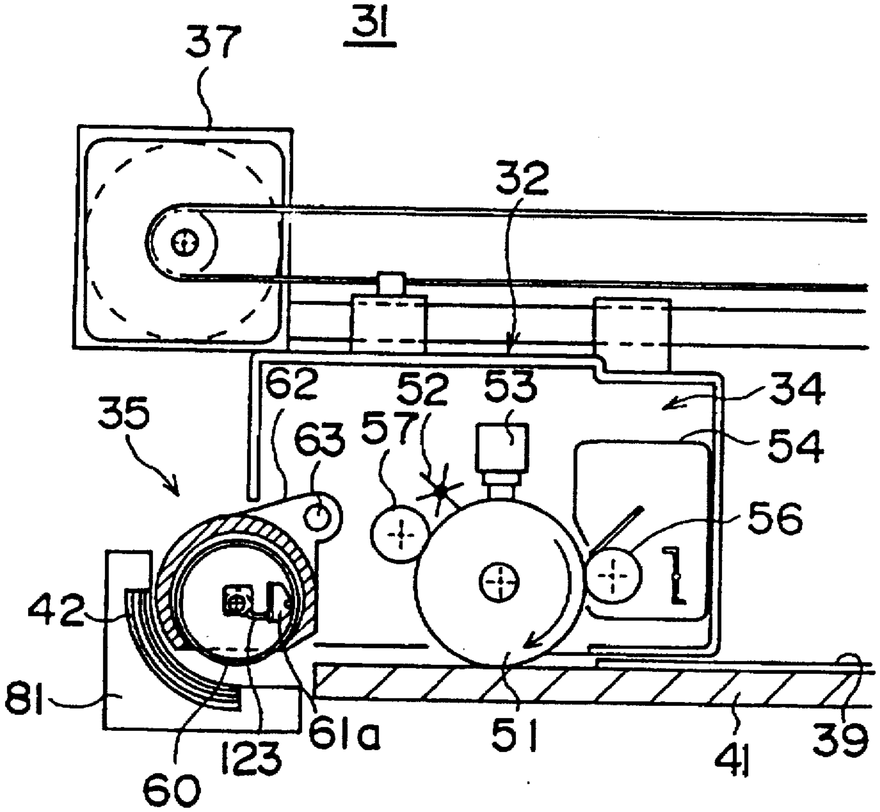
FIGS. 18A and 18B are diagrams showing other arrangements of the thermistor unit in the printer in the third embodiment.

FIG. 18A shows another arrangement of a thermistor unit 61a in the printer 31 in the third embodiment. In FIG. 18A, the thermistor unit 61a is arranged within the fixing roller 60 so that the thermistor unit 61a is brought into contact with the internal surface of the fixing roller 60 at one side of the fixing roller 60. A cable 123 from the thermistor unit 61a is taken out from the fixing roller 60 through a central hole of the rotating shaft 60a of the heat-resistant resin material, and the cable 123 is connected to a control unit (not shown) for controlling the thermistor unit 61a.

In the arrangement in FIG. 18A, a radius of curvature of the thermistor unit 61a at the contact portion is smaller than a radius of curvature of the internal surface of the fixing roller 60, and a teflon coating layer is formed on the internal surface of the fixing roller 60. These serve to reduce the friction between the fixing roller 60 and the thermistor unit 61*a* when the carriage unit 32 is moved.

Figure 18B:
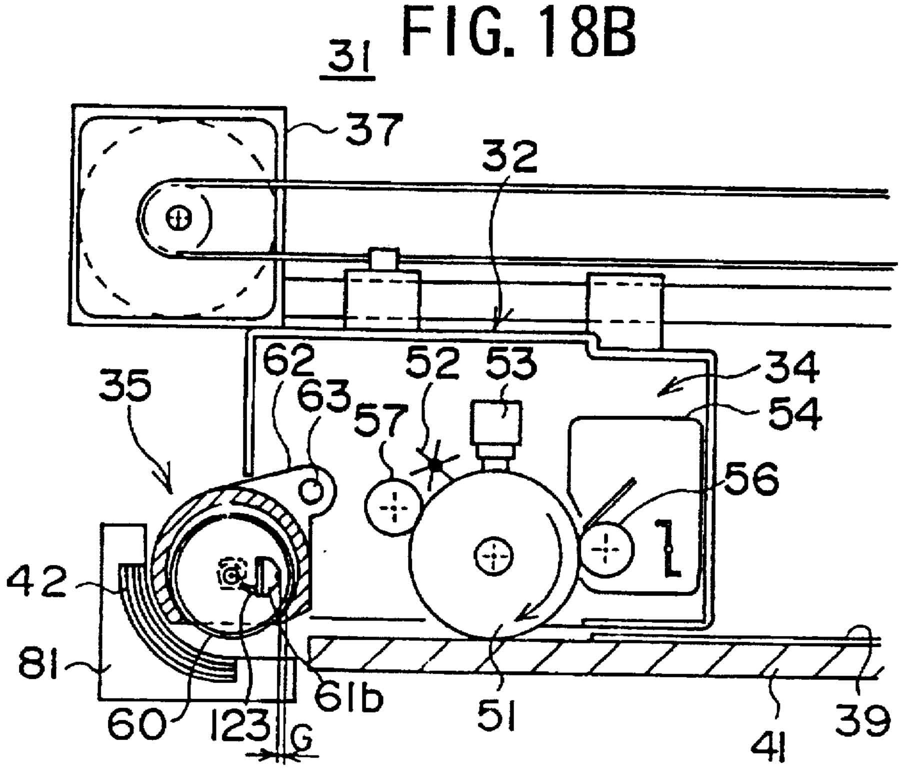

FIG. 18B shows still another arrangement of a thermistor unit 61*b* in the printer 31 in the third embodiment. In FIG. 18B, the thermistor unit 61*b* is arranged within the fixing roller 60, and a predetermined gap G between the fixing roller 60 and the thermistor unit 61*b* is maintained.

In the arrangement in FIG. 18B, it is not necessary that a radius of curvature of the thermistor unit 61*b* be smaller than a radius of curvature of the internal surface of the fixing roller 60. It is also not necessary that a teflon coating layer be formed on the internal surface of the fixing roller 60. Further, in this arrangement, it is possible to prevent a leakage of the current from the transferring unit 41 through the thermistor unit 61*b*.

Figure 19A:
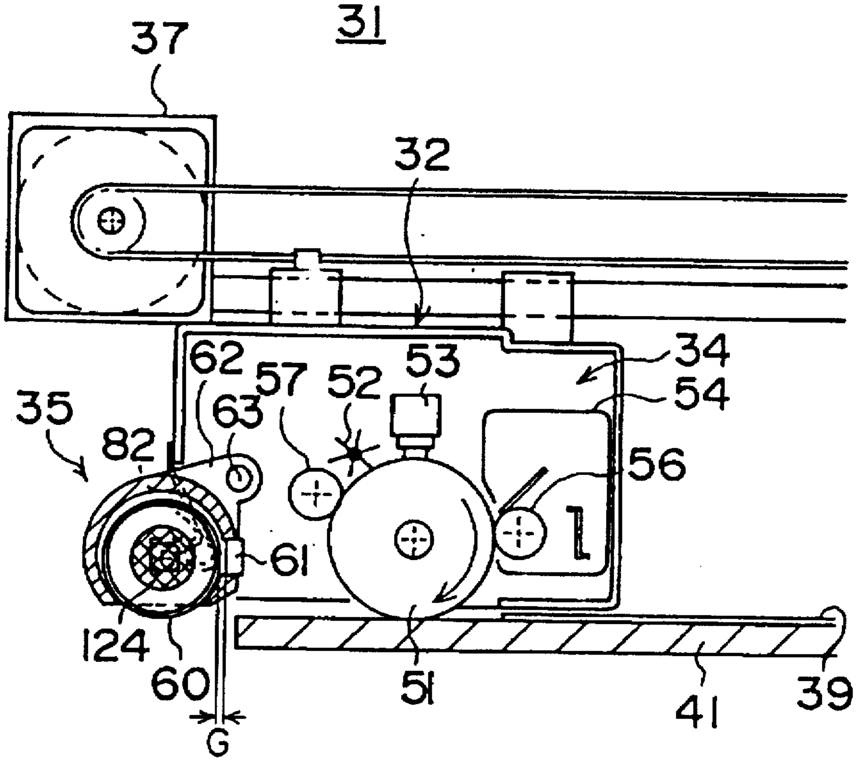
FIGS. 19A and 19B are diagrams showing a halogen lamp, used instead of an induction heating coil, in the printer in the third embodiment.
Figure 19B:
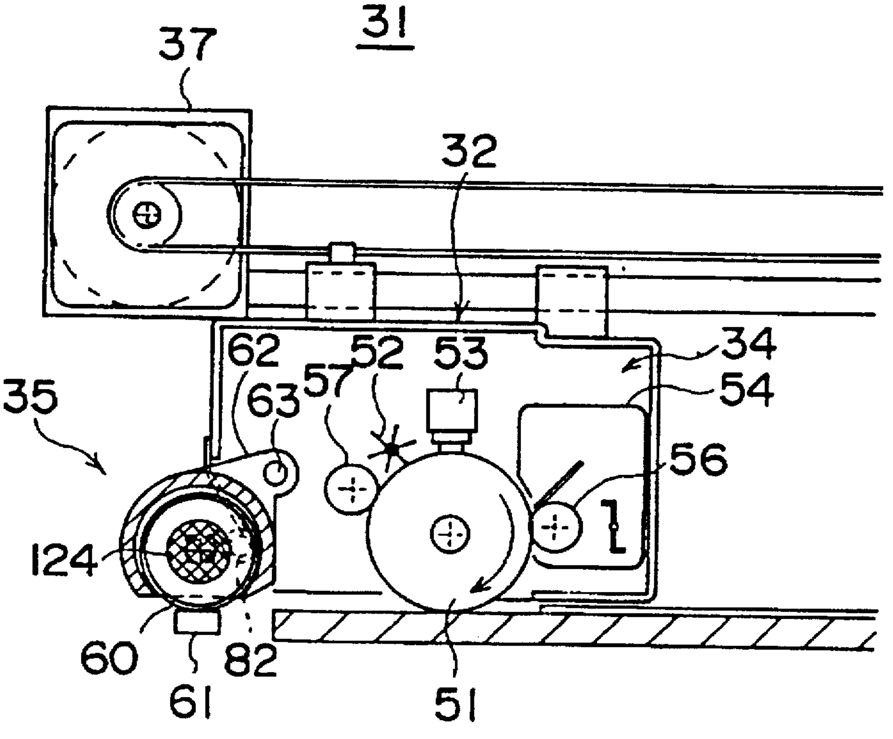

FIGS. 19A and 19B show a halogen lamp 124, used instead of the induction heating coil 42, in the printer 31 in the third embodiment. In FIG. 19A, the halogen lamp 124 is arranged within the fixing roller 60, and the halogen lamp 124 heats the fixing roller 60 to an appropriate fixing temperature. The thermistor unit 61 is secured to the holding member 62 to maintain the gap G between the thermistor unit 61 and the fixing roller 60 as shown in FIG. 17.

In FIG. 19B, the halogen lamp 124 is arranged within the fixing roller 60, and the thermistor unit 61 is arranged to be adjacent to the fixing roller 60 when the carriage unit 32 is at the home position.

In the arrangements in FIGS. 19A and 19B, it is possible to prevent a leakage of the current from the transferring unit 41 through the thermistor unit 61. Also, it is possible to reduce the friction between the thermistor unit 61 and the fixing roller 60 when the fixing roller 60 is rotated.

Figure 20A:
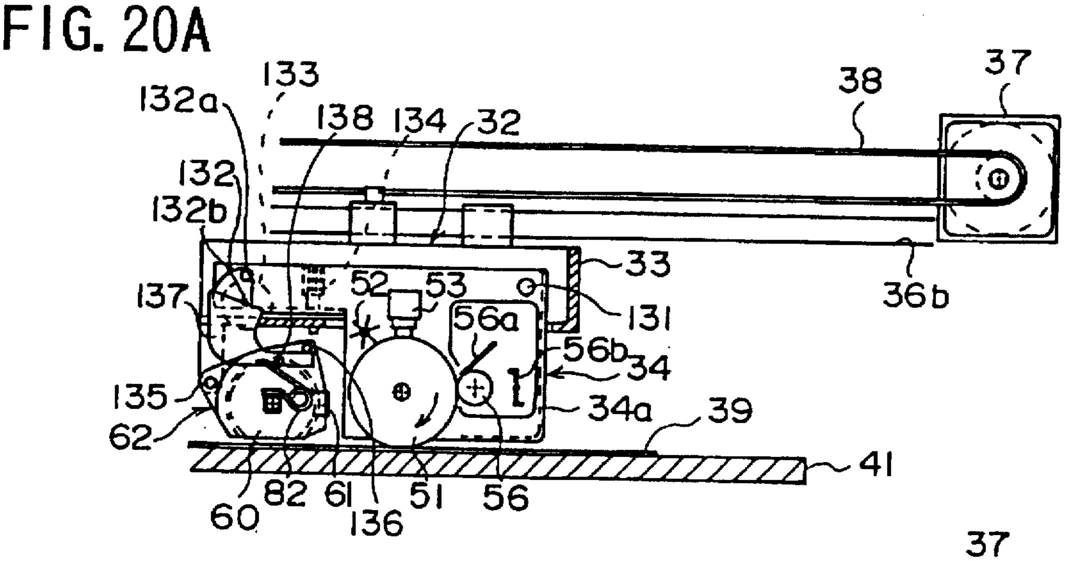
FIGS. 20A, 20B and 20C are diagrams showing an electrophotographic serial printer in a fourth embodiment of the present invention.
Figure 20B:
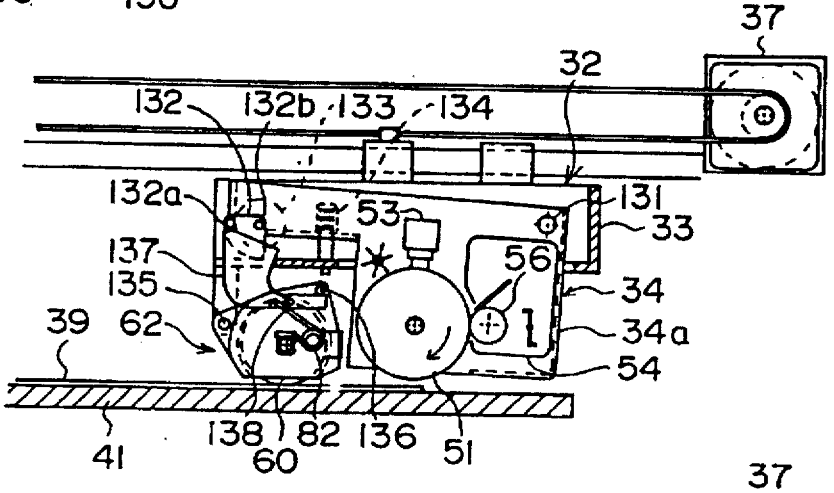
Figure 20C:
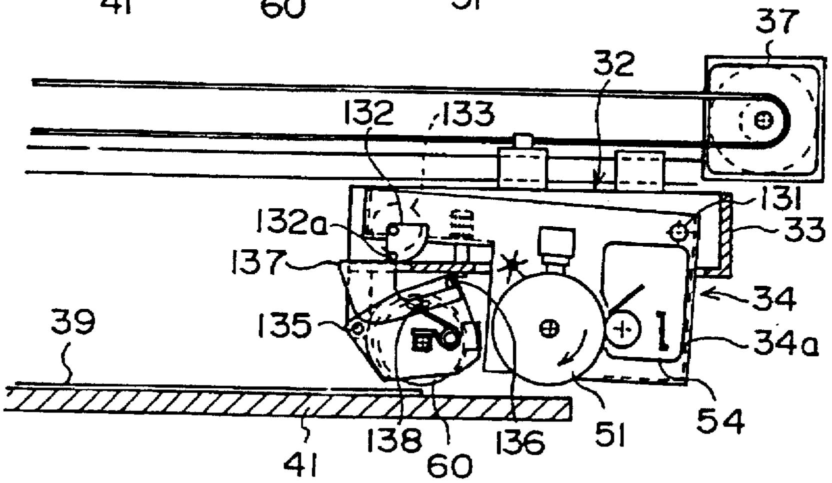

FIGS. 20A, 20B and 20C show an electrophotographic serial printer in a fourth embodiment of the present invention. In FIGS. 20A through 20C, the parts which are the same as corresponding parts in the above-described embodiments are designated by the same reference numerals, and a description thereof will be omitted.

In FIGS. 20A through 20C, the carriage motor 37 is shown at a right side end of the printer, which is different from that shown in the above-described embodiments, for the sake of convenience.

In FIG. 20A, the processing unit 34 which is arranged on the carriage unit 32 is arranged within a processing unit frame 34*a*. The processing unit frame 34*a* is rotatably attached to the slide member 33 by using a pin 131. A cam 132 which is shaped into a quadrant is connected to one end of the processing unit frame 34*a* by using a pin 132*b*, and the cam 132 is rotated by a motor 133. The pin 132*b* is secured to the slide member 33. The cam 132 and the motor 133 constitute a raising unit for raising at least one of the photosensitive drum 51 and the fixing roller 60.

A fixing pin 132*a* is arranged at one end portion of the cam 132. A stopper screw 134 is secured to the slide member 33. The stopper screw 134 on the cam 132 serves to stop the rotation of the processing unit frame 34*a*.

The holding member 62 is rotatably attached to the slide member 33 by using a pin 135. The fixing roller 60, the thermistor unit 61, and the torsion springs 82 are arranged on the holding member 62. A fixing pin 136 is arranged at one end portion of the holding member 62.

An L-shaped plate 137 is rotatably attached to the holding member 62 by connecting a shaft 138 to an arm portion of the L-shaped plate 137. One end of the L-shaped plate 137 and the pin 132*a* of the cam 132 are connected to each other, and the other end of the L-shaped plate 137 and the fixing pin 136 of the holding member 62 are connected to each other.

In FIG. 20B, the cam 132 is rotated by the motor 133 by a quarter turn, and the processing unit frame 34*a* is raised by the circular portion of the cam 132 and the slide member 33. The photosensitive drum 51 on the carriage unit 32 is raised above the transferring unit 41 to release the photosensitive drum 51 from the recording sheet 39 on the transferring unit 41. The fixing roller 60 at this time is pressed down by the torsion springs 82 against the transferring unit 41. The rotation of the processing unit frame 34*a* is stopped by the stopper screw 134.

In FIG. 20C, the cam 132 is further rotated by the motor 133 by a quarter turn, and the pin 132 is connected to one end of the L-shaped plate 137 to depress the L-shaped plate 137. The L-shaped plate 137 at this time is rotated counterclockwise around the shaft 138, and the other end of the L-shaped plate 137 is raised. The other end of the L-shaped plate 137 is connected to the pin 136, and the holding member 62 is raised by the pin 136. Since the fixing roller 60 is held by the holding member 62, the fixing roller 60 is raised, together with the holding member 62, by the pin 136. Thus, the fixing roller 60 is raised above the transferring unit 41, after the photosensitive drum 51 is raised, to release the fixing roller 60 from the recording sheet 39 on the transferring unit 41.

Figure 21:
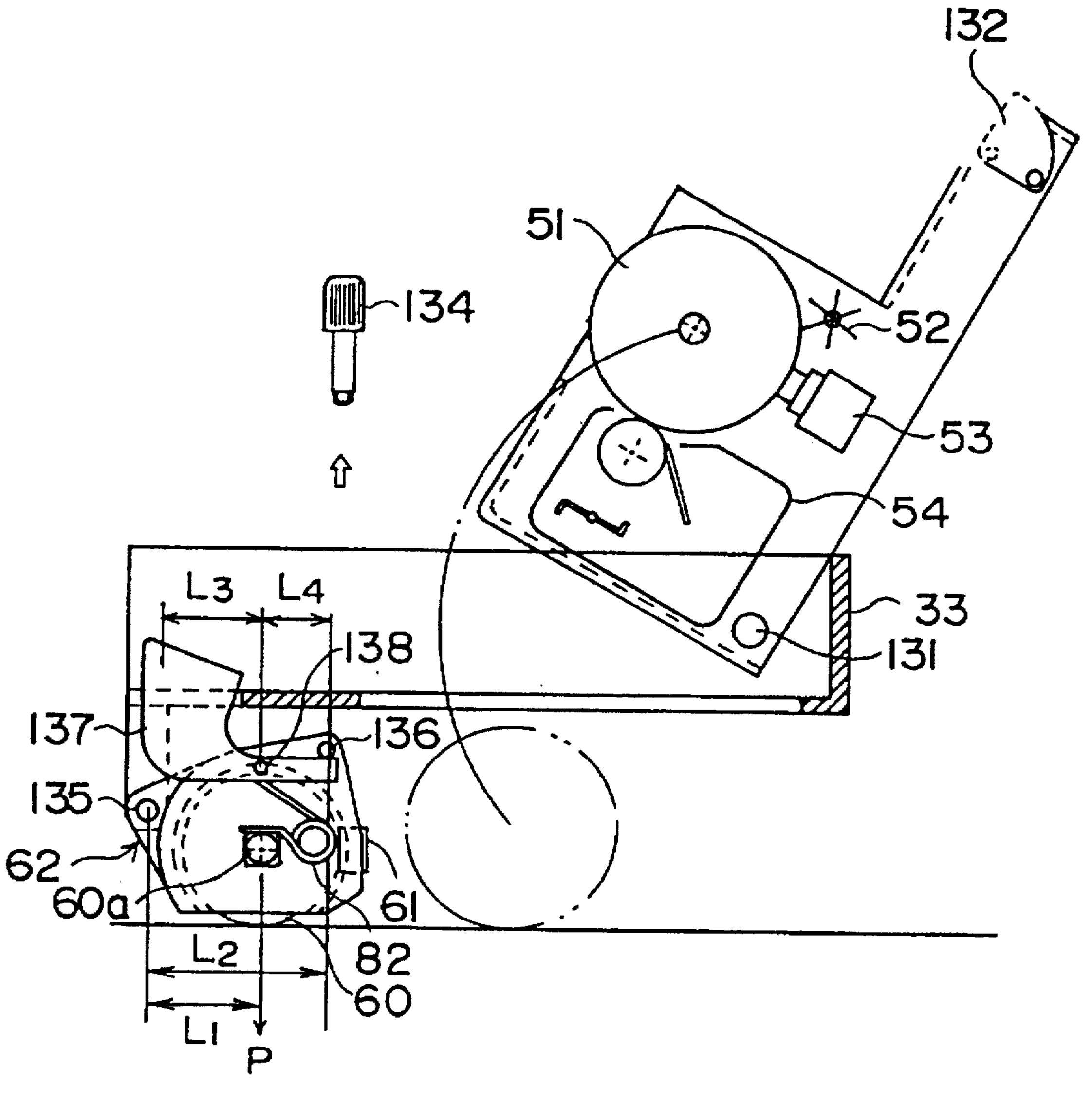
FIG. 21 is a diagram showing a rotation of a processing unit of the printer in the fourth embodiment.

FIG. 21 shows a rotation of a processing unit of the printer in the fourth embodiment. In FIG. 21, if the stopper screw 134 is removed, the processing unit frame 34*a* is capable of being rotated around the pin 131.

In the embodiment in FIG. 21, the processing unit frame in which the photosensitive drum 51 and the developing unit 54 are arranged is rotated around the supporting shaft 131. Suppose that "P" indicates a pressing force exerted by the torsion springs 82 on the fixing roller 60. A load W required for the cam 132 to set the fixing roller 60 at the raised condition is defined by the following equation.

$$W=(L1\cdot L4/L2\cdot L3)\cdot P \qquad (2)$$

where L1, L2, L3 and L4 indicates respective distances shown by the same reference letters in FIG. 21, that is, L1 indicates a distance between the pin 135 and the rotating shaft 60*a*, L2 indicates a distance between the pin 135 and the pin 136, L3 indicates a distance between the shaft 138 and the pin 132*a* attached to the L-shaped plate 137, and L4 indicates a distance between the pin 138 and the pin 136.

The coefficient (L1·L4/L2·L3) of the above equation is called a load reduction factor. The necessary load on the motor 133 can be reduced by reducing the load reduction factor.

The arrangement of the raising unit in the fourth embodiment is simple as shown in FIG. 21. The raising unit raises at least one of the photosensitive drum 51 and the fixing roller 60 on the carriage unit 32. The electrophotographic serial printer in this embodiment can be built with a small size and a low cost and can produce a good quality of printed image without producing a defective image due to irregular fixing or irregular exposure.

Figure 22:
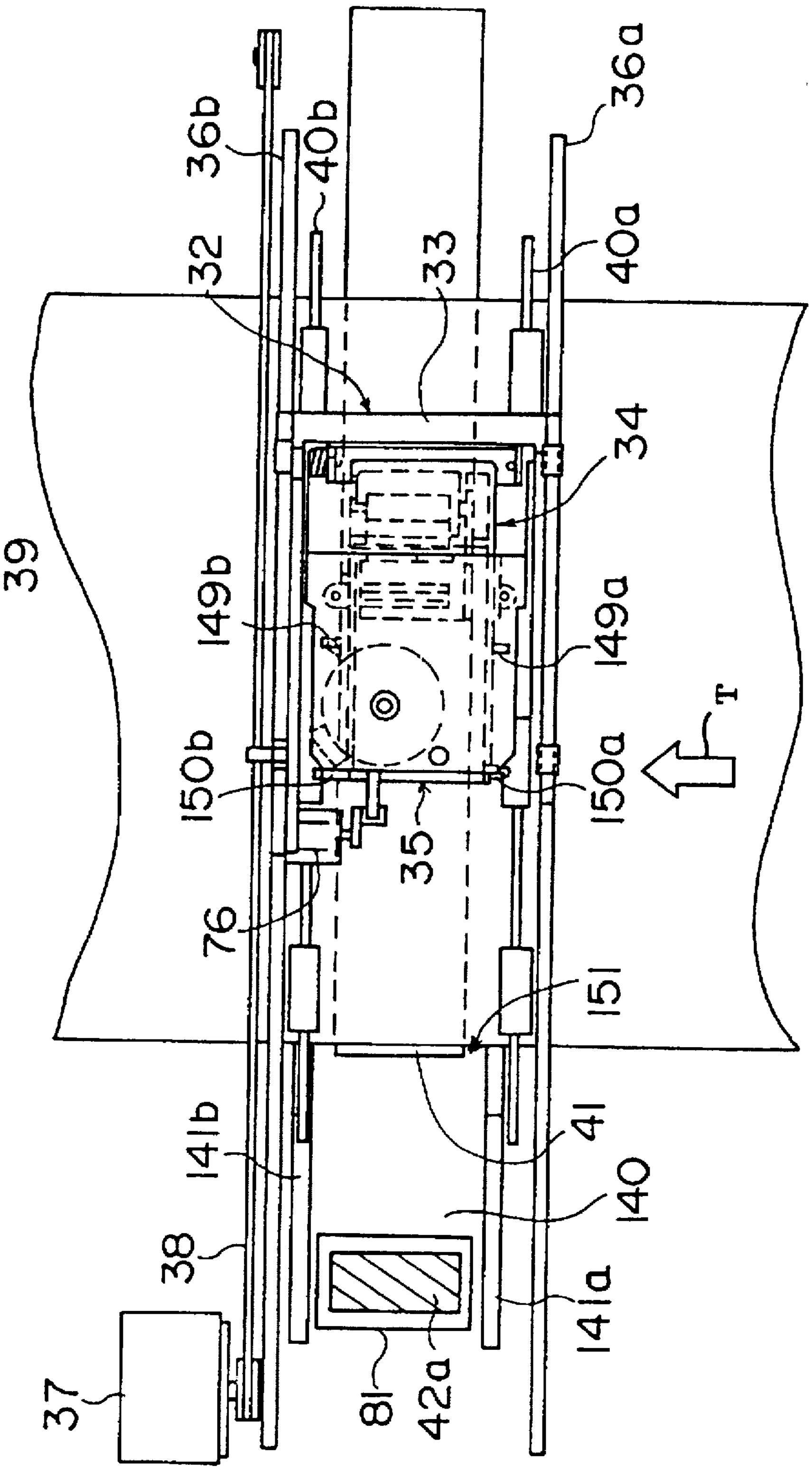
FIG. 22 is a diagram showing an electrophotographic serial printer in a fifth embodiment of the present invention.
Figure 23A:
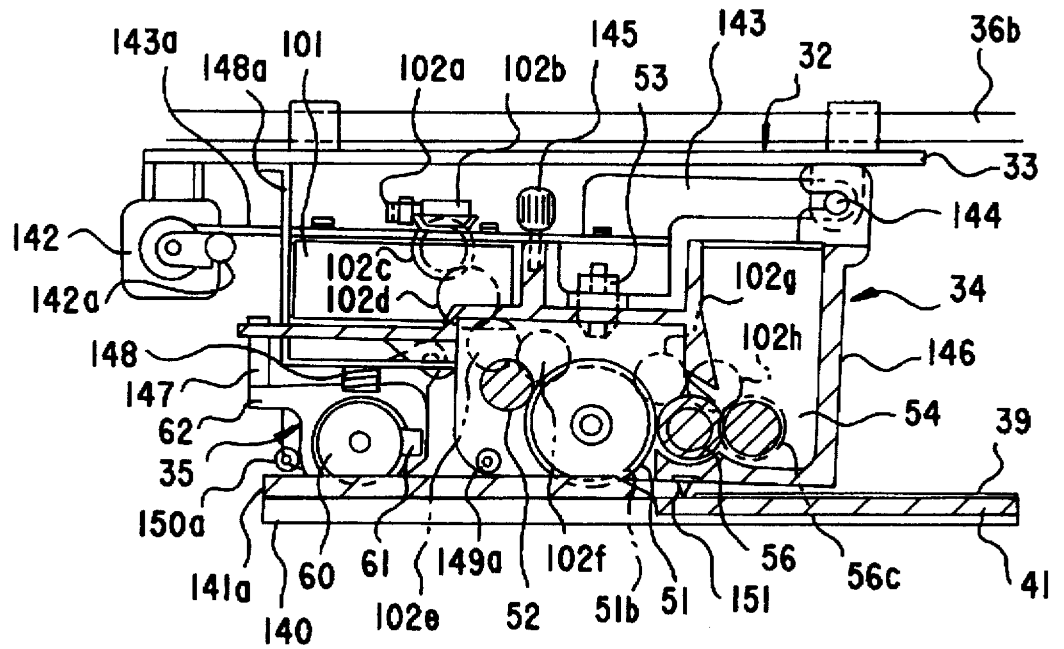
FIGS. 23A and 23B are diagrams showing a carriage unit of the printer in the fifth embodiment.

FIG. 22 shows an electrophotographic serial printer 31 in a fifth embodiment of the present invention. FIG. 23A is a cross-sectional view of the printer 31 in this fifth embodiment, and FIG. 23B is a top view of the printer 31 in this fifth embodiment.

In the electrophotographic serial printer 31 in FIG. 22, the processing unit 34 and the fixing unit 35 are arranged on the slide member 33 of the carriage unit 32. The slide member 33 is supported by the guide shafts 36*a* and 36*b*. The carriage unit 32 is moved by the carriage motor 37 through the belt 38 in transversal directions perpendicular to the sheet transport direction.

The transferring unit 41 extending in the direction of the movement of the carriage unit 32 is arranged below the carriage unit 32. In addition, two rails 141*a* and 141*b* extending in the direction of the movement of the carriage unit 32 from one end of the transferring unit 41 are attached to a frame 140 of the printer 31. As shown in FIG. 23A, the height of each of the rails 141*a* and 141*b* is higher than the height of the transferring unit 41, and each of the rails 141*a* and 141*b* merges with the transferring unit 41 via a tapered portion.

Figure 23B:
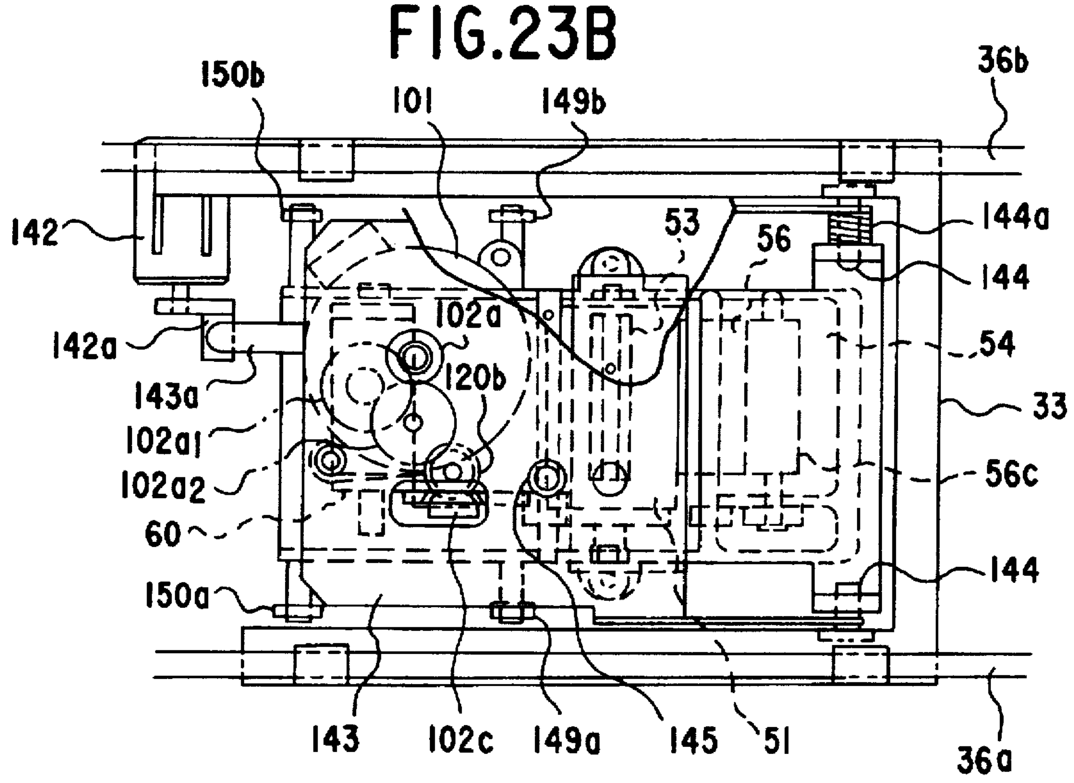

In FIGS. 23A and 23B, a raising motor 142 is secured to the slide member 33 of the carriage unit 32. A cam 142*a* is arranged on a rotating shaft of the raising motor 142. A frame 143 is rotatably attached to the slide member 33 by using pins 144 and springs 144*a* on both sides of the frame 143. A carriage frame 146 is detachably attached to the frame 143 by using a thumb screw 145. Also, the process motor 101 and the exposure unit 53 are attached to the carriage frame 146.

An extended portion 143*a* extending from one end of the frame 143 is integrally formed with the frame 143. The cam 142*a* rotated by the motor 142 is connected to the extended portion 143*a*. Similarly to that shown in FIGS. 9A and 9B, the photosensitive drum 51 is arranged within the carriage frame 146. The holding member 62 which holds and covers the fixing roller 60 is rotatably attached to the carriage frame 146. The photosensitive drum 51 is rotated by the process motor 101 through gears $102a_1$ and $102a_2$ and the gears 102*a* through 102*f*. The developing roller 56 and a feeding roller 56*c* are rotated through the gears 102*g* and 102*h*.

A stopper 147 which limits the rotation of the holding member 62 relative to the carriage frame 146 is arranged on the holding member 62. A stay unit 148*a* is attached to the slide member 33, and a spring 148 is attached to the stay unit 148*b*. The spring 148 on the stay unit 148*b* presses down the holding member 62. The fixing roller 60 is held by the holding member 62. The thermistor unit 61 is arranged adjacent to a portion of the fixing roller 60.

In the fifth embodiment in FIGS. 23A and 23B, rollers 149*a* and 149*b* are attached to both sides of the carriage frame 146, and rollers 150*a* and 150*b* are attached to both sides of the holding member 62. The rollers 149*a*, 149*b*, 150*a* and 150*b* are arranged on the rails 141*a* and 141*b*, so that the carriage unit 32 is slidable on the rails 141*a* and 141*b*. A maintaining unit for maintaining the carriage unit 32 at the raised condition is constituted by the rollers 149*a*, 149*b*, 150*a* and 150*b* and the rails 141*a* and 141*b*.

In the fifth embodiment in FIG. 22, a flat induction heating coil 42*a* is held by the guide member 81. The fixing roller 60 on the carriage unit 32 is adjacent to the induction heating coil 42*a* when the carriage unit 32 is at the home position, and the fixing roller 60 is heated by the induction heating coil 42*a* to an appropriate fixing temperature. The holding member 62 which holds the fixing roller 60 is made of a heat-resistant adiabatic material, in order to maintain the fixing temperature of the fixing roller 60. Alternatively, a space between the holding member 62 and the fixing roller 60 is filled with the heat-resistant adiabatic material.

In the fifth embodiment in FIG. 22, a sheet edge sensor 151 which senses a side edge of the recording sheet 39 is arranged within the printer 31.

FIGS. 24A, 24B, 25A and 25B show an operation of the printer in the fifth embodiment. In these drawings, a print starting position where the printing of an image on the recording sheet is started is indicated by "P".

Figure 24A:
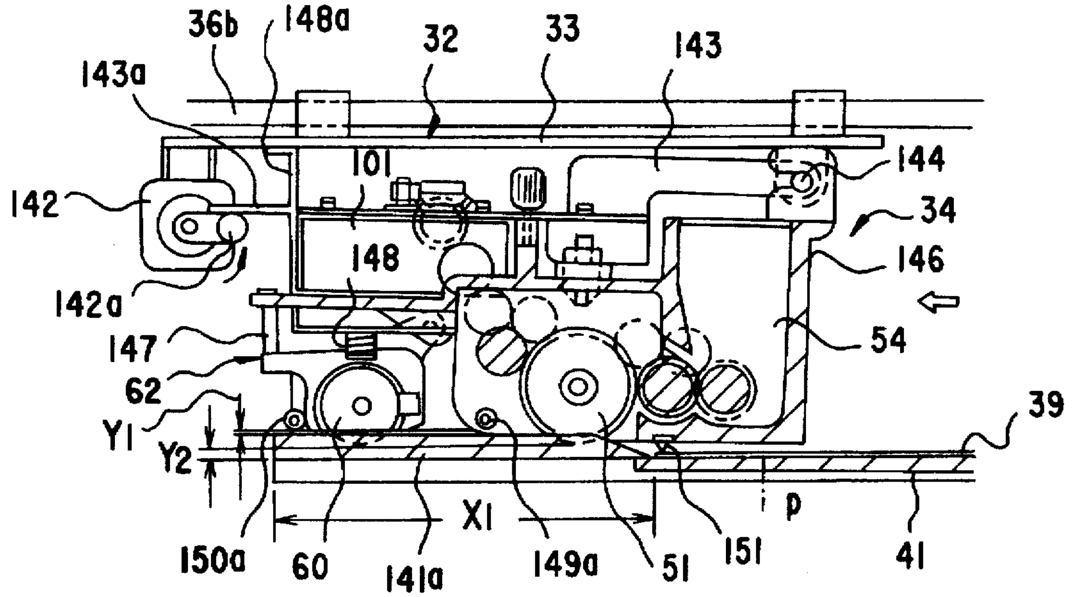
FIGS. 24A, 24B, 25A and 25B are diagrams for explaining an operation of the printer in the fifth embodiment.

In the printer in FIG. 24A, the carriage unit 32 is moved in a transversal direction perpendicular to the sheet transport direction, and a printing of image for one line on the recording sheet 39 is carried out. When the carriage unit 32 is at a print end position, the cam 142*a* is rotated by the raising motor 142 to raise the extended portion 143*a* of the frame 143. The carriage frame 146 is rotated around the pin 144, and the photosensitive drum 51 and the fixing roller 60 on the carriage unit 32 are set at the raised condition to release them from the recording sheet 39. Then, the carriage unit 32 returns back to the home position, and such a condition of the carriage unit 32 is shown in FIG. 24A.

In FIG. 24A, the height of each of the photosensitive drum 51 and the fixing roller 60 from the top of the transferring unit 41 is indicated by "Y2", and the height of each of the rollers 149*a*, 149*b*, 150*a* and 150*b* from the rails 141*a* and 141*b* is indicated by "Y1". The length of each of the rails 141*a* and 141*b*, from the left side end of the carriage unit 32 to the left edge of the recording sheet 39 when the carriage unit 32 is at the home position, is indicated by "X1".

Figure 24B:
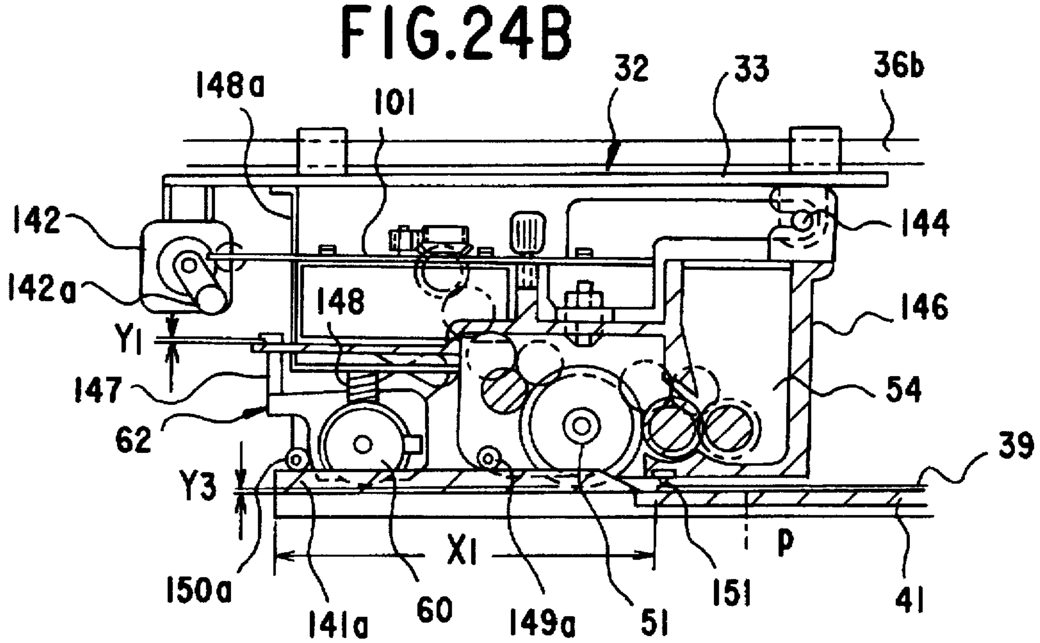

In FIG. 24B, the carriage unit 32 is at the home position, the cam 142*a* is rotated in the reverse rotating direction by the raising motor 142 to disconnect the cam 142*a* from the extended portion 143*a* of the frame 142. The rollers 149*a*, 149*b*, 150*a* and 150*b* at this time are brought into contact with and rest on the rails 141*a* and 141*b*. At the same time, a clearance "Y1" between the stopper 147 of the holding member 62 and the carriage frame 146 and a clearance "Y3" between the transferring unit 41 and each of the fixing roller 60 and the photosensitive drum 51 are produced. The clearance "Y3" is smaller than the height "Y2".

The clearance "Y3" is maintained when the rollers 149*a*, 149*b*, 150*a* and 150*b* rest on the rails 150*a* and 150*b*. At this time, there are no other parts which interfere with the photosensitive drum 51 and the fixing roller 60.

Figure 25A:
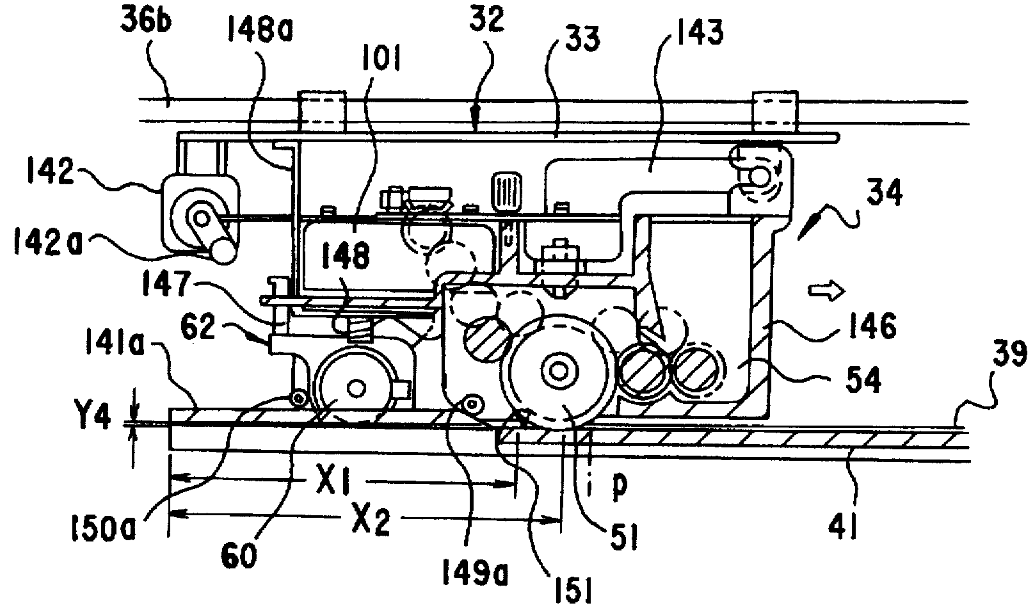

In FIG. 25A, the carriage unit 32 is moved from the home position to the print starting position "P" on the recording sheet 39. The rollers 149*a* and 149*b* are moved on the rails 141*a* and 141*b* and pass through the tapered portion, and the bottom point of the photosensitive drum 51 contacts the recording sheet 39 at a predetermined position (the distance from the left end of the rails 141*a* and 141*b* to this position is indicated by "X2"). At this time, the rollers 150*a* and 150*b* are still on the rails 141*a* and 141*b*, and the height "Y4" of the fixing roller 60 from the transferring unit 41 is still maintained.

Figure 25B:
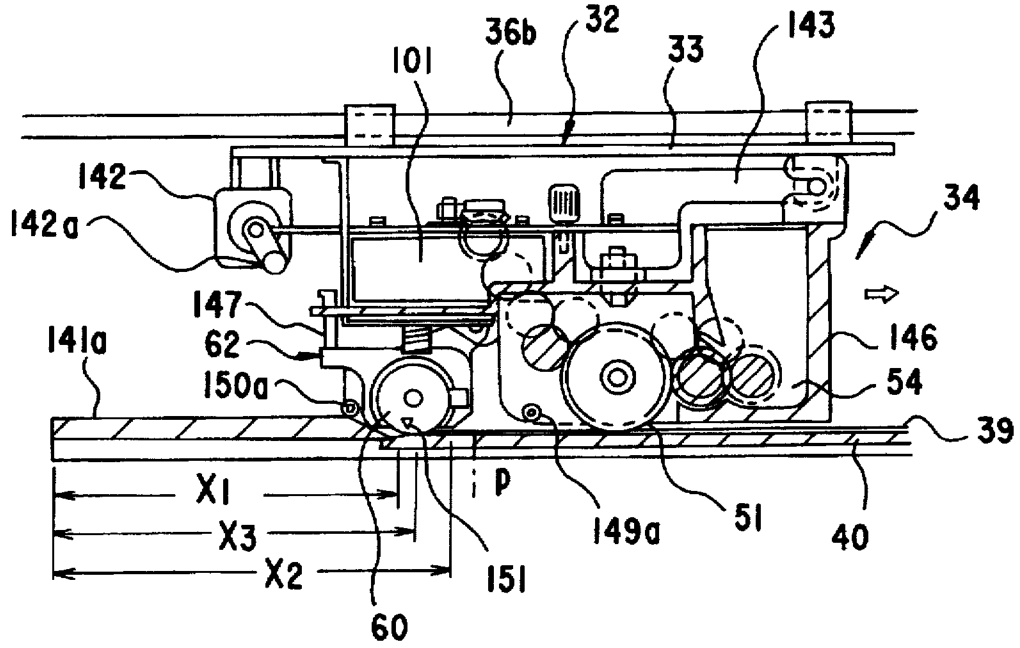

In FIG. 25B, the carriage unit 32 is further moved from the print starting position. The rollers 150*a* and 150*b* are moved on the rails 141*a* and 141*b* and pass through the tapered portion, and the bottom point of the fixing roller 60 contacts the recording sheet 39 (or the transferring unit 41) at a predetermined position (the distance between the left end of the rails 141*a* and 141*b* to this position is indicated by "X3"). The rollers 149*a* and 149*b* and the rollers 150*a* and 150*b* are arranged so that the distance X3 is smaller than the distance X2. This allows the fixing roller 60 to accurately and safely fix the toner image, after it is transferred to the recording sheet 39, to the recording sheet 39.

In the fifth embodiment described above, the sheet edge sensor 151 which senses a side edge of the recording sheet 39 is arranged at a position between the home position and the contact point where the photosensitive drum 51 and the recording sheet 39 first contact each other. Thus, when the side edge of the recording sheet 39 is sensed by the sheet edge sensor 151, the photosensitive drum 51 and the fixing roller 60 can contact the recording sheet 39.

In the fifth embodiment described above, as the rollers 149*a* and 149*b*, the rollers 150*a* and 150*b* and the rails 141*a* and 141*b* are arranged, there are no other parts which interfere with the photosensitive drum 51 and the fixing roller 60 when the carriage unit 32 is at the home position. And when the printing is started, the photosensitive drum 51 and the fixing roller 60 are in contact with the recording sheet 39. Therefore, it is possible to prevent the photosensitive drum 51 and the fixing roller 60 from flawing or staining, and the electrophotographic serial printer in this embodiment can create a good quality of printed image without producing a defective image due to irregular exposure or irregular fixing.

Figure 26A:
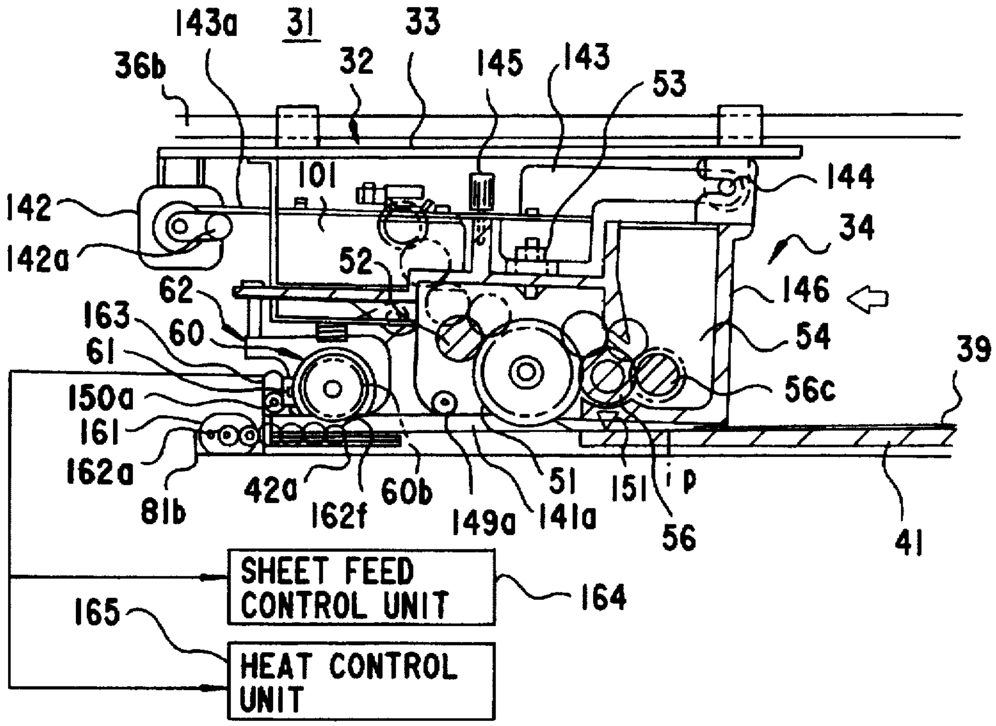
FIGS. 26A and 26B are diagrams showing an electrophotographic serial printer in a sixth embodiment of the present invention.
Figure 26B:
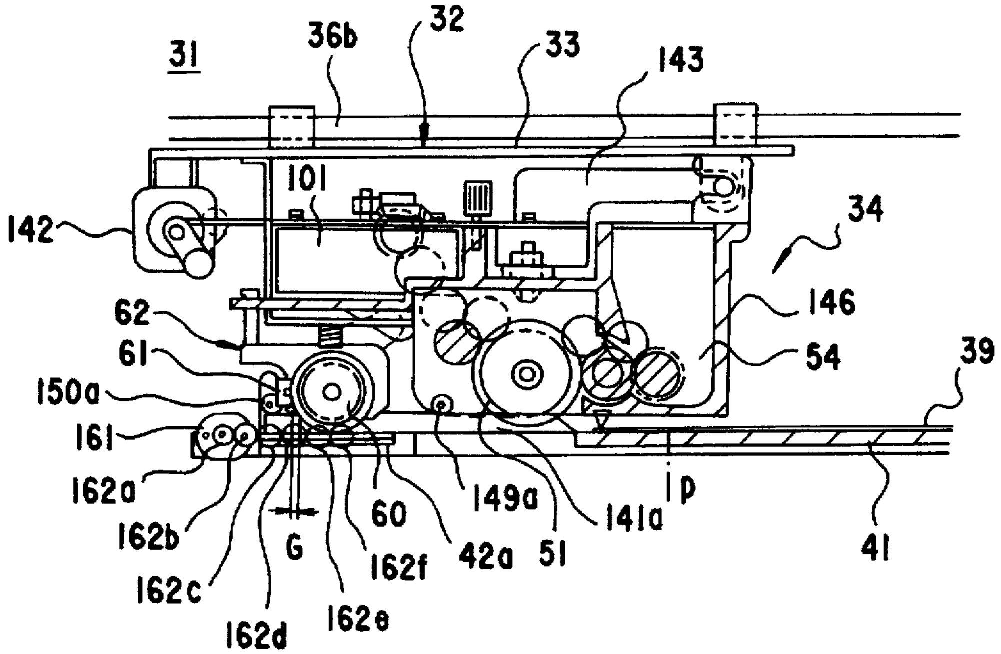

FIGS. 26A and 26B show an electrophotographic serial printer 31 in a sixth embodiment of the present invention.

In the printer 31 in the sixth embodiment, a motor 161 which rotates the fixing roller 60 when the carriage unit 32 is at the home position is arranged within a holding member 81*b*. The induction heating coil 42*a* which heats the fixing roller 60 is held by the holding member 81*b*. A gear 162*a* which is used to transmit a rotating force from the motor 161 is arranged on a rotating shaft of the motor 161. This gear 162*a* is connected to a plurality of gears 162*b* through 162*f* to transmit the rotating force from the motor 161 to the fixing roller 60.

The holding member 81*b* is made of a heat-resistant adiabatic resin material such as PPS.

When the carriage unit 32 in a raised condition returns back to the home position by the reverse rotation of the raising motor 142, the final gear 162*f* is engaged with a roller gear 60*b* on the fixing roller 60. As shown in FIG. 26B, the arrangement of the gears 162*a* through 162*f* and the roller gear 60*b* is made to avoid the striking of teeth of the engaged gears even when the fixing roller 60 is slightly lowered.

In the printer 31 in the sixth embodiment, the thermistor unit 61 which detects a temperature of the fixing roller 60 is arranged, adjacent to the fixing roller 60, to be not in contact with the surface of the fixing roller 60 when the carriage unit 32 is at the home position. The thermistor unit 61 is mounted on a leaf spring 163.

In FIG. 26B, the roller gear 60*b* of the fixing roller 60 and the gear 162*f* are engaged with each other. The leaf spring 163 and a roller 150*a* of the holding member 62 are arranged so that they are connected to each other when the roller gear 60*b* and the gear 162*f* are engaged. This arrangement allows the thermistor unit 61 to be placed with a small gap G from the surface of the fixing roller 60 when the carriage unit is at the home position. In this embodiment, it is possible to prevent the surface of the fixing roller 60 from being damaged due to the contact with the thermistor unit 61.

In the printer 31 in FIG. 26A, a detection signal from the thermistor unit 61 is sent to each of a sheet feed control unit 164 and a heat control unit 165.

The sheet feed control unit 164 controls a sheet transport motor (not shown) which rotates the guide shafts 36*a* and 36*b*. The guide shafts 36*a* and 36*b* are rotated to transport the recording sheet 39 in the sheet transport direction. This sheet transport motor is, for example, a stepping motor. An amount of the transport of the recording sheet 39 by the sheet transport motor is controlled by the sheet feed control unit 164 in accordance with the temperature of the fixing roller 60 indicated by the detection signal. Various predetermined amounts of the transport of the recording sheet 39 by the sheet transport motor corresponding to various temperatures of the fixing roller 60 in the form of a table are stored in a memory.

The heat control unit 165 controls the heating of the fixing roller 60 by the induction heating coil 42*a* in accordance with the temperature of the fixing roller 60 indicated by the detection signal. The heat control unit 165 is, for example, a known bridge circuit. The heat control unit 165 detects the temperature of the fixing roller 60 in response to a resistance of the thermistor unit 61, which is varied depending on the temperature of the fixing roller 60, and controls a high-frequency current supplied to the induction heating coil in accordance with the detected temperature of the fixing roller 60. Thus, the temperature of the fixing roller 60 is maintained to be constantly an appropriate fixing temperature.

In the sixth embodiment described above, two different modes of the operations are carried out by the thermistor unit 61. When the carriage unit 32 is at the home position, one of the two modes is carried out by the thermistor unit 61, that is, the thermistor unit 61 is used to detect the temperature of the fixing roller 60 to perform the controlling of the fixing roller 60. When the carriage unit 32 is at a predetermined position which is apart from the home position, the other mode is carried out by the thermistor unit 61. That is, it is used to detect a temperature within the apparatus 31 to perform the correction of the amount of the transport of the recording sheet 39 in accordance with the detected temperature, which will be described below.

The other parts of the printer 31 in the sixth embodiment are the same as corresponding parts in the fifth embodiment, and a description thereof will be omitted.

Figure 27A:
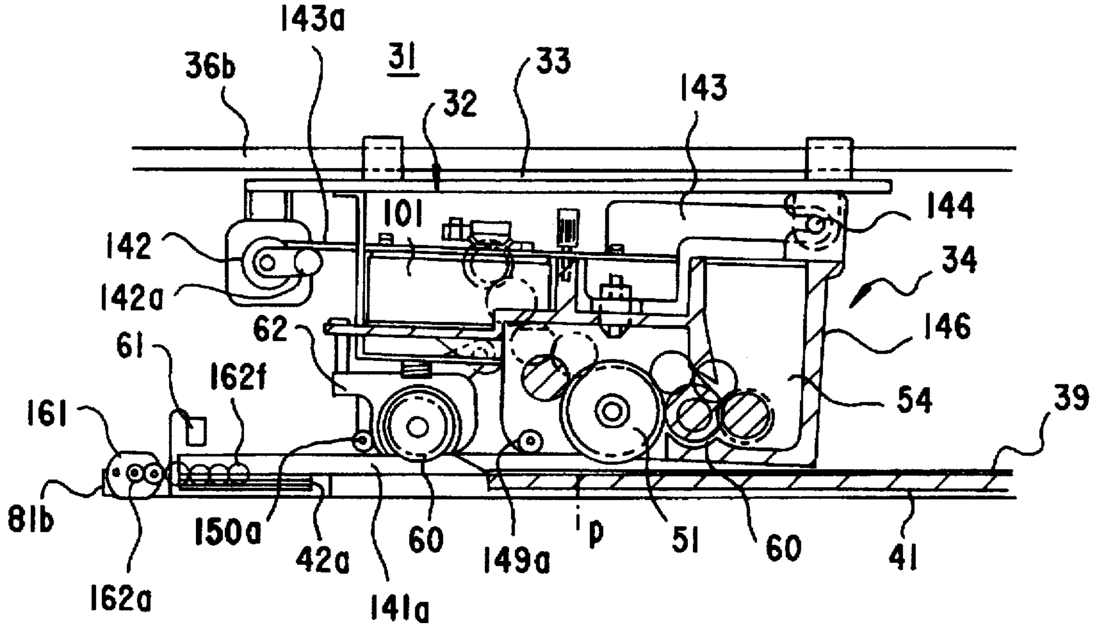
FIGS. 27A and 27B are diagrams for explaining an operation of the printer in the sixth embodiment.
Figure 27B:
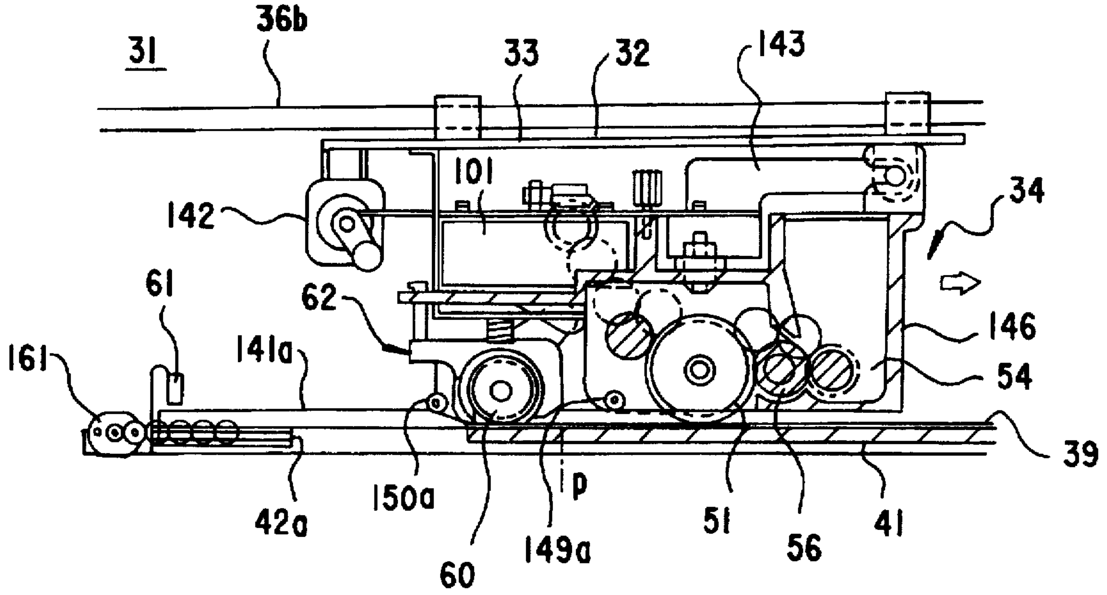

FIGS. 27A and 27B show the operation of 5 the printer in the sixth embodiment. As described above, in FIG. 26A, the carriage unit 32 returns back to the home position. The carriage frame 146 is set at the raised condition by the rotation of the raising motor 142. The fixing roller 60 and the photosensitive drum 51 are also at the raised condition above the transferring unit 41, and the rollers 149*a* and 149*b* and the rollers 150*a* and 150*b* are not in contact with the rails 141*a* and 141*b*.

In FIG. 26B, the cam 142*a* is rotated clockwise by the raising motor 142 to release the extended portion 143*a* of the frame 143. The carriage frame 146 is lowered, and the rollers 149*a* and 149*b* and the rollers 150*a* and 150*b* are brought into contact with the rails 141*a* and 141*b*. The raised condition of the fixing roller 60 and the photosensitive drum 51 is maintained. At this time, the roller gear 62*b* of the fixing roller 60 is engaged with the gear 162*f*.

As the motor 161 is rotated, the rotating force from the motor 161 is transmitted to the fixing roller 60 through the gears 162*a*–162*f*, and the fixing roller 60 is rotated. The high-frequency current, which is controlled by the heat control unit 165 by using the result of the detection from the thermistor unit 61, is supplied to the induction heating coil 42*a*. Thus, the entire fixing roller 60 is heated by the induction heating coil 42*a* to an appropriate fixing temperature since the fixing roller 60 is heated while it is rotated by the motor 161. Therefore, this sixth embodiment can prevent the occurrence of irregular fixing of the toner image to the recording sheet 39 by the fixing roller 60.

In FIG. 27A, the carriage unit 32 is moved toward the print starting position "P". The cam 142*a* is rotated counterclockwise by the raising motor 142 to raise the extended portion 143*a* of the frame 143. The photosensitive drum 51 and the fixing roller 60 are still set at the raised condition, and placed at a predetermined position which is apart from the home position and above the print starting position "P".

The carriage unit 32 at this time is in a waiting condition here, regardless of whether the fixing roller 60 is heated or not. The thermistor unit 61 is switched to the other of the two modes, and the thermistor unit 61 in this mode is used to detect the temperature within the apparatus 31. An amount of the transport of the recording sheet 39 by the sheet transport motor is determined by the sheet feed control unit 164 based on the stored table in accordance with the temperature detected by using the thermistor unit 61. As the cam 142*a* is rotated clockwise by the raising motor 142 to release the frame 143, the photosensitive drum 51, together with the fixing roller 60, is placed at the print starting position "P" on the recording sheet 39. After the recording sheet 39 is transported in the sheet transport direction in accordance with the determined amount of the transport from the sheet feed control unit 164, the photosensitive drum 51 on the carriage unit 32 is placed at the print starting position.

FIG. 27B shows a condition of the carriage unit 32 in which the printing is started from the print starting position "P" on the recording sheet 39. Therefore, the above sixth embodiment allows the printing apparatus 31 to start the printing at the accurate print starting position (e.g., at the top of the first line of one page) on the recording sheet 39.

Figure 28A:
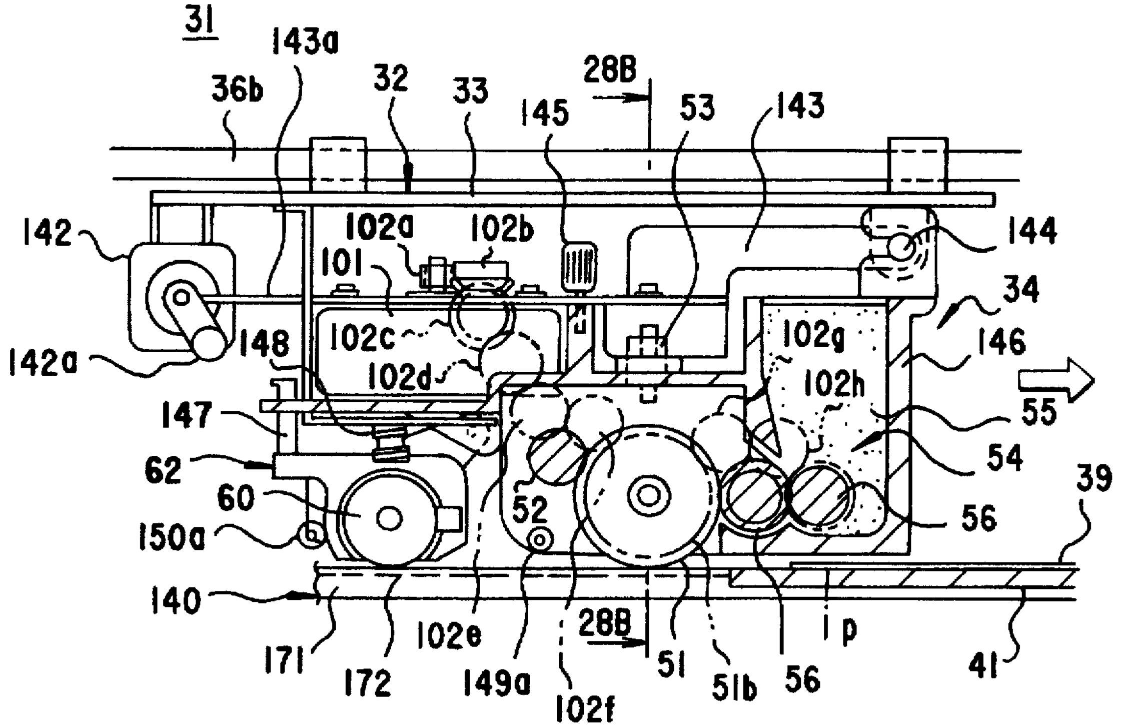
FIGS. 28A and 28B are diagrams showing an electrophotographic serial printer in a seventh embodiment of the present invention.
Figure 28B:
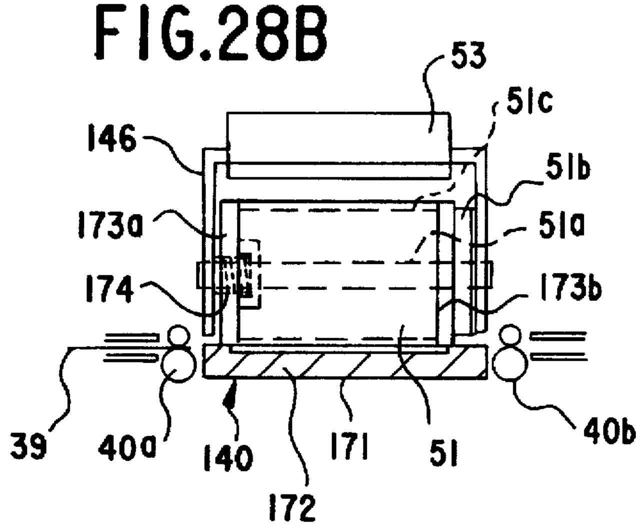

FIGS. 28A and 28B show an electrophotographic serial printer 31 in a seventh embodiment of the present invention. FIG. 28A is a diagram showing the carriage unit 32 of the printer 31 in this embodiment, and FIG. 28B is a cross-sectional view of the carriage unit 32 taken along a line B—B in FIG. 28A. In this embodiment in FIG. 28A, an initial exposure area 171 is provided between the two rails 141*a* and 141*b* (not shown in FIGS. 28A and 28B) and the transferring unit 41, and a groove 172 with a predetermined width (shown in FIG. 28B) is formed in the initial exposure area 171 in the frame 140. The other parts in this embodiment are the same as corresponding parts in FIGS. 23A and 23B, and a description thereof will be omitted.

In FIG. 28B, the photosensitive drum 51 comprises an organic photosensitive layer 51*c* formed on the aluminum hollow cylinder, resin flanges 173*a* and 173*b* fitted on the sides of the photosensitive drum 51, and a drum gear 51*b* on one side of the photosensitive drum 51.

The rotating shaft 51*a* of the photosensitive drum 51 is rotatably attached to the carriage frame 146. A spring 174 is arranged between the flange 173*a* of the photosensitive drum 51 and the carriage frame 146, and the photosensitive drum 51 is pressed toward the frame 173*b* by a biasing force of this spring 174.

The groove 172 which is formed in the initial exposure area 171 in the frame 140 has the predetermined width. This width is determined to be great enough for the edges of the groove 172 not to contact the organic photosensitive layer 51*c* of the photosensitive drum 51. Only the flanges 173*a* and 173*b* of the photosensitive drum 51 are brought into contact with the frame 140. Therefore, when the photosensitive drum 51 is moved around the initial exposure area 171 while it is rotated, the organic photosensitive layer 51*c* does not contact the frame 140.

Figure 29A:
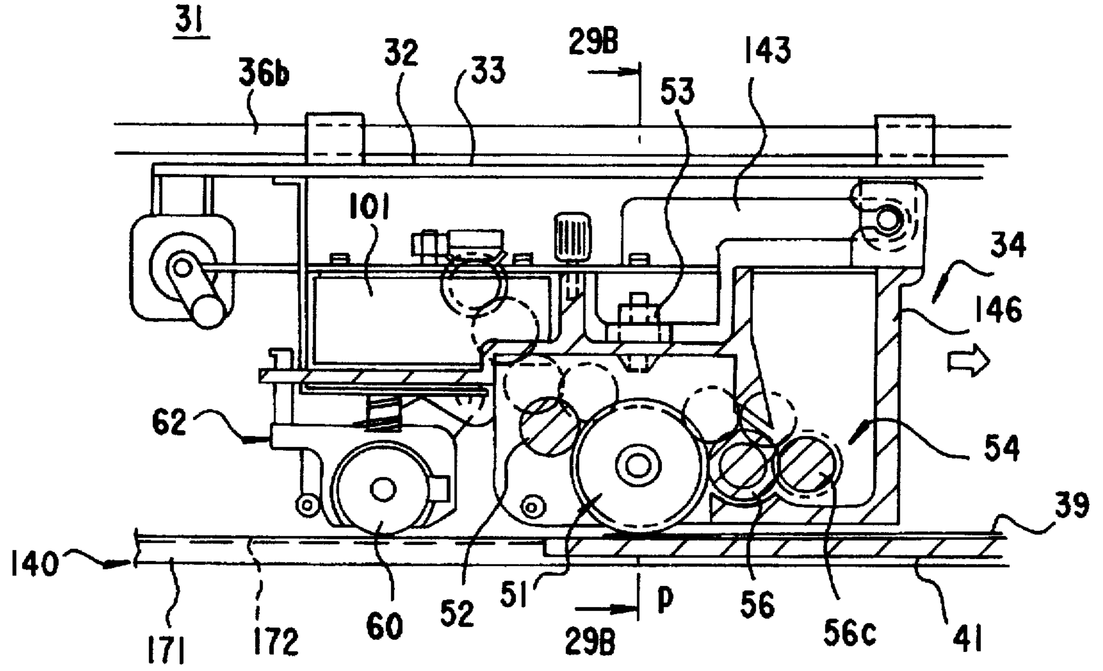
FIGS. 29A and 29B are diagrams for explaining an operation of the printer in the seventh embodiment.
Figure 29B:
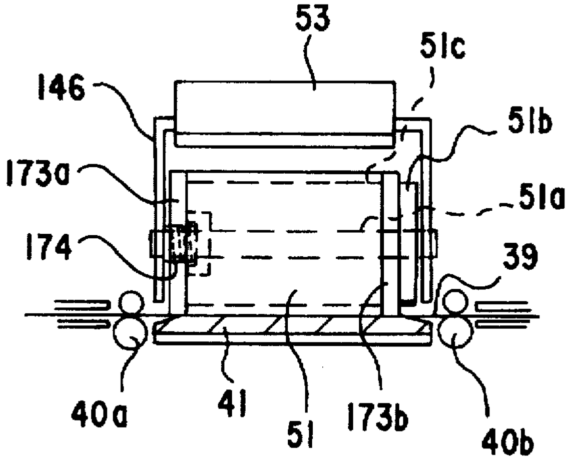

FIGS. 29A and 29B show the operation of the printer in the seventh embodiment. FIG. 29A is a diagram showing the carriage unit 32 which is moved to the print starting position "P". FIG. 29B is a cross-sectional view of the carriage unit 32 taken along a line C—C in FIG. 29A.

In FIGS. 28A and 28B, the carriage unit 32 is moved from the home position, and the photosensitive drum 51 is placed in the initial exposure area 171. The photosensitive drum 51 at this position is rotated. The photosensitive drum 51 is uniformly charged by the charging unit 52, and the photosensitive layer 51*c* of the photosensitive drum 51 is initially exposed by the exposure unit 53 to form an electrostatic latent image on the photosensitive drum 51. This latent image is developed by the developing unit 54 with the toner 55 to form a toner image on the photosensitive drum 51. As the photosensitive layer 51*c* of the photosensitive drum 51 at this position is not in contact with the frame 140 because of the groove 172, the arrangement of the above seventh embodiment gives no influences on the charging, the exposure and the developing of the photosensitive drum 51.

In FIGS. 29A and 29B, the carriage unit 32 is moved from the initial exposure area 171, and the photosensitive drum 51 on the carriage unit 32 is placed at the print starting position "P" on the recording sheet 39 on the transferring unit 41. The toner image on the photosensitive layer 51*c* of the photosensitive drum 51 is transferred to the recording sheet 39 by the transferring unit 41. Thereafter, the toner image is fixed to the recording sheet 39 by the fixing roller 60.

Regarding the forming of the toner image on the photosensitive drum 51, a jitter may take place if the photosensitive drum 51 has a too small moment of inertia or if the gears 102*a*–102*f* have a too great amount of backlash or engagement.

For the sake of simplicity of the explanation, suppose the backlash or engagement of the gears 102*a*–102*f* is always constant. The moment of inertia of the photosensitive drum 51 greatly depends on whether or not the photosensitive drum 51 contacts the transferring unit 41 or the recording sheet 39.

When the photosensitive drum 51 is not in contact with the transferring unit or the recording sheet 39 (i.e., when it is set at the raised condition), the moment of inertia of the photosensitive drum 51 is very small, and a great amount of jitter is likely to occur because of the backlash or engagement of the gears 102*a*–102*f*.

On the other hand, when the photosensitive drum 51 is in contact with the transferring unit 41 or the recording sheet 39, the moment of inertia of the photosensitive drum 51 becomes sufficiently great as the frictional force on the photosensitive drum 51 is added. Only a relatively small amount of jitter in the toner image on the photosensitive drum 51 occurs due to the backlash or engagement of the gears 102*a*–102*f*.

In the above seventh embodiment, when the photosensitive drum 51 is in the initial exposure area 171 on the frame 140, the flanges 173*a* and 173*b* are in contact with the frame 140, and when the photosensitive drum 51 is moved to the print starting position "P" and further moved therefrom to carry out the printing, the photosensitive drum 51 is in contact with the recording sheet 39 or the transferring unit 41. The influences of the backlash or engagement of the gears 102*a*–102*f* on the occurrence of the jitter are substantially the same for both cases. Therefore, it is possible to create a good quality of printed image without producing a defective image due to irregular exposure.

Figure 30A:
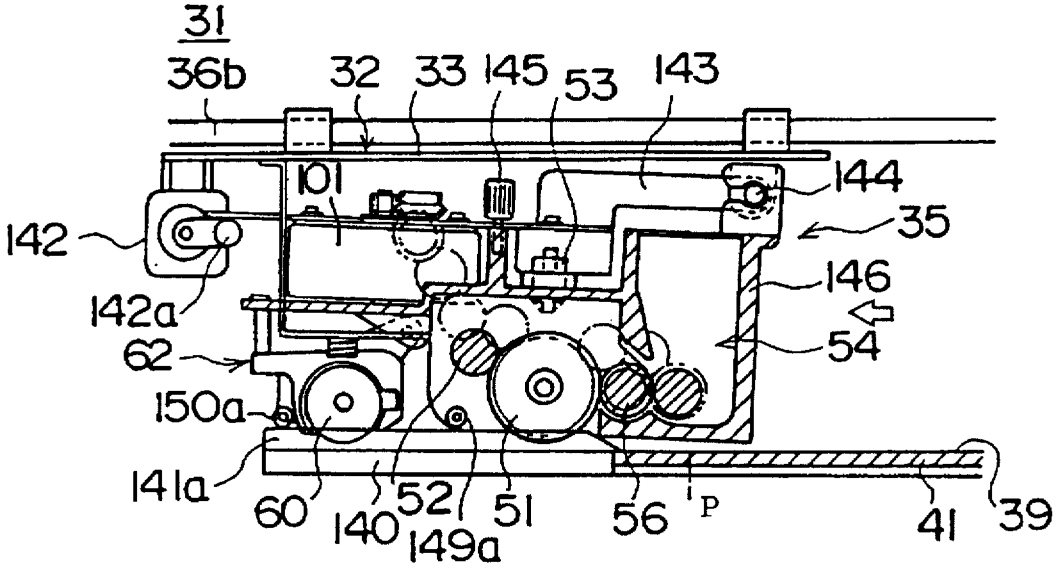
FIGS. 30A and 30B are diagrams showing another electrophotographic serial printer in the seventh embodiment.
Figure 30B:
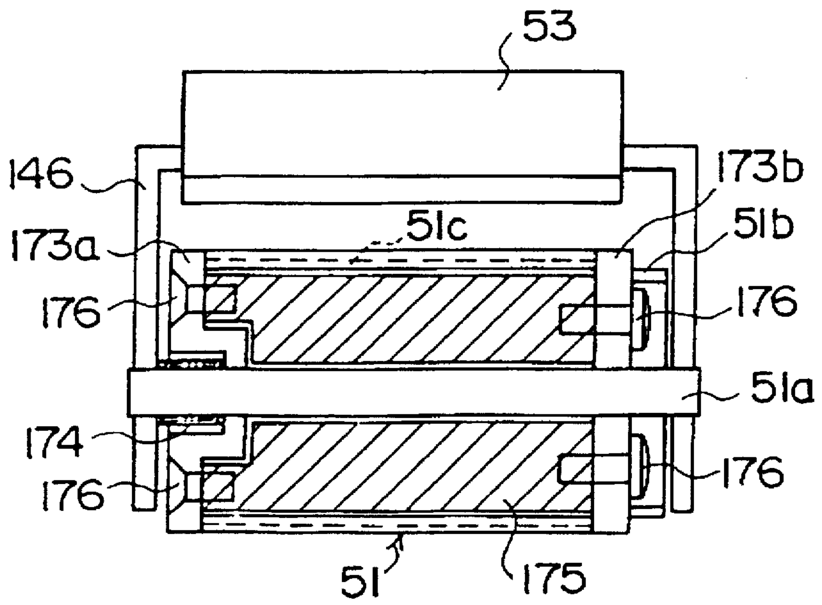

FIGS. 30A and 30B show another electrophotographic serial printer 31 in the seventh embodiment. FIG. 30A is a diagram showing the carriage unit 32 of the printer 31 in this embodiment, and FIG. 30B is a cross-sectional view of the carriage unit 32 in FIG. 30A.

In the carriage unit 32 in FIGS. 30A and 30B, a different photosensitive drum 51 is arranged. The other parts in this embodiment are the same as corresponding parts in FIGS. 23A and 23B, and a description thereof will be omitted.

In FIG. 30B, the photosensitive drum 51 comprises the organic photosensitive layer 51*c* formed on the aluminum hollow cylinder, and a weight 175 arranged within the aluminum hollow cylinder. The weight 175 is made of a large density metallic material such as iron. The photosensitive drum 51 further comprises the resin flanges 173*a* and 173*b* fitted on the sides of the photosensitive drum 51, and the drum gear 51*b* on one side of the photosensitive drum 51. The flanges 173*a* and 173*b* are secured to the weight 175 by using screws 176.

The rotating shaft 51*a* of the photosensitive drum 51 is rotatably attached to the carriage frame 146. The spring 174 is arranged between the flange 173*a* of the photosensitive drum 51 and the carriage frame 146, and the photosensitive drum 51 is pressed toward the frame 173*b* by a biasing force of this spring 174.

Figure 31:
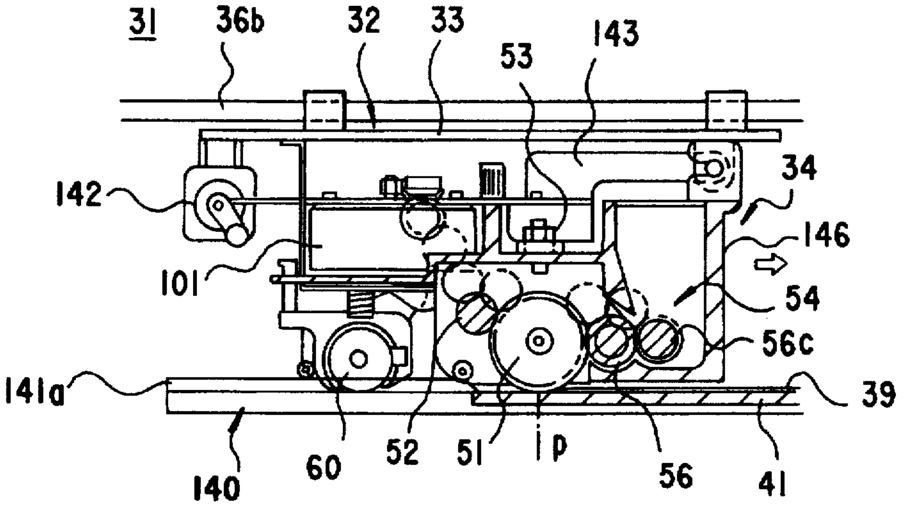
FIG. 31 is a diagram for explaining an operation of the printer in FIGS. 30A and 30B.

FIG. 31 shows the operation of the printer in FIGS. 30A and 30B. In FIG. 30A, the carriage unit 32 is set at the raised condition by the rotation of the raising motor 142 and returns back to the home position. Similarly to the embodiment shown in FIG. 24B, the cam 142*a* is rotated clockwise by the raising motor 142 to raise the frame 143, and the rollers 149*a* and 149*b* and the rollers 150*a* and 150*b* are in contact with the rails 141*a* and 141*b* when the carriage unit 32 is at the home position.

Before the start of the printing, the photosensitive drum 51 which is at the raised condition is rotated by the process motor 101. The photosensitive drum 51 is charged and initially exposed to form a toner image (the developed image) on the photosensitive drum 51. In FIG. 31, the carriage unit 32 is moved to the print starting position "P", and the photosensitive drum 51 is brought into contact with the recording sheet 39 via the rails 141*a* and 141*b*. The transferring unit 41 transfers the toner image from the photosensitive drum 51 to the recording sheet 39, and thereafter the fixing roller 60 fixes the toner image to the recording sheet 39.

When the photosensitive drum 51 which is set at the raised condition in the initial exposure area is initially exposed while it is rotated, the above seventh embodiment can safely prevent the occurrence of a jitter because the photosensitive drum 51 including the weight 175 has a sufficiently large moment of inertia. Therefore, it is possible to create a good quality of printer image without producing a defective image due to irregular exposure.

Figure 32:
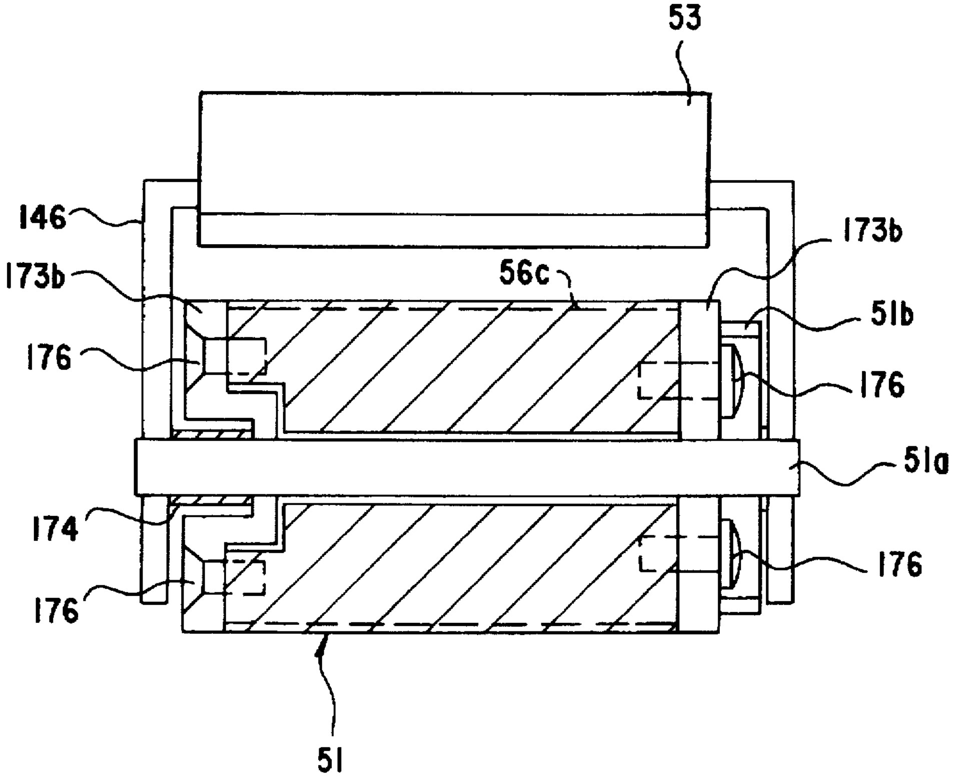
FIG. 32 is a diagram showing a photosensitive drum of the printer in the seventh embodiment.

FIG. 32 shows another photosensitive drum 51 of the printer in the seventh embodiment. In FIG. 32, the photosensitive drum 51 is made of a solid cylinder of a large-density metallic material. The photosensitive drum 51 comprises an organic photosensitive layer 51*c* formed on the solid cylinder, resin flanges 173*a* and 173*b* secured to the sides of the photosensitive drum 51, and the drum gear 51*b* on one side of the photosensitive drum 51. The flanges 173*a* and 173*b* are made of a resin material such as polyacetal resin (POM). The flanges 173*a* and 173*b* are secured to the solid cylinder by using screws 176.

The photosensitive drum 51 in this embodiment has a sufficiently large moment of inertia, and can create a good quality of printed image without producing a defective image due to irregular exposure.

Figure 33:
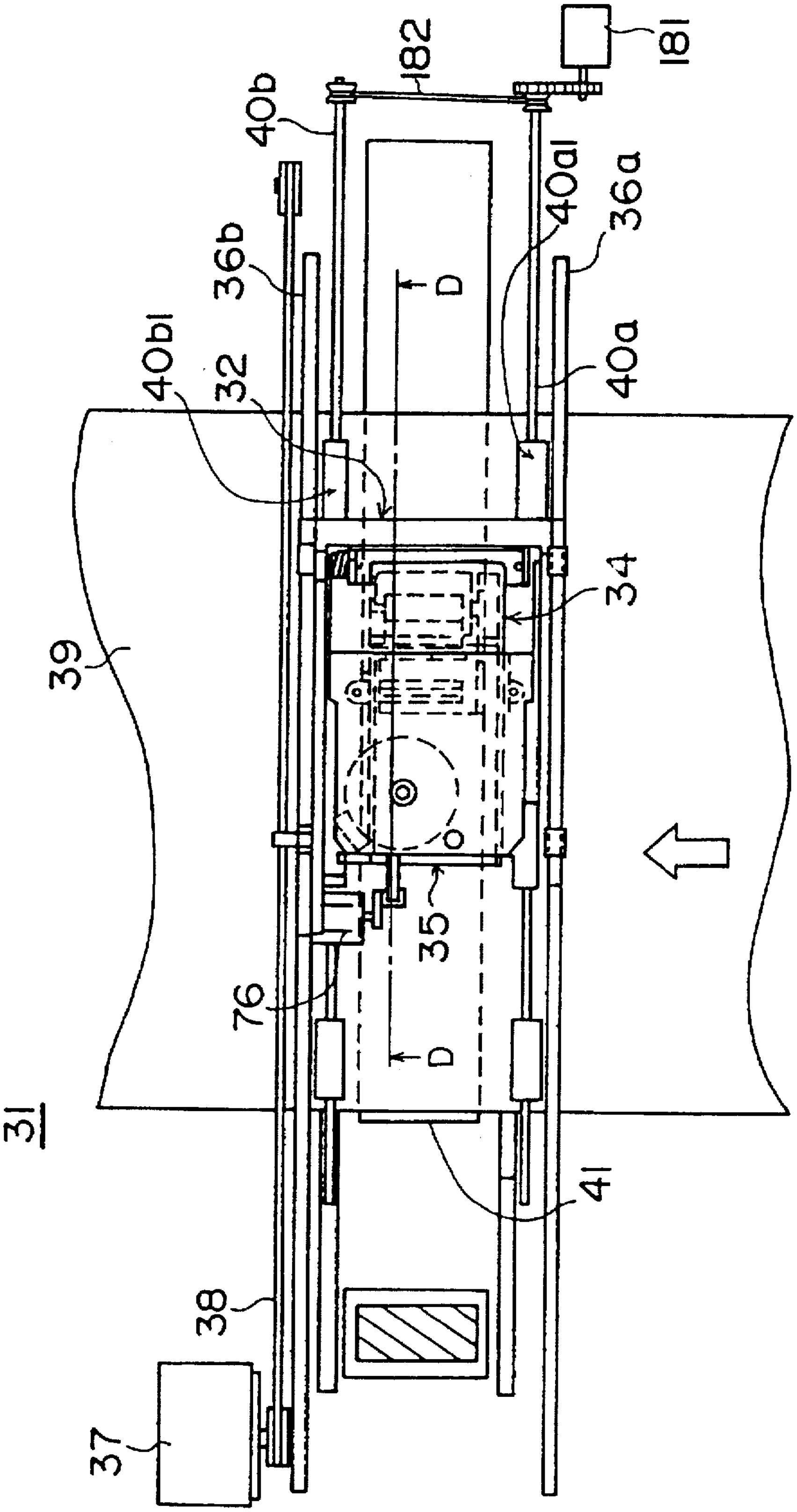
FIGS. 33, 34A and 34B are diagrams showing an electrophotographic serial printer in an eighth embodiment of the present invention.
Figure 34A:
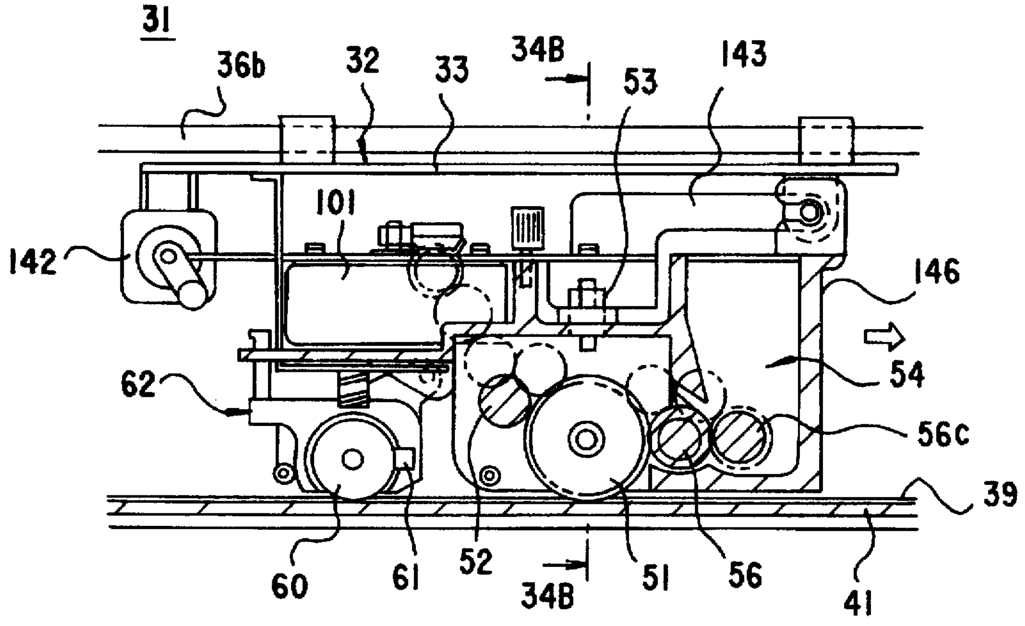
Figure 34B:
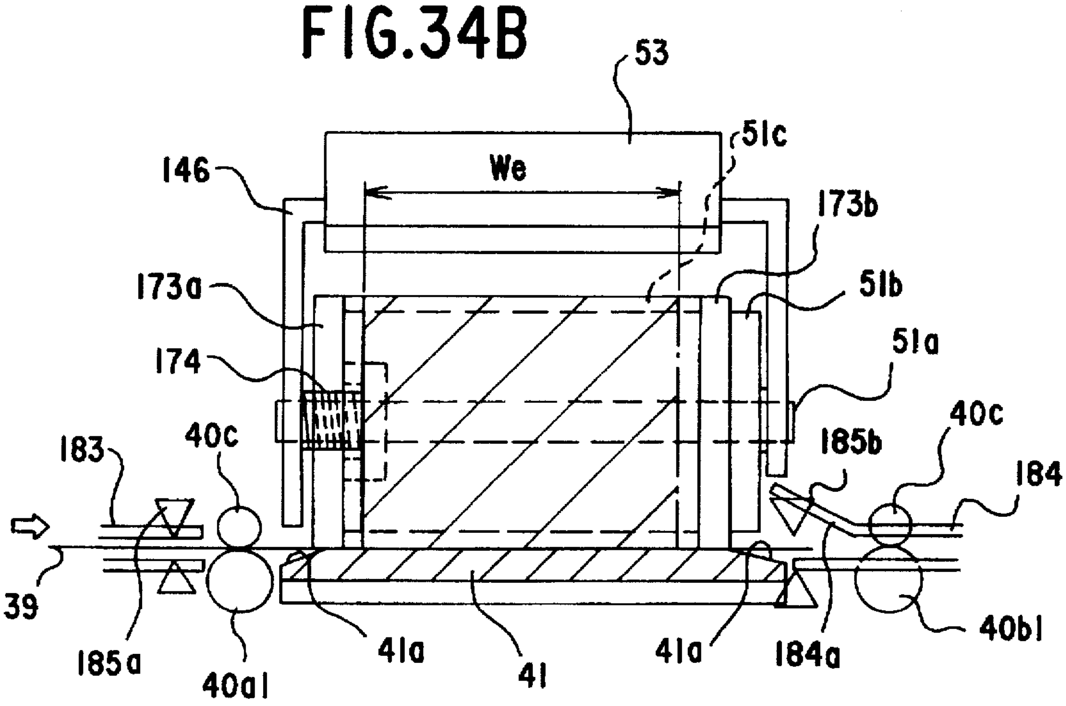

FIGS. 33, 34A and 34B shows an electrophotographic serial printer 31 in an eighth embodiment of the present invention. FIG. 33 is a top view of the printer 31 in the eighth embodiment, FIG. 34A is a cross-sectional view of the printer 31 taken along a line D—D in FIG. 33, and FIG. 34B is a cross-sectional view of the printer 31 taken along a line E—E in FIG. 34A.

In the electrophotographic serial printer 31 in FIG. 33, a plurality of sheet transport rollers $40a_1$ and $40b_1$ are inserted onto the rotating shafts 40*a* and 40*b*. The rotating shafts 40*a* and 40*b* are rotated by a stepping motor 181 via a belt 182, and the recording sheet 39 is transported in the sheet transport direction through the sheet transport rollers $40a_1$ and $40b_1$.

In FIG. 34B, a plurality of pinch rollers 40*c* are arranged to hold the recording sheet 39 between the pinch rollers 40*c* and the sheet transport rollers $40a_1$ and $40b_1$. The recording sheet 39 is transported while it is held between the pinch rollers 40*c* and the sheet transport rollers $40a_1$ and $40b_1$.

In the printer 31 in FIGS. 34A and 34B, transport guide units 183 and 184 are arranged on both sides of the transferring unit 41 along the sheet transport direction. The transport guide unit 184 at the outlet side of the transferring unit 41 includes a tapered portion 184*a* which is formed by bending the transport guide unit 184. This tapered portion 184*a* serves to prevent the occurrence of a paper jam when the recording sheet 39 is transported through the carriage unit 32. The transferring unit 41 includes tapered portions 41*a* which are formed on both sides of the transferring unit 41, and the tapered portions 41*a* are parts of the transferring unit 41 different from a effective printing length "We" of the photosensitive drum 51. A sheet edge sensor 185*a* which senses a leading edge of the recording sheet 39 is arranged near one end of the transport guide unit 183. A paper jam sensor 185*b* which detects occurrence of a paper jam of the recording sheet 39 is arranged near one end of the transport guide unit 184.

Figure 35A:
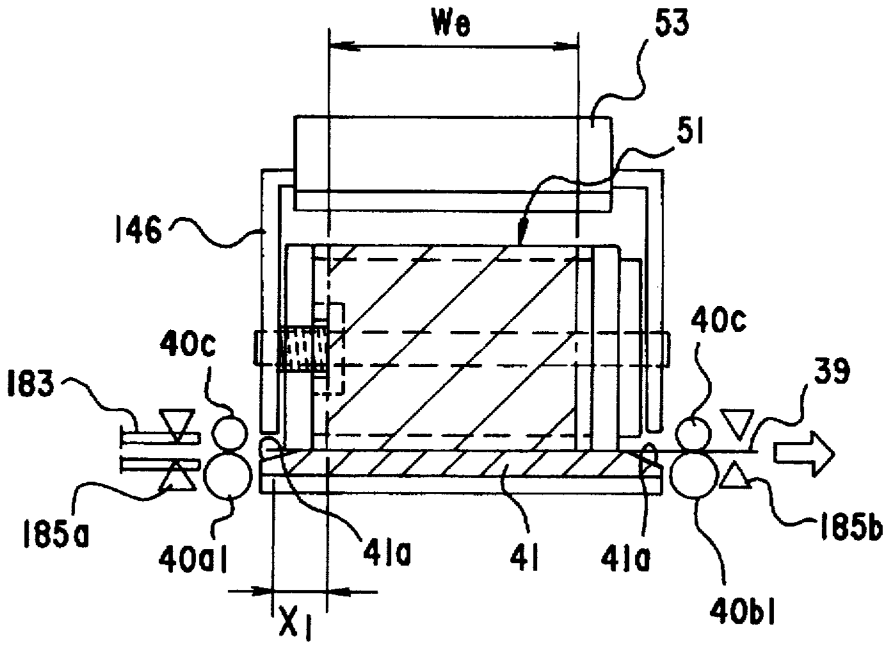
FIGS. 35A and 35B are diagrams for explaining a printing of a recording sheet performed by the printer in the eighth embodiment.
Figure 35B:
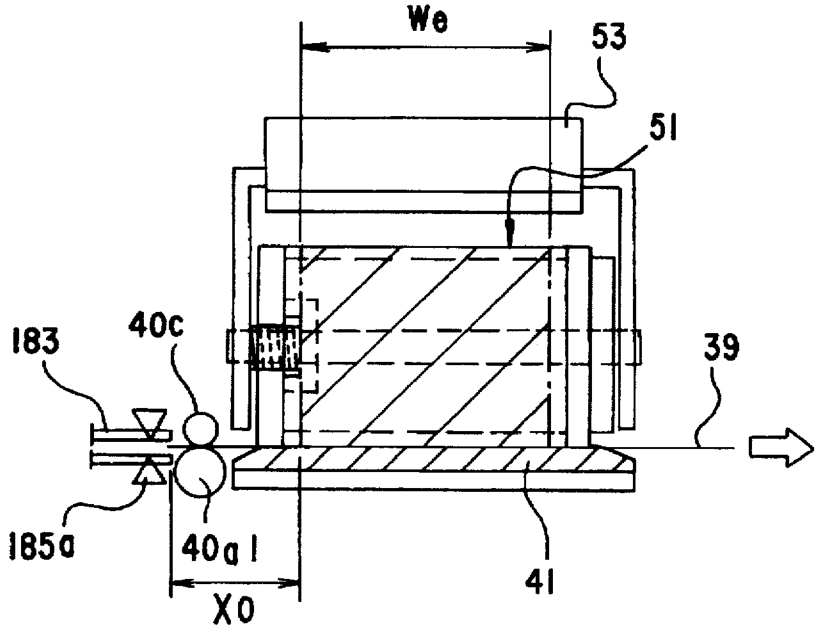

FIGS. 35A and 35B show a printing of a recording sheet performed by the printer 31 in the eighth embodiment.

In FIG. 35A, when the leading edge of the recording sheet 39 is sensed by the sheet edge sensor 185*a*, the sheet transport roller $40a_1$ is rotated to transport the recording sheet 39 by a predetermined distance until the recording sheet 39 reaches the sheet transport roller $40b_1$. After the printing of a number of lines of an image is performed by the printer 31, the trailing edge of the recording sheet 39 is released from the sheet transport roller $40a_1$. However, the recording sheet 39 at this time is still transported by the sheet transport roller $40b_1$. Accordingly, the printing of the image on the recording sheet 39 at an accurate location is realized by the printer 31 in the eighth embodiment.

A trailing edge margin at this time is indicated by "X1" in FIG. 35A.

FIG. 35B shows a printing of the recording sheet performed by another printer. In FIG. 35B, only the sheet transport roller $40a_1$ is arranged at one end of the printer and no sheet transport roller is arranged at the other end. In this printer, after the trailing edge of the recording sheet 39 is released from the sheet transport roller $40a_1$, it is difficult to accurately transport the recording sheet. A trailing edge margin at this time is a distance from the sheet transport roller $40a_1$ to one end of the print effective length of the photosensitive drum 51, which is indicated by "X0" in FIG. 35B.

Figure 36A:
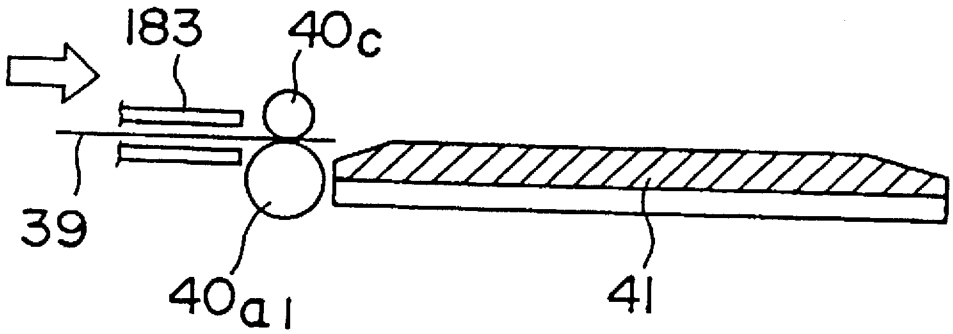
FIGS. 36A, 36B and 36C are diagrams for explaining a transporting of a recording sheet in a printer.
Figure 36B:
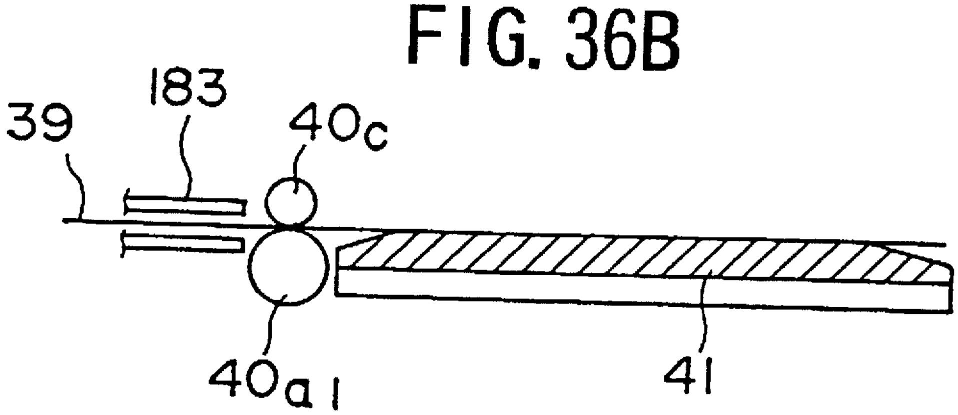
Figure 36C:
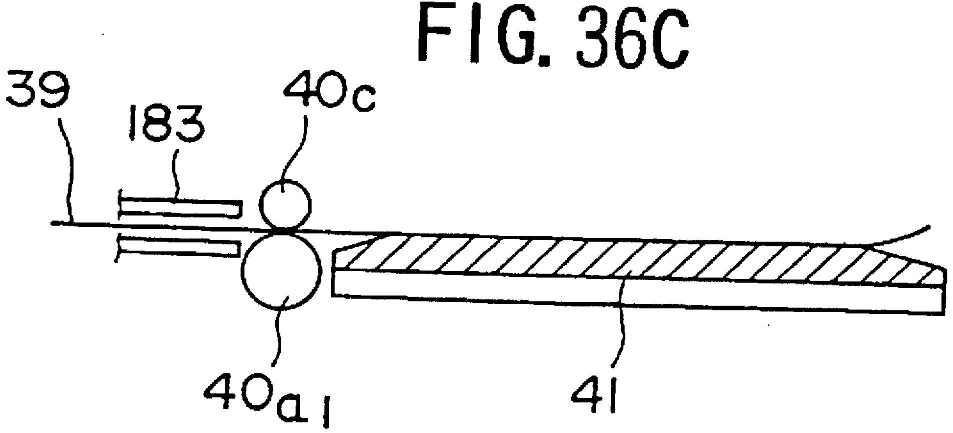
Figure 37A:
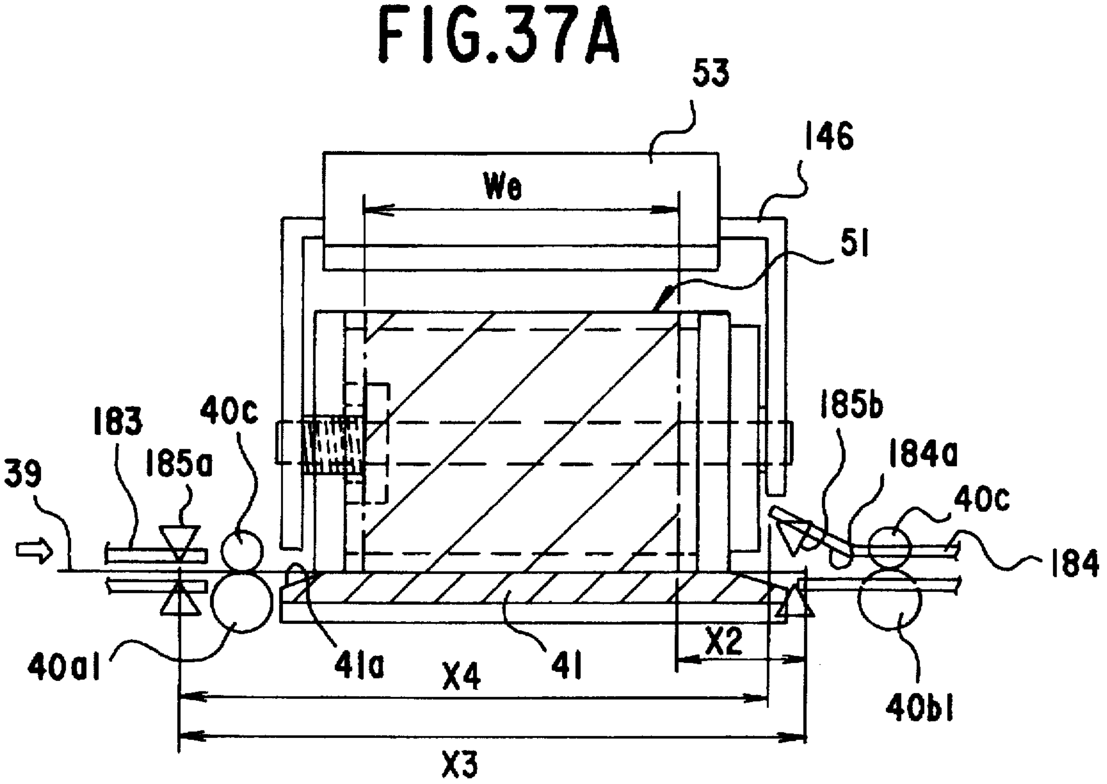
FIGS. 37A and 37B are diagrams for explaining a transporting of a recording sheet in the printer in the eighth embodiment.
Figure 37B:
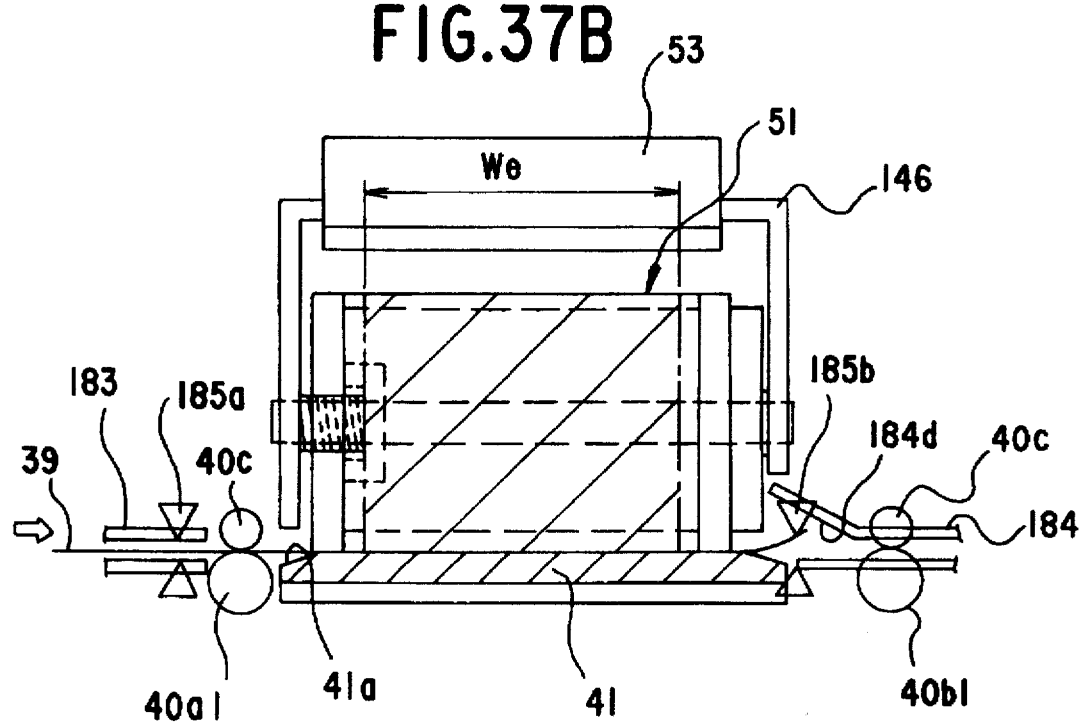

FIGS. 36A, 36B and 36C show a transporting of a recording sheet in a printer. FIGS. 37A and 37B show a transporting of a recording sheet in the printer in the eighth embodiment.

In FIG. 36A, the recording sheet 39 is pinched by the sheet transport roller $40a_1$ and the pinch roller 40*c* and transported in a direction perpendicular to the direction of the movement of the carriage unit.

In FIG. 36B, the recording sheet 39 is further transported and is in a condition before the fixing is performed by the fixing roller 60. The recording sheet 39 at this time is not subjected to heat or pressure, and it is straight.

In FIG. 36C, the recording sheet 39 is in a condition after the fixing is performed by the fixing roller 60. A portion of the recording sheet 39 heated by the fixing roller shrinks, and the remaining portion does not shrink. Thus, the leading edge of the recording sheet 41 after the fixing is performed by the fixing roller 60 is curled.

In FIG. 37A, a distance from the sheet edge sensor 185*a* to the leading edge of the transport guide unit 184 (on the side of the transferring unit 41) is indicated by "X4", a distance from the sheet edge sensor 185*a* to the leading edge of the recording sheet 39 is indicated by "X3", and a leading edge margin is indicated by "X2".

In the printer 31 in FIG. 37A, the leading edge of the recording sheet 39 is sensed by the sheet edge sensor 185*a*, and the recording sheet 39 is transported by the distance X3. This distance X3 is longer than the distance X4. The transporting of the recording sheet 39 is then stopped. The leading edge of the recording sheet 39 at this time is not pinched by the sheet transport roller $\mathbf{40b_1}$ and the pinch roller 40*c*. The leading edge of the recording sheet 39 is always transported to the paper jam sensor 185*b* around the tapered portion 184*a* of the transport guide unit 184. Whether or not a paper jam of the recording sheet 39 has occurred is detected by the sensor 185*b*.

In FIG. 37B, the fixing of the toner image to the recording sheet 39 is performed by the fixing roller 60, and the leading edge of the recording sheet 39 is curled. However, the leading edge of the recording sheet 39 is restricted by the tapered portion 184*b*. Thus, even when the recording sheet 39 with the leading edge being curled is subsequently transported, it is possible to prevent the occurrence of a paper jam of the recording sheet 39.

Figure 38:
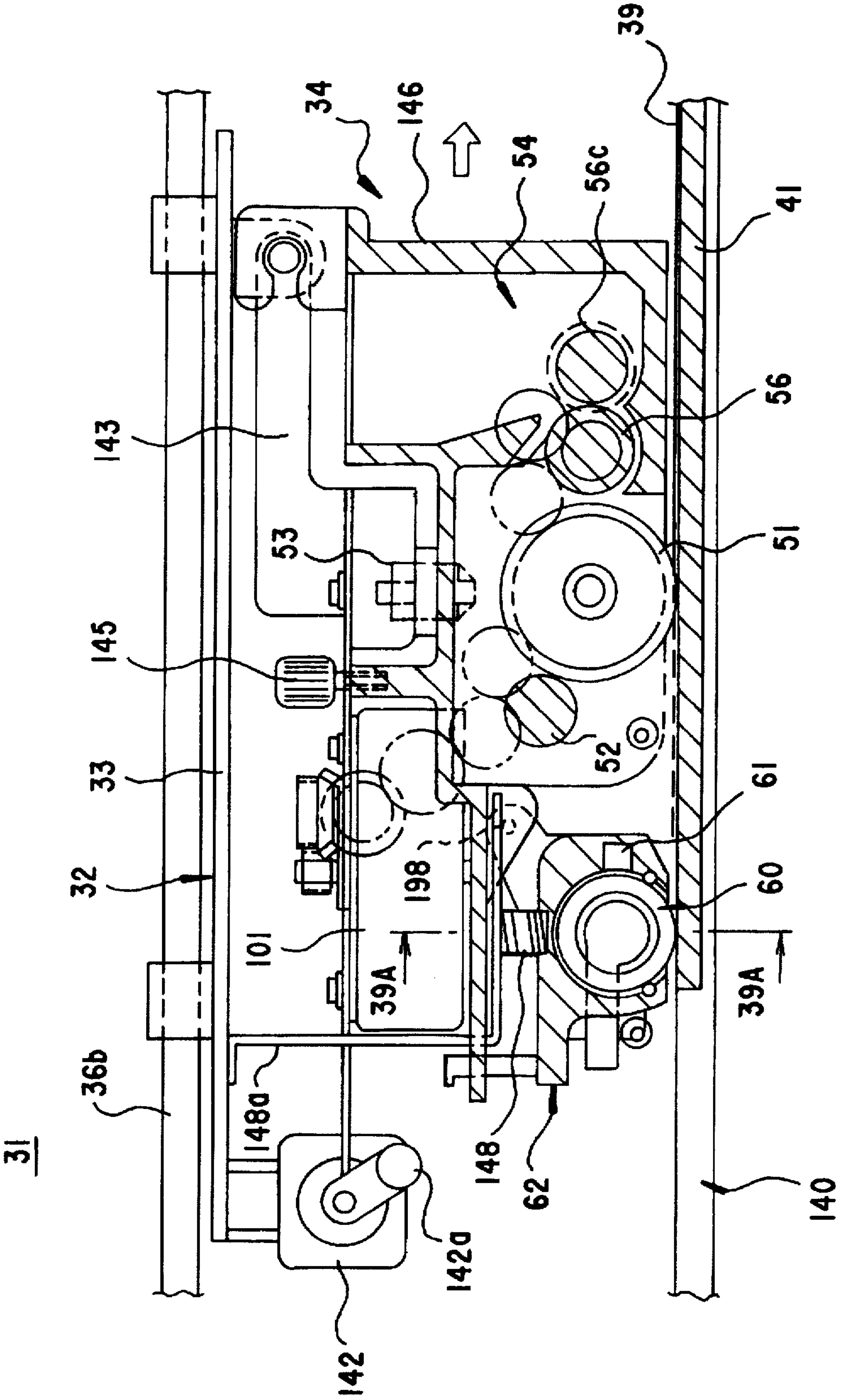
FIG. 38 is a diagram showing an electrophotographic serial printer in a ninth embodiment of the present invention.

FIG. 38 shows an electrophotographic serial printer 31 in a ninth embodiment of the present invention. The printer 31 in FIG. 38 includes a fixing roller 60 which is different from that in the above-described embodiments. The other parts are the same as corresponding parts in the above fifth embodiment except the induction heating coil, and a description thereof will be omitted.

Figure 39A:
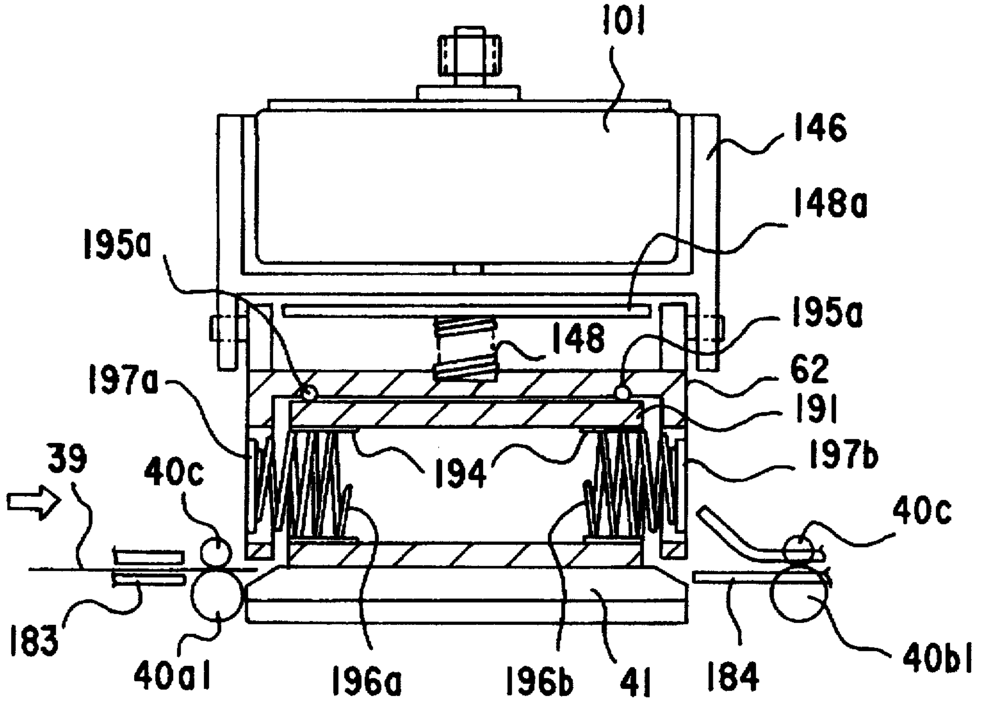
FIGS. 39A, 39B and 39C are diagrams showing a fixing roller of the printer in the ninth embodiment.
Figure 39B:
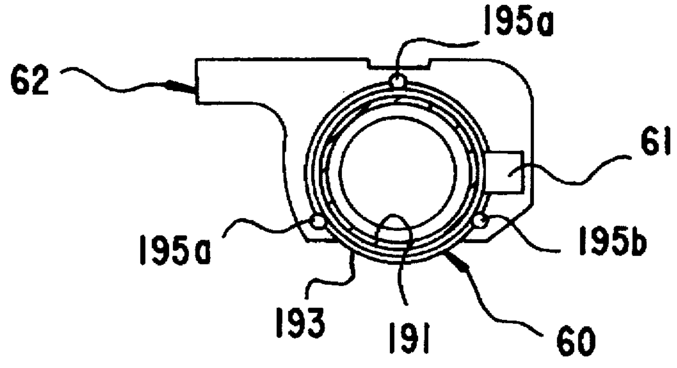
Figure 39C:
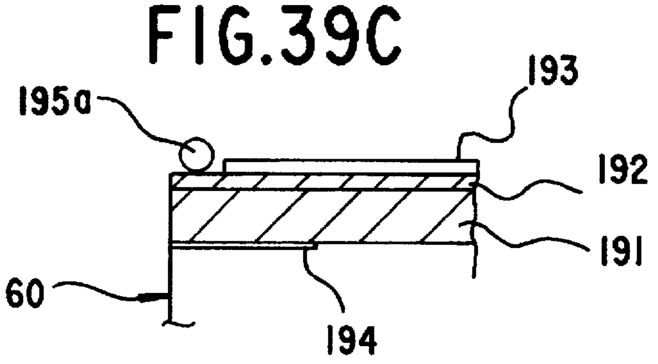
Figure 40A:
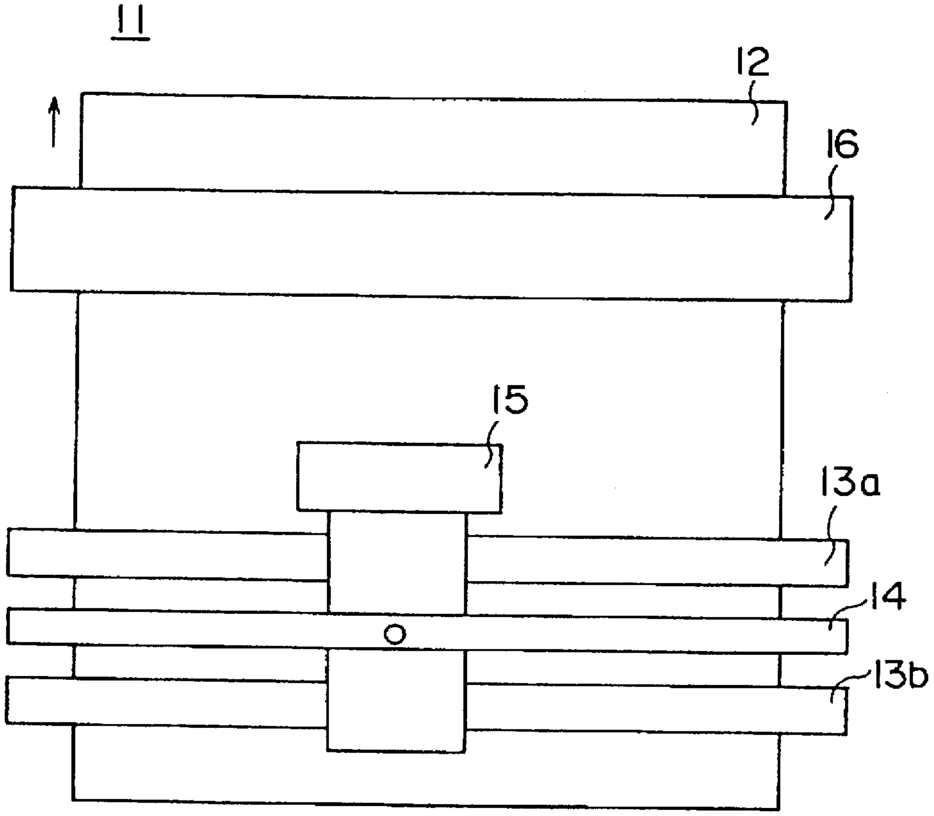
FIG. 40A PRIOR ART
FIG. 40A is a top view of a conventional electrophotographic serial printer.
Figure 40B:
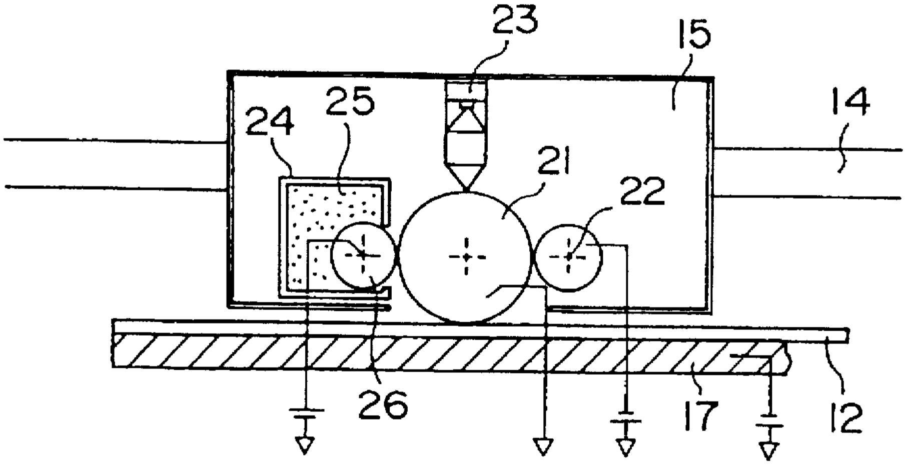
FIG. 40B PRIOR ART
FIG. 40B is a cross-sectional view of a carriage unit of the printer in FIG. 40A.
Figure 41:
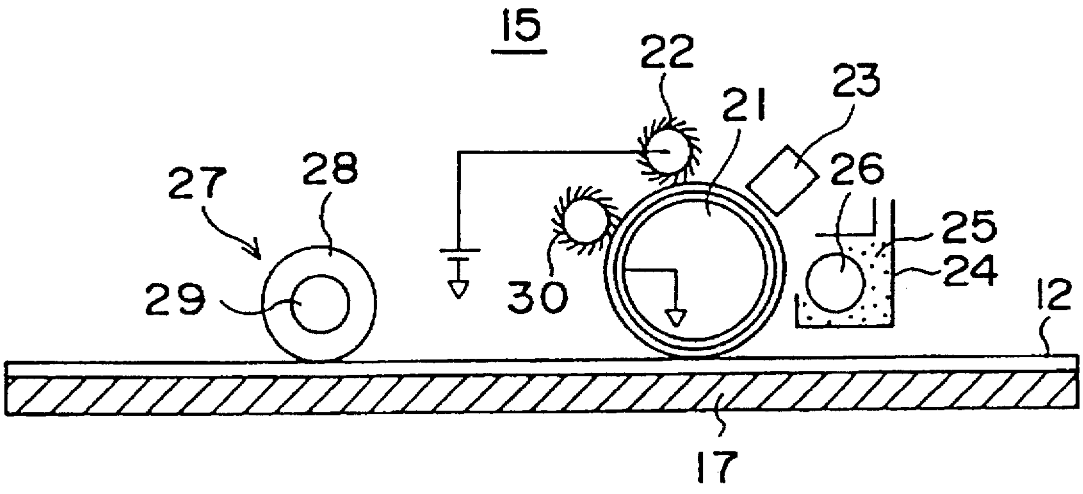
FIG. 41 PRIOR ART
FIG. 41 is a cross-sectional view of a carriage of a different conventional electrophotographic serial printer.

FIGS. 39A, 39B and 39C show the fixing roller 60 of the printer in the ninth embodiment. The fixing roller 60 comprises a ceramic heater element 191, an insulating layer 192 on an outside surface of the ceramic heater element 191, a non-carbon teflon-coating layer 193 on the insulating layer excluding end portions thereof, and an electrode layer 194 on an inside surface of the ceramic heater element 191 at both ends thereof.

The ceramic heater element 191 is a hollow cylinder. The insulating layer 192 is made of a polyimide material, and used to prevent a leakage of the magnetic energy to the outside. The teflon-coating layer 193 is likely to separate from the recording sheet 39. The electrode layer 194 is formed through an aluminum evaporation process, and only in end portions 10 mm from the ends of the heater element 191.

The holding member 62 is made of a heat-resistant adiabatic resin material such as PPS. The fixing roller 60 is supported on the holding member 62 by contacting balls 195*a*, 195*b* and 195*c* at each end of the holding member 62. The balls at each end of the holding member 62 are in contact with the end portions of the insulating layer 192 where no teflon-coating layer 193 is formed thereon. The insulating layer 192 has a hardness greater than a hardness of the teflon-coating layer 193.

In the fixing roller 60 described above, springs 196*a* and 196*b* are fitted into the ends of the fixing roller 60. The springs 196*a* and 106*b* are conductive as they are made of stainless steel or copper-bronze alloy. The springs 196*a* and 196*b* are connected to the electrode layers 194. Terminals 197*a* and 197*b* projecting from the sides of the fixing roller 60 are formed by the ends of the springs 196*a* and 196*b*. Power from a power supply (not shown) is supplied to these terminals 197*a* and 197*b*.

In the ninth embodiment in FIG. 38, the holding member 62 which holds and covers the fixing roller 60 is pressed down by the spring 148 against the transferring unit 41. The spring 148 is secured to the stay unit 148*a*. The holding member 62 is rotatable around a pin 198, and when the holding member 62 is rotated clockwise around the pin 198, the fixing roller 60 is set at the raised condition so that the fixing roller 60 is released from the recording sheet 39 or the transferring unit 41.

In the ninth embodiment in FIG. 38, the thermistor unit 61 which detects whether or not the temperature of the fixing roller 60 is above the reference temperature is arranged within the holding member 62 in contact with the fixing roller 60.

Further, the present invention is not limited to the above-described embodiments, and variations and modifications may be made without departing from the scope of the present invention.

What is claimed is:

1. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction; and heating means for heating the fixing roller through an induction heating to allow the developed image to be fixed to the recording sheet, wherein said holding member includes a tapered portion provided adjacent to the photosensitive drum to prevent an edge of the recording sheet from interfering with said holding member.

2. The apparatus according to claim 1, wherein said heating means comprises an induction heating coil which heats the fixing roller through the induction heating when current flows through the induction heating coil.

3. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction to and from a home position;

heating means for heating the fixing roller through an induction heating to allow the developed image to be fixed to the recording sheet;

means on said apparatus for stationarily mourning said heating means adjacent to the fixing roller when the carriage unit is at home position prior to a start of printing.

4. The apparatus according to claim 3, wherein said heating means is held by a guide member made of a heat-resistant resin material.

5. The apparatus according to claim 4, wherein said guide member comprises a projection for limiting the movement of the carriage unit at a predetermined position, said projection being arranged on said guide member to contact the holding member when the carriage unit is at the home position.

6. An electrophotographic serial printing apparatus including an apparatus frame comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet, wherein said carriage unit is arranged within said frame of said apparatus, and said frame comprises a carriage stopper for limiting the movement of the carriage unit at a predetermined position, said carriage stopper being arranged on said frame to contact a part of the carriage unit when the carriage unit is at a home position.

7. An electrophotographic serial printing apparatus comprising:

transporting means for transporting a recording sheet in a sheet transport direction;

processing means which includes means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet;

a carriage unit on which both said processing means and said fixing means are arranged;

moving means for moving said carriage unit over the transferring means in directions perpendicular to the sheet transport direction;

heating means for heating the fixing roller of the fixing means through an induction heating when the carriage unit is at a home position prior to a start of printing, to allow the developed image to be fixed to the recording sheet; and rotating means for rotating said fixing roller when the carriage unit is at the home position, at the same time as the heating of the fixing roller by said heating means.

8. The apparatus according to claim 7, wherein said fixing roller is held by a holding member made of a heat-resistant resin material.

9. The apparatus according to claim 7, wherein said rotating means rotates the fixing roller by using a rotating force from a process rotating unit which rotates said photosensitive drum, said rotating force being transmitted to the fixing roller through a plurality of gears.

10. The apparatus according to claim 9, further comprising roller cleaning means for cleaning said fixing roller, said fixing roller and said roller cleaning means being brought into contact with each other when the carriage unit is at the home position.

11. The apparatus according to claim 10, wherein said roller cleaning means is detachably attached to a holding member which holds said heating means.

12. The apparatus according to claim 7, further comprising drum cleaning means for cleaning said photosensitive drum, said photosensitive drum and said drum cleaning means being brought into contact with each other when the carriage unit is at the home position.

13. The apparatus according to claim 12, wherein said drum cleaning means comprises a drum cleaning roller which is rotated at a peripheral velocity, said peripheral velocity of said drum cleaning roller being controlled in accordance with a rotating speed of the photosensitive drum.

14. The apparatus according to claim 12, wherein said drum cleaning means comprises a cleaning blade for removing a toner on the photosensitive drum and a toner box for storing the toner removed by said cleaning blade.

15. The apparatus according to claim 12, wherein said drum cleaning means is detachably arranged on said apparatus at a fixed position which is adjacent to the photosensitive drum when the carriage unit is at the home position.

16. The apparatus according to claim 7, wherein said rotating means comprises a drive motor which generates a rotating force, and a gear unit which transmits the rotating force, generated by said drive motor, to the fixing roller, thereby rotating the fixing roller.

17. The apparatus according to claim 7, further comprising a temperature detecting unit which detects a temperature of the fixing roller, said temperature detecting unit being arranged adjacent to the fixing roller at a position where the fixing roller is heated by the heating means.

18. The apparatus according to claim 17, wherein the detection of the temperature of the fixing roller is carried out by said temperature detecting unit when the fixing roller is heated or when the carriage unit is at a predetermined position different from the home position.

19. The apparatus according to claim 18, further comprising:

first control means for controlling said heating means in accordance with a result of the detection by said temperature detecting unit; and second control means for controlling an amount of the transport of the recording sheet by said transporting means in accordance with the result of the detection by said temperature detecting unit when the carriage unit is at said predetermined position.

20. An electrophotographic serial printing apparatus comprising:

transporting means for transporting a recording sheet in a sheet transport direction;

processing means which includes means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixed roller after the developed image is transferred to the recording sheet, said fixing means including a holding member for holding said fixing roller, said fixing roller including a rotating shaft, said holding member containing enlarged openings for maintaining said fixing roller loosely fitted into said enlarged openings of said holding member;

a carriage unit on which both said processing means and said fixing means are arranged;

moving means for moving said carriage unit over the transferring means in directions perpendicular to the sheet transport direction;

heating means for heating the fixing roller of the fixing means through an induction heating when the carriage unit is at a home position prior to a start of printing, to allow the developed image to be fixed to the recording sheet; and spring means for pressing down the fixing roller on the recording sheet against the transferring means to rotate the fixing roller at the same time as the rotation of the photosensitive drum.

21. The apparatus according to claim 20, wherein the rotating shaft of the fixing roller is cylindrical, and said holding member includes rectangular holes into which the rotating shaft of the fixing roller is loosely fitted, said rotating shaft having a diameter smaller than a width of the rectangular holes of the holding member.

22. The apparatus according to claim 20, wherein the rotating shaft of the fixing roller is integrally formed with flanges provided at both ends of the fixing roller.

23. The apparatus according to claim 20, further comprising a thermistor unit which detects whether or not a temperature of the fixing roller is above a predetermined reference temperature, said thermistor unit being provided adjacent to the fixing roller, and the heating of the fixing roller by said heating means being started based on a result of the detection by said thermistor unit.

24. The apparatus according to claim 23, wherein said heating means is provided outside the fixing roller, and said thermistor unit is provided within the fixing roller.

25. The apparatus according to claim 23, wherein said heating means is provided within the fixing roller, and said thermistor unit is arranged adjacent to the fixing roller when the carriage unit is at the home position.

26. The apparatus according to claim 23, wherein said thermistor unit is arranged adjacent to the fixing roller so that the thermistor unit and the fixing roller are in contact with each other or not in contact with each other.

27. The apparatus according to claim 23, wherein a cable from said thermistor unit is taken out from the fixing roller through a central hole of a rotating shaft of the holding member.

28. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet;

raising means in said carriage unit for raising the processing means to release the processing means from the recording sheet on the transferring means, and for raising the fixing means, after the processing means is raised, to release the fixing means from the recording sheet on the transferring means.

29. The apparatus according to claim 28, wherein said holding member which holds the fixing roller is made of a heat-resistant resin material.

30. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet;

raising means for raising at least one of the photosensitive drum and the fixing roller above the transferring means to release said at least one of the photosensitive drum and the fixing roller from the recording sheet on the transferring means; and maintaining means for maintaining a raised condition of said at least one of the photosensitive drum and the fixing roller, raised by said raising means, when the carriage is at a home position.

31. The apparatus according to claim 30, wherein said maintaining means comprises a plurality of rollers arranged on the carriage unit, and a pair of rails extending from an end of the transferring means, said rollers on the carriage unit resting on said rails when the carriage unit is at the home position, so that the photosensitive drum and the fixing means are at a raised position and not in contact with the transferring means.

32. The apparatus according to claim 31, wherein each of said rails includes a tapered portion which merges with the end of the transferring means.

33. The apparatus according to claim 31, wherein said rollers comprise first rollers rotatably attached to a carriage frame adjacent to the photosensitive drum, and second rollers rotatably attached to the holding member adjacent to the fixing roller, the first and second rollers being arranged so that the photosensitive drum and the fixing roller are moved from the raised condition to contact the transferring means at different positions thereof.

34. The apparatus according to claim 30, further comprising a sheet edge sensor which senses an edge of the recording sheet, said sheet edge sensor being arranged at a position nearer to said heating means than a contact point where the photosensitive drum and the recording sheet first contact each other.

35. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet, wherein said photosensitive drum includes a first area which is exposed processing means and is photosensitive, and a second area not exposed processing means, said second area being brought into contact with the recording sheet when the carriage unit is moved from the home position to a print starting position said second area of said photosensitive drum including a groove which makes said first area not in contact with the recording sheet when the carriage unit is moved from the home position to the print starting position.

36. An electrophotographic serial printing comprising:

transporting means for transporting a recording sheet in a sheet transport direction;

processing means including means for uniformly charging a photosensitive drum which is rotated means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet; and a frame which accommodates said transporting means, and a spring means, secured to said frame, and being operative to bias said photosensitive drum downwardly on said carriage.

37. An electrophotographic serial printing apparatus comprising:

transporting means for transporting a recording sheet in a sheet transport direction including transporting rollers and a drive unit which drives said transporting rollers to transport the recording sheet in the sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet; and sheet edge sensors for sensing an edge of the recording sheet, said sheet edge sensors being respectively arranged adjacent to said transporting rollers, said transporting rollers being arranged on both ends of said transferring means along the sheet transport direction.

38. An electrophotographic serial printing apparatus comprising:

transporting means for transporting a recording sheet in a sheet transport direction including transporting rollers and a drive unit which drives said transporting rollers to transport the recording sheet in the sheet transport direction;

processing means including means for uniformly charging a photosensitive drum which is rotated, means for exposing the photosensitive drum to form a latent image and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller;

a carriage unit on which said processing means and said fixing means are arranged;

moving means for moving said carriage unit over the transferring means in directions perpendicular to the sheet transport direction;

heating means for heating the fixing roller through an induction heating to allow the developed image to be fixed to the recording sheet; and sheet guide units for guiding the recording sheet transported by said transporting rollers, said sheet guide units being respectively arranged adjacent to said transporting rollers, said transporting rollers being arranged on both ends of said transferring means along the sheet transport direction.

39. An electrophotographic serial printing apparatus comprising:

transporting means for transporting a recording sheet in a sheet transport direction;

processing means including means for uniformly charging a photosensitive drum which is rotated, means for exposing the photosensitive drum to form a latent image, and means for developing the latent image to form a developed image on the photosensitive drum, transferring means for transferring the developed image from the photosensitive drum to the recording sheet;

fixing means for fixing the developed image to the recording sheet by using a fixing roller after the developed image is transferred to the recording sheet, said fixing means including a holding member for holding said fixing roller, said fixing roller including a heater element mounted therein said heater element transferring thermal energy to the recording sheet when current flows through the heating element;

a carriage unit on which said processing means and said fixing means are arranged;

moving means for moving said carriage unit over the transferring means in directions perpendicular to the sheet transport direction; and heating means for heating the fixing roller through an induction heating to allow the developed image to be fixed to the recording sheet.

40. The apparatus according to claim 39, wherein said heater element of said fixing roller is a ceramic heater element.

41. The apparatus according to claim 40, wherein said fixing roller further comprises a toner separating layer on the ceramic heater element.

42. The apparatus according to claim 41, wherein said fixing roller further comprises an insulating layer between the toner separating layer and the ceramic heater element.

* * * * *